(12) United States Patent
Lam et al.

(10) Patent No.: US 12,023,608 B2
(45) Date of Patent: Jul. 2, 2024

(54) HYBRID DESALINATION SYSTEMS AND ASSOCIATED METHODS

(71) Applicant: Gradiant Corporation, Woburn, MA (US)

(72) Inventors: Steven Lam, Singapore (SG); Maximus G. St. John, Boston, MA (US); Prakash Narayan Govindan, Singapore (SG)

(73) Assignee: Gradiant Corporation, Woburn, MA (US)

( * ) Notice: Subject to any disclaimer, the term of this patent is extended or adjusted under 35 U.S.C. 154(b) by 0 days.

(21) Appl. No.: 17/516,078

(22) Filed: Nov. 1, 2021

(65) Prior Publication Data

US 2022/0168664 A1    Jun. 2, 2022

Related U.S. Application Data

(63) Continuation of application No. 16/069,896, filed as application No. PCT/US2017/014228 on Jan. 20, 2017, now abandoned.

(Continued)

(51) Int. Cl.
*B01D 3/16*    (2006.01)
*B01D 3/34*    (2006.01)
(Continued)

(52) U.S. Cl.
CPC .............. *B01D 3/16* (2013.01); *B01D 3/346* (2013.01); *C02F 1/52* (2013.01); *C02F 7/00* (2013.01);

(Continued)

(58) Field of Classification Search
CPC ...................................................... B01D 3/16
See application file for complete search history.

(56) References Cited

U.S. PATENT DOCUMENTS

| 2,151,990 A | 3/1939 | Ruys |
| 2,560,073 A | 7/1951 | Bloomer |

(Continued)

FOREIGN PATENT DOCUMENTS

| CA | 2779732 A1 | 12/2012 |
| CA | 2818055 C | 11/2013 |

(Continued)

OTHER PUBLICATIONS

International Search Report and Written Opinion for PCT/US2017/014228 mailed Apr. 6, 2017.

(Continued)

*Primary Examiner* — Peter Keyworth
(74) *Attorney, Agent, or Firm* — Wolf, Greenfield & Sacks, P.C.

(57) ABSTRACT

The present disclosure is related to hybrid desalination systems and associated methods. The hybrid desalination system can comprise a first desalination unit comprising a reverse osmosis unit and a second desalination unit fluidically connected to the first desalination unit, wherein the second desalination unit comprises a humidification-dehumidification desalination apparatus. The present disclosure is also related to systems and methods for the formation of solid salts using a humidifier. According to certain embodiments, the flow velocity of a gas in the humidifier can be relatively high during the formation of the solid salt. In some embodiments, the humidifier comprises a multi-stage bubble column humidifier.

19 Claims, 10 Drawing Sheets

Related U.S. Application Data

(60) Provisional application No. 62/281,828, filed on Jan. 22, 2016.

(51) Int. Cl.
    | | |
    |---|---|
    | *C02F 1/52* | (2023.01) |
    | *C02F 7/00* | (2006.01) |
    | *C02F 103/08* | (2006.01) |
    | *C02F 103/10* | (2006.01) |

(52) U.S. Cl.
    CPC ...... *B01D 2221/04* (2013.01); *C02F 2103/08* (2013.01); *C02F 2103/10* (2013.01); *C02F 2209/03* (2013.01)

(56) References Cited

U.S. PATENT DOCUMENTS

| | | |
|---|---|---|
| 2,560,978 A | 7/1951 | Persson et al. |
| 2,606,820 A | 8/1952 | Viggo |
| 2,606,839 A | 8/1952 | Evans |
| 2,640,018 A | 5/1953 | Heath |
| 2,702,696 A | 2/1955 | Pappas et al. |
| 2,997,856 A | 8/1961 | Pike |
| 3,032,482 A | 5/1962 | Shoemaker |
| 3,042,606 A | 7/1962 | Salutsky et al. |
| 3,080,302 A | 3/1963 | Rogers et al. |
| 3,196,864 A | 7/1965 | Johnson |
| 3,214,349 A | 10/1965 | Kehoe et al. |
| 3,220,483 A | 11/1965 | Hoevenaar |
| 3,232,847 A | 2/1966 | Hoff |
| 3,236,747 A | 2/1966 | Margiloff |
| 3,243,358 A | 3/1966 | McCue |
| 3,257,291 A | 6/1966 | Gerber |
| 3,288,686 A | 11/1966 | Othmer |
| 3,331,773 A | 7/1967 | Gunderson et al. |
| 3,425,935 A | 2/1969 | Cahn |
| 3,434,701 A | 3/1969 | Bauer |
| 3,454,490 A | 7/1969 | Wallace |
| 3,478,531 A | 11/1969 | Karnofsky |
| 3,489,652 A | 1/1970 | Williamson |
| 3,558,436 A | 1/1971 | Foley et al. |
| 3,583,895 A | 6/1971 | Othmer |
| 3,606,999 A | 9/1971 | Lawless |
| 3,607,666 A | 9/1971 | Roller |
| 3,625,761 A | 12/1971 | Tate |
| 3,653,186 A | 4/1972 | McLendon |
| 3,725,209 A | 4/1973 | Rosa |
| 3,755,088 A | 8/1973 | Osdor |
| 3,783,108 A | 1/1974 | Koivisto et al. |
| 3,826,815 A | 7/1974 | Mavrovic |
| 3,860,492 A | 1/1975 | Lowi et al. |
| 3,922,154 A | 11/1975 | Kawasaki et al. |
| 3,926,739 A | 12/1975 | Izumi |
| 4,105,723 A | 8/1978 | Mix |
| 4,224,148 A | 9/1980 | Lindman et al. |
| 4,251,367 A | 2/1981 | Santora |
| 4,252,546 A | 2/1981 | Krugmann |
| 4,276,124 A | 6/1981 | Mock |
| 4,334,886 A | 6/1982 | Tani et al. |
| 4,363,703 A | 12/1982 | ElDifrawi et al. |
| 4,426,322 A | 1/1984 | Stage |
| 4,452,696 A | 6/1984 | Lopez |
| 4,511,436 A | 4/1985 | el Din Nasser |
| 4,563,337 A | 1/1986 | Kim |
| 4,576,724 A | 3/1986 | Colman et al. |
| 4,595,459 A | 6/1986 | Kusakawa |
| 4,624,747 A | 11/1986 | el Din Nasser |
| 4,705,654 A | 11/1987 | Niwa et al. |
| 4,708,805 A | 11/1987 | D'Muhala |
| 4,735,722 A | 4/1988 | Krepak |
| 4,755,298 A | 7/1988 | Grinstead |
| 4,762,593 A | 8/1988 | Youngner |
| 4,770,775 A | 9/1988 | Lopez |
| 4,799,941 A | 1/1989 | Westermark |
| 4,806,244 A | 2/1989 | Guilhem |
| 4,820,456 A | 4/1989 | Kiselev |
| 4,843,828 A | 7/1989 | Gladman |
| 4,944,882 A | 7/1990 | Ray et al. |
| 4,956,157 A | 9/1990 | Nasu |
| 4,973,201 A | 11/1990 | Paul et al. |
| 4,980,077 A | 12/1990 | Morris et al. |
| 4,981,593 A | 1/1991 | Priestley et al. |
| 5,015,391 A | 5/1991 | Mohn |
| 5,053,132 A | 10/1991 | Sirkar |
| 5,096,543 A | 3/1992 | Elmore |
| 5,123,481 A | 6/1992 | Albers et al. |
| 5,167,828 A | 12/1992 | Emmons et al. |
| 5,176,798 A | 1/1993 | Rodden |
| 5,190,656 A | 3/1993 | Paul et al. |
| 5,225,087 A | 7/1993 | Kardos |
| 5,238,574 A | 8/1993 | Kawashima et al. |
| 5,250,185 A | 10/1993 | Tao et al. |
| 5,282,995 A | 2/1994 | Paul et al. |
| 5,290,403 A | 3/1994 | Saask |
| 5,328,616 A | 7/1994 | Martyak et al. |
| 5,378,267 A | 1/1995 | Bros et al. |
| 5,425,902 A | 6/1995 | Miller et al. |
| 5,453,205 A | 9/1995 | Browne |
| 5,464,540 A | 11/1995 | Friesen et al. |
| 5,552,022 A | 9/1996 | Wilson |
| 5,656,161 A | 8/1997 | Solomon et al. |
| 5,724,828 A | 3/1998 | Korenic |
| 5,840,195 A | 11/1998 | Delsalle et al. |
| 5,939,031 A | 8/1999 | Ellis et al. |
| 6,010,631 A | 1/2000 | Delsalle et al. |
| 6,056,878 A | 5/2000 | Tessier et al. |
| 6,062,070 A | 5/2000 | Maltby et al. |
| 6,113,797 A | 9/2000 | Al-Samadi |
| 6,146,525 A | 11/2000 | Li et al. |
| 6,187,200 B1 | 2/2001 | Yamamura et al. |
| 6,190,556 B1 | 2/2001 | Uhlinger |
| 6,270,671 B1 | 8/2001 | Shorr et al. |
| 6,319,409 B1 | 11/2001 | Saitou et al. |
| 6,348,137 B1 | 2/2002 | Nommensen |
| 6,416,668 B1 | 7/2002 | Al-Samadi et al. |
| 6,423,235 B1 | 7/2002 | Shimoi et al. |
| 6,440,310 B1 | 8/2002 | Shorr et al. |
| 6,461,514 B1 | 10/2002 | Al-Samadi |
| 6,508,936 B1 | 1/2003 | Hassan |
| 6,582,605 B2 | 6/2003 | Krulik et al. |
| 6,699,369 B1 | 3/2004 | Hartman et al. |
| 6,730,234 B2 | 5/2004 | Symens et al. |
| 6,783,682 B1 | 8/2004 | Awerbuch |
| 6,817,476 B2 | 11/2004 | Donnick et al. |
| 6,919,000 B2 | 7/2005 | Klausner et al. |
| 7,022,240 B2 | 4/2006 | Hart et al. |
| 7,048,852 B2 | 5/2006 | Ballard |
| 7,115,670 B2 | 10/2006 | Hensman et al. |
| 7,141,171 B2 | 11/2006 | Lightfoot |
| 7,225,620 B2 | 6/2007 | Klausner et al. |
| 7,306,437 B2 | 12/2007 | Hauge |
| 7,316,080 B1 | 1/2008 | Woolsey |
| 7,459,084 B2 | 12/2008 | Baig et al. |
| 7,459,088 B2 | 12/2008 | Davis |
| 7,465,376 B2 | 12/2008 | Neubert et al. |
| 7,510,656 B2 | 3/2009 | Shafer et al. |
| 7,520,993 B1 | 4/2009 | Laraway et al. |
| 7,527,726 B2 | 5/2009 | Slough et al. |
| 7,597,784 B2 | 10/2009 | Bednarek et al. |
| 7,621,991 B2 | 11/2009 | Ruan |
| 7,678,235 B2 | 3/2010 | Deep et al. |
| 7,718,069 B2 | 5/2010 | Laraway et al. |
| 7,726,398 B2 | 6/2010 | Collins et al. |
| 7,727,400 B2 | 6/2010 | Flynn |
| 7,731,847 B2 | 6/2010 | Ton That |
| 7,815,804 B2 | 10/2010 | Nagghappan |
| 7,823,503 B2 | 11/2010 | Ringstroem |
| 7,824,552 B2 | 11/2010 | Slabaugh et al. |
| 7,832,714 B2 | 11/2010 | Duesel et al. |
| 7,938,888 B2 | 5/2011 | Assaf |
| 7,950,921 B1 | 5/2011 | Woolsey |
| 7,964,101 B2 | 6/2011 | Slough et al. |
| 8,012,358 B2 | 9/2011 | Slabaugh et al. |

(56) References Cited

U.S. PATENT DOCUMENTS

| | | |
|---|---|---|
| 8,043,509 B2 | 10/2011 | Thiers |
| 8,119,007 B2 | 2/2012 | Bajpayee et al. |
| 8,147,696 B1 | 4/2012 | Pandya |
| 8,216,473 B2 | 7/2012 | Wohlert |
| 8,252,092 B2 | 8/2012 | Govindan et al. |
| 8,292,272 B2 | 10/2012 | Elsharqawy et al. |
| 8,366,924 B2 | 2/2013 | Vuong |
| 8,444,829 B2 | 5/2013 | Godshall et al. |
| 8,465,006 B2 | 6/2013 | Elsharqawy et al. |
| 8,469,092 B2 | 6/2013 | Curole et al. |
| 8,496,234 B1 | 7/2013 | Govindan et al. |
| 8,496,787 B2 | 7/2013 | Lord |
| 8,501,007 B2 | 8/2013 | Bajpayee et al. |
| 8,523,985 B2 | 9/2013 | Govindan et al. |
| 8,562,824 B2 | 10/2013 | Thiers et al. |
| 8,678,080 B2 | 3/2014 | Curole et al. |
| 8,679,347 B2 | 3/2014 | Al-Samadi |
| 8,727,325 B2 | 5/2014 | Sparrow et al. |
| 8,771,477 B2 | 7/2014 | Thiers |
| 8,778,065 B2 | 7/2014 | Govindan et al. |
| 8,794,320 B2 | 8/2014 | Ayirala et al. |
| 8,801,910 B2 | 8/2014 | Bazant et al. |
| 8,820,723 B1 | 9/2014 | Sparrow et al. |
| 8,840,792 B2 | 9/2014 | Wohlert |
| 8,857,798 B1 | 10/2014 | Sparrow et al. |
| 8,889,000 B2 | 11/2014 | Hannemann et al. |
| 8,980,100 B2 | 3/2015 | Chidambaran |
| 8,999,172 B1 | 4/2015 | Zuback |
| 9,072,984 B2 | 7/2015 | Govindan et al. |
| 9,079,117 B2 | 7/2015 | Govindan et al. |
| 9,085,971 B2 | 7/2015 | Janssen et al. |
| 9,120,033 B2 | 9/2015 | Govindan et al. |
| 9,221,694 B1 | 12/2015 | Govindan et al. |
| 9,266,748 B1 | 2/2016 | Govindan et al. |
| 9,266,762 B2 | 2/2016 | Wang et al. |
| 9,320,984 B2 | 4/2016 | Govindan et al. |
| 9,364,771 B2 | 6/2016 | Govindan et al. |
| 9,403,104 B2 | 8/2016 | Govindan et al. |
| 9,416,800 B2 | 8/2016 | Govindan et al. |
| 9,428,404 B2 | 8/2016 | Bajpayee et al. |
| 9,468,864 B2 | 10/2016 | Govindan et al. |
| 9,550,685 B2 | 1/2017 | Klausner et al. |
| 9,556,041 B2 | 1/2017 | Govindan et al. |
| 9,579,590 B2 | 2/2017 | Govindan et al. |
| 9,617,169 B2 | 4/2017 | Govindan et al. |
| 9,617,179 B2 | 4/2017 | Govindan et al. |
| 9,643,102 B2 | 5/2017 | Al-Sulaiman et al. |
| 9,700,811 B2 | 7/2017 | Govindan et al. |
| 9,790,102 B2 | 10/2017 | Govindan et al. |
| 9,957,180 B2 | 5/2018 | Govindan et al. |
| 9,969,638 B2 | 5/2018 | Govindan et al. |
| 9,981,860 B2 | 5/2018 | Govindan et al. |
| 10,053,373 B2 | 8/2018 | Govindan et al. |
| 10,143,935 B2 | 12/2018 | Govindan et al. |
| 10,143,936 B2 | 12/2018 | Govindan et al. |
| 10,167,218 B2 | 1/2019 | St. John et al. |
| 10,479,701 B2 | 11/2019 | Govindan et al. |
| 2002/0053505 A1 | 5/2002 | Arrison |
| 2002/0166758 A1 | 11/2002 | Vinz |
| 2003/0092876 A1 | 5/2003 | Beek et al. |
| 2003/0106860 A1 | 6/2003 | Peloquin et al. |
| 2003/0132166 A1 | 7/2003 | Rey |
| 2004/0026225 A1 | 2/2004 | Domen |
| 2004/0163536 A1 | 8/2004 | Baudat et al. |
| 2004/0187897 A1 | 9/2004 | Kenowski et al. |
| 2004/0219400 A1 | 11/2004 | Al-Hallaj et al. |
| 2004/0231970 A1 | 11/2004 | Lee et al. |
| 2005/0023222 A1 | 2/2005 | Baillie |
| 2005/0121304 A1 | 6/2005 | Beckman |
| 2005/0230238 A1 | 10/2005 | Klausner et al. |
| 2006/0060532 A1 | 3/2006 | Davis et al. |
| 2006/0150892 A1 | 7/2006 | Mayer |
| 2006/0157409 A1 | 7/2006 | Hassan |
| 2006/0157410 A1 | 7/2006 | Hassan |
| 2006/0231377 A1 | 10/2006 | Costa |
| 2006/0272933 A1 | 12/2006 | Domen et al. |
| 2007/0012556 A1 | 1/2007 | Lum et al. |
| 2007/0068791 A1 | 3/2007 | Thom et al. |
| 2007/0080113 A1 | 4/2007 | Vuong |
| 2007/0084713 A1 | 4/2007 | Deep et al. |
| 2007/0102359 A1 | 5/2007 | Lombardi et al. |
| 2007/0131428 A1 | 6/2007 | Willem Cornelis den Boestert et al. |
| 2007/0181480 A1 | 8/2007 | Lee |
| 2007/0235391 A1 | 10/2007 | Ylikangas et al. |
| 2008/0073200 A1 | 3/2008 | Godshall et al. |
| 2008/0102119 A1 | 5/2008 | Grovender |
| 2008/0116134 A1 | 5/2008 | Cartwright |
| 2008/0121585 A1 | 5/2008 | Mavis |
| 2008/0223793 A1* | 9/2008 | Lee .................. B09B 3/00 210/194 |
| 2008/0277344 A1 | 11/2008 | Sengupta et al. |
| 2009/0020289 A1 | 1/2009 | Sharif |
| 2009/0032446 A1 | 2/2009 | Wiemers et al. |
| 2009/0101490 A1 | 4/2009 | Thiers |
| 2009/0101587 A1 | 4/2009 | Blokker et al. |
| 2009/0127210 A1 | 5/2009 | Swisher |
| 2009/0145739 A1* | 6/2009 | Cotten ............. B01D 1/2881 202/185.1 |
| 2009/0173096 A1 | 7/2009 | Wohlert |
| 2009/0194272 A1 | 8/2009 | Baillie |
| 2009/0218210 A1 | 9/2009 | Demmons et al. |
| 2009/0277634 A1 | 11/2009 | Case et al. |
| 2009/0277640 A1 | 11/2009 | Thompson et al. |
| 2009/0277641 A1 | 11/2009 | Walters et al. |
| 2009/0308820 A1 | 12/2009 | Thiers et al. |
| 2010/0032377 A1 | 2/2010 | Wohlert |
| 2010/0147673 A1 | 6/2010 | Passarelli |
| 2010/0163471 A1 | 7/2010 | Elyanow et al. |
| 2010/0163472 A1 | 7/2010 | Thiers et al. |
| 2010/0234795 A1 | 9/2010 | Wallenäs |
| 2010/0242995 A1 | 9/2010 | Xiong et al. |
| 2010/0282675 A1 | 11/2010 | Sengupta et al. |
| 2010/0314228 A1 | 12/2010 | Huang |
| 2010/0314238 A1 | 12/2010 | Frolov et al. |
| 2011/0017677 A1 | 1/2011 | Evans |
| 2011/0024354 A1 | 2/2011 | Xia et al. |
| 2011/0056822 A1 | 3/2011 | Elsharqawy et al. |
| 2011/0056878 A1 | 3/2011 | Matsushiro et al. |
| 2011/0079504 A1 | 4/2011 | Govindan et al. |
| 2011/0094965 A1 | 4/2011 | Al-Samadi |
| 2011/0108484 A1 | 5/2011 | Liberman et al. |
| 2011/0114558 A1 | 5/2011 | Al-Mayahi et al. |
| 2011/0120157 A1 | 5/2011 | Wohlert |
| 2011/0155666 A1 | 6/2011 | Prakash et al. |
| 2011/0180479 A1 | 7/2011 | Cordatos et al. |
| 2011/0198285 A1 | 8/2011 | Wallace |
| 2011/0215039 A1 | 9/2011 | Acernese et al. |
| 2011/0257788 A1 | 10/2011 | Wiemers et al. |
| 2011/0266132 A1 | 11/2011 | Takezaki |
| 2011/0303607 A1 | 12/2011 | Vora et al. |
| 2011/0306525 A1 | 12/2011 | Lighthelm |
| 2012/0012005 A1 | 1/2012 | Burke |
| 2012/0012511 A1 | 1/2012 | Kim et al. |
| 2012/0031303 A1 | 2/2012 | Contantz et al. |
| 2012/0037568 A1 | 2/2012 | Karrs et al. |
| 2012/0067820 A1 | 3/2012 | Henthorne et al. |
| 2012/0090833 A1 | 4/2012 | Ligthelm et al. |
| 2012/0112808 A1 | 5/2012 | Yotsuji |
| 2012/0125603 A1 | 5/2012 | Willingham et al. |
| 2012/0125611 A1 | 5/2012 | Ayirala et al. |
| 2012/0125861 A1 | 5/2012 | Thiers |
| 2012/0145635 A1 | 6/2012 | Lucas, III et al. |
| 2012/0160753 A1 | 6/2012 | Vora et al. |
| 2012/0199524 A1 | 8/2012 | Bly et al. |
| 2012/0205236 A1 | 8/2012 | Govindan et al. |
| 2012/0205307 A1 | 8/2012 | Boudinar |
| 2012/0227975 A1 | 9/2012 | Ayirala et al. |
| 2012/0234664 A1 | 9/2012 | Nicoll |
| 2012/0234765 A1 | 9/2012 | Sengupta et al. |
| 2012/0267307 A1 | 10/2012 | McGinnis |
| 2012/0279396 A1 | 11/2012 | Brammer et al. |
| 2012/0292259 A1 | 11/2012 | Marcin |
| 2012/0312755 A1 | 12/2012 | Ryan et al. |

(56) References Cited

U.S. PATENT DOCUMENTS

| | | |
|---|---|---|
| 2013/0008079 A1 | 1/2013 | Chung et al. |
| 2013/0043190 A1 | 2/2013 | Al-Samadi et al. |
| 2013/0056193 A1 | 3/2013 | Thiers |
| 2013/0074694 A1 | 3/2013 | Govindan et al. |
| 2013/0075098 A1 | 3/2013 | Janjua et al. |
| 2013/0075940 A1 | 3/2013 | Govindan et al. |
| 2013/0087501 A1 | 4/2013 | Moe et al. |
| 2013/0092626 A1 | 4/2013 | Zimmerman et al. |
| 2013/0105323 A1 | 5/2013 | Averbeck et al. |
| 2013/0118887 A1 | 5/2013 | Frovlov et al. |
| 2013/0193074 A1 | 8/2013 | Voigt et al. |
| 2013/0199921 A1 | 8/2013 | McGovern |
| 2013/0213892 A1 | 8/2013 | Henthorne |
| 2013/0220927 A1 | 8/2013 | Moody et al. |
| 2013/0233786 A1 | 9/2013 | Posa |
| 2013/0240442 A1 | 9/2013 | Chidambaran et al. |
| 2013/0318743 A1 | 12/2013 | Chinta et al. |
| 2014/0021135 A1 | 1/2014 | Sawyer et al. |
| 2014/0041856 A1 | 2/2014 | Janssen et al. |
| 2014/0042058 A1 | 2/2014 | Janssen et al. |
| 2014/0042061 A1 | 2/2014 | Wallace |
| 2014/0061022 A1 | 3/2014 | Passarelli |
| 2014/0061958 A1 | 3/2014 | Sparrow et al. |
| 2014/0067958 A1 | 3/2014 | Bradley et al. |
| 2014/0069821 A1 | 3/2014 | Marcin et al. |
| 2014/0116956 A1 | 5/2014 | Yuan et al. |
| 2014/0151300 A1 | 6/2014 | Savage et al. |
| 2014/0197022 A1 | 7/2014 | Antar et al. |
| 2014/0197029 A1 | 7/2014 | Sparrow et al. |
| 2014/0246368 A1 | 9/2014 | Neubrand et al. |
| 2014/0263055 A1 | 9/2014 | Govindan et al. |
| 2014/0263081 A1 | 9/2014 | Thiers |
| 2014/0299462 A1 | 10/2014 | Thiers |
| 2014/0339162 A1 | 11/2014 | Cao et al. |
| 2014/0367871 A1 | 12/2014 | Govindan et al. |
| 2015/0013987 A1 | 1/2015 | Underwood et al. |
| 2015/0014248 A1 | 1/2015 | Herron et al. |
| 2015/0053619 A1 | 2/2015 | Cao et al. |
| 2015/0060286 A1 | 3/2015 | Govindan et al. |
| 2015/0060360 A1 | 3/2015 | Motherway et al. |
| 2015/0068886 A1 | 3/2015 | Domen et al. |
| 2015/0083577 A1 | 3/2015 | Govindan et al. |
| 2015/0083656 A1 | 3/2015 | Williams |
| 2015/0107840 A1 | 4/2015 | Ligthelm et al. |
| 2015/0107841 A1 | 4/2015 | Suijkerbuijk et al. |
| 2015/0129410 A1 | 5/2015 | Govindan et al. |
| 2015/0190730 A1 | 7/2015 | Govindan et al. |
| 2015/0190731 A1 | 7/2015 | Govindan et al. |
| 2015/0260418 A1 | 9/2015 | Govindan et al. |
| 2015/0290557 A1 | 10/2015 | Govindan et al. |
| 2015/0321118 A1 | 11/2015 | Govindan et al. |
| 2015/0329377 A1 | 11/2015 | Govindan et al. |
| 2015/0353377 A1 | 12/2015 | Al-Sulaiman et al. |
| 2015/0353397 A1 | 12/2015 | Cath et al. |
| 2015/0368121 A1 | 12/2015 | Govindan et al. |
| 2016/0040522 A1 | 2/2016 | Jacob et al. |
| 2016/0137526 A1 | 5/2016 | Govindan et al. |
| 2016/0228795 A1 | 8/2016 | St. John et al. |
| 2016/0229705 A1 | 8/2016 | St. John et al. |
| 2016/0244349 A1 | 8/2016 | St. John et al. |
| 2016/0271518 A1 | 9/2016 | Govindan et al. |
| 2016/0288013 A1 | 10/2016 | Al-Qutub et al. |
| 2016/0339354 A1 | 11/2016 | Govindan et al. |
| 2016/0339356 A1 | 11/2016 | Govindan et al. |
| 2016/0339357 A1 | 11/2016 | Govindan et al. |
| 2016/0375375 A1 | 12/2016 | Govindan et al. |
| 2017/0036171 A1 | 2/2017 | Lienhard et al. |
| 2017/0044033 A1 | 2/2017 | Lienhard et al. |
| 2017/0113947 A1 | 4/2017 | Govindan et al. |
| 2017/0144906 A1 | 5/2017 | Andrews et al. |
| 2017/0174543 A1 | 6/2017 | Govindan et al. |
| 2017/0334736 A1 | 11/2017 | Lam et al. |
| 2017/0334737 A1 | 11/2017 | Govindan et al. |
| 2018/0008919 A1 | 1/2018 | Tierney, III et al. |
| 2018/0236372 A1 | 8/2018 | Govindan et al. |
| 2018/0236406 A1 | 8/2018 | St. John et al. |
| 2018/0244545 A1 | 8/2018 | St. John et al. |
| 2019/0022550 A1 | 1/2019 | Lam et al. |

FOREIGN PATENT DOCUMENTS

| | | |
|---|---|---|
| CA | 2821453 C | 1/2014 |
| CA | 2816746 C | 4/2014 |
| CA | 2821458 C | 7/2014 |
| CN | 1623936 A | 6/2005 |
| CN | 1791557 A | 6/2006 |
| CN | 1856447 A | 11/2006 |
| CN | 100999364 A | 7/2007 |
| CN | 101056693 A | 10/2007 |
| CN | 101397152 A | 4/2009 |
| CN | 101636354 A | 1/2010 |
| CN | 101717161 A | 6/2010 |
| CN | 102143786 A | 8/2011 |
| CN | 101538070 B | 9/2011 |
| CN | 102438957 A | 5/2012 |
| CN | 102725236 A | 10/2012 |
| CN | 102933507 A | 2/2013 |
| CN | 103808880 A | 5/2014 |
| DE | 1070594 B | 12/1959 |
| DE | 2145861 A1 | 11/1972 |
| EP | 0 099 320 A2 | 1/1984 |
| EP | 0 207 390 A1 | 1/1987 |
| EP | 0 253 287 A1 | 1/1988 |
| EP | 0 623 561 A1 | 11/1994 |
| EP | 1 775 267 A2 | 4/2007 |
| FR | 1582201 A | 9/1969 |
| FR | 2281896 A1 | 3/1976 |
| FR | 2561637 A1 | 9/1985 |
| GB | 698966 A | 10/1953 |
| GB | 821939 A | 10/1959 |
| GB | 1013767 A | 12/1965 |
| GB | 1036920 A | 7/1966 |
| GB | 1235760 A | 6/1971 |
| GB | 1444241 A | 7/1976 |
| GB | 2395946 A | 6/2004 |
| JP | S49-63699 A | 6/1974 |
| JP | S49-75935 U | 7/1974 |
| JP | S51-42078 A | 4/1976 |
| JP | S55-9508 A | 1/1980 |
| JP | S55-147199 | 11/1980 |
| JP | H05-208199 A | 8/1993 |
| JP | 2006-312134 A | 11/2006 |
| KR | 101229482 B1 | 2/2013 |
| RU | 2239460 C1 | 11/2004 |
| WO | WO 95/27683 A1 | 10/1995 |
| WO | WO 00/00273 A1 | 1/2000 |
| WO | WO 01/14256 A1 | 3/2001 |
| WO | WO 02/32813 A1 | 4/2002 |
| WO | WO 2005/012185 A1 | 2/2005 |
| WO | WO 2005/075045 A1 | 8/2005 |
| WO | WO 2007/128062 A1 | 11/2007 |
| WO | WO 2007/132477 A1 | 11/2007 |
| WO | WO 2007/138327 A1 | 12/2007 |
| WO | WO 2007/144591 A1 | 12/2007 |
| WO | WO 2009/103112 A1 | 8/2009 |
| WO | WO 2010/026589 A1 | 3/2010 |
| WO | WO 2010/118425 A1 | 10/2010 |
| WO | WO 2010/122336 A2 | 10/2010 |
| WO | WO 2010/131251 A2 | 11/2010 |
| WO | WO 2010/135561 A2 | 11/2010 |
| WO | WO 2011/028853 A1 | 3/2011 |
| WO | WO 2011/137149 A1 | 11/2011 |
| WO | WO 2011/159743 A1 | 12/2011 |
| WO | WO 2012/112808 A2 | 8/2012 |
| WO | WO 2012/138502 A1 | 10/2012 |
| WO | WO 2012/142396 A1 | 10/2012 |
| WO | WO 2012/159203 A1 | 11/2012 |
| WO | WO 2013/012548 A1 | 1/2013 |
| WO | WO 2013/037047 A1 | 3/2013 |
| WO | WO 2013/072709 A2 | 5/2013 |
| WO | WO 2013/078124 A1 | 5/2013 |
| WO | WO 2013/150040 A2 | 10/2013 |
| WO | WO 2013/158315 A1 | 10/2013 |
| WO | WO 2013/159220 A1 | 10/2013 |

(56) References Cited

FOREIGN PATENT DOCUMENTS

| WO | WO 2014/058696 A1 | 4/2014 |
|---|---|---|
| WO | WO 2014/088826 A1 | 6/2014 |
| WO | WO 2014/121153 A2 | 8/2014 |
| WO | WO 2014/144778 A1 | 9/2014 |
| WO | WO 2014/150848 A1 | 9/2014 |
| WO | WO 2014/162094 A2 | 10/2014 |
| WO | WO 2014/188450 A1 | 11/2014 |
| WO | WO 2014/200829 A1 | 12/2014 |
| WO | WO 2015/021062 A1 | 2/2015 |
| WO | WO 2015/038983 A2 | 3/2015 |
| WO | WO 2015/042584 A1 | 3/2015 |
| WO | WO 2015/061194 A1 | 4/2015 |
| WO | WO 2016/187587 A2 | 11/2016 |
| WO | WO 2016/187601 A2 | 11/2016 |
| WO | WO 2017/030932 A1 | 2/2017 |
| WO | WO 2017/030937 A1 | 2/2017 |
| WO | WO 2017/030941 A1 | 2/2017 |
| WO | WO 2017/044645 A1 | 3/2017 |
| WO | WO 2017/044668 A1 | 3/2017 |
| WO | WO 2017/127607 A1 | 7/2017 |
| WO | WO 2017/147113 A1 | 8/2017 |
| WO | WO 2021/092013 A1 | 5/2021 |

OTHER PUBLICATIONS

International Preliminary Report on Patentability for PCT/US2017/014228 mailed Aug. 2, 2018.
[No Author Listed], Accepta 4360 Material Safety Data Sheet. Accepta Ltd. Manchester, UK. Jul. 19, 2011. 5 pages.
[No Author Listed], Caustic Soda 50% Material Safety Data Sheet. Univar. Redmond, Washington. Apr. 8, 2013. 10 pages.
[No Author Listed], Color Removal Using Ozone. Spartan Environmental Technologies Air and Water Treatment—Technical Bulletin. Available Jul. 21, 2006. Last accessed Mar. 2, 2017 from <http://www.spartanwatertreatment.com/ozone-color-removal.html>. 2 pages.
[No Author Listed], Everything you want to know about Coagulation & Flocculation. Chapter 1: The Electrokinetic Connection. Zeta-Meter, Inc. Staunton, VA. 4th Edition. 1993:1-8.
[No Author Listed], Hi-Cal Hydrate Material Safety Data Sheet. Chemical Lime Co. Fort Worth, Texas. May 1, 2008. 6 pages.
[No Author Listed], Polyaluminum Chloride Solution Material Safety Data Sheet. GEO Specialty Chemicals, Ltd. Little Rock, Arkansas. Mar. 12, 2015. 11 pages.
[No Author Listed], Recuperator. Wikipedia Entry. As edited on Jul. 17, 2012. Accessed May 11, 2018 at <https://en.wikipedia.org/w/index.php?title=Recuperator&oldid=502784184>. 3 pages.
[No Author Listed], Servco 1010 Material Safety Data Sheet. Servco Chemicals. Lubbock, Texas. Aug. 7, 2013. 4 pages.
[No Author Listed], Soda Ash Material Safety Data Sheet. Univar. Redmond, Washington. Apr. 7, 2003. 10 pages.
Achilli et al., Selection of inorganic-based draw solutions for forward osmosis applications. Journal of Membrane Science. 2010;364:233-41. Epub Aug. 14, 2010.
Al-Hallaj et al., Solar desalination with a humidification-dehumidification cycle: performance of the unit. Desalination. 1998;120:273-80.
Alshakhs, Modifying Water Salinity to Improve Oil Recovery. Stanford Academic Report. Oct. 29, 2013. Last accessed on Dec. 8, 2016 at <http://large.stanford.edu/courses/2013/ph240/alshakhs1/>. 2 pages.
Aramco, Saudi Aramco's 'Smart Water' May Aid Oil Production. Rigzone. Jul. 29, 2009. <http://www.rigzone.com/news/article_pf.asp?a_id=78707> Last accessed Jul. 30, 2015. 1 page.
Arthur et al., Technical Summary of Oil & Gas Produced Water Treatment Technologies. All Consulting, LLC (Mar. 2005). Last accessed on Dec. 21, 2016 from <http://dvikan.no/ntnu-studentserver/reports/ALLConsulting-WaterTreatmentOptionsReport.pdf>. 53 pages.
Chung et al., Forward osmosis processes: Yesterday, today and tomorrow. Desalination. 2012;287:78-81. Epub Jan. 11, 2011.
El-Dessouky et al., Multiple-effect evaporation desalination systems: thermal analysis. Desalination. 1999;125:259-76.
Ge et al., Exploration of polyelectrolytes as draw solutes in forward osmosis processes. Water Research. 2012;46:1318-26. Epub Dec. 27, 2011.
Global Water Intelligence, Water Desalination Report. Tom Pankratz, ed. Dec. 17, 2012;48(48):1-4.
Govindan, Thermal Design of Humidification Dehumidification Systems for Affordable and Small-scale Desalination. Doctoral Thesis. Massachusetts Institute of Technology. Sep. 2012. 286 pages.
Huang et al., The bridging force between colloidal particles in a polyelectrolyte solution. Langmuir. Nov. 27, 2012;28(47):16300-5. doi:10.1021/la303918p.
Khayet et al., Determination of surface and bulk pore sizes of flat-sheet and hollow-fiber membranes by atomic force microscopy, gas permeation and solute transport methods. Desalination. 2003;158:57-64.
Klausner et al., Evaporative heat and mass transfer for the diffusion driven desalination process. Heat Mass Transfer. 2006;42:528-36.
Kwak et al., New Insights on the Role of Multivalent Ions I Water-Carbonate Rock Interactions. Saudi Journal of Technology. 2014:25-38. Last accessed on Dec. 8, 2016 at <http://www.saudiaramco.com/content/dam/Publications/Journal-of-Technology/Summer2014/New_Insights.pdf>.
Lam, Development of a Multi-Stage Bubble col. Dehumidifier for Application in a Humidification Dehumidification Desalination System. Massachusetts Institute of Technology. 2012. Thesis. 67 pages.
Li, Experimental Analysis of Produced Water Desalination by a Humidification-Dehumidification Process. 2009. 62 pages.
Li, Mineral precipitation and deposition in cooling systems using impaired waters: mechanisms, kinetics, and inhibition. Dissertation defended Jul. 27, 2010. 224 pages.
McGinnis et al., Pilot demonstration of the NH3/CO2 forward osmosis desalination process on high salinity brines. Desalination. Mar. 2013;312:67-74. Supporting information included.
Moghadasi et al., Scale deposits in porous media and their removal by EDTA injection. ECI Symposium Series. 2007. vol. RP5. Article 10. p. 57-70.
Narayan et al., The potential of solar-driven humidification-dehumidification desalination for small-scale decentralized water production. Renewable and Sustainable Energy Reviews. 2010;14:1187-1201.
Narayan et al., Thermal design of the humidification desalination system: an experimental investigation. International Journal of Heat and Mass Transfer. 2013;58:1-9.
Narayan et al., Thermodynamic balancing of the humidification dehumidification desalination system by mass extraction and injection. International Journal of Heat and Mass Transfer. 2013;57:756-70.
Ribeiro et al., Gas-Liquid Direct-Contact Evaporation: A Review. Chem. Eng. Technol. 2005;28(10):1081-107.
Sahin, A Mathematical Model for Explanation of Ion Exchange of the Boric Acid Adsorption. Jour. Chem. Soc. Pak. 1998;20(1):12-8.
Sinex, Edta—A molecule with a complex story. University of Bristol, School of Chemistry. <www.chm.bris.ac.uk/motm/edta/edtah.htm> (accessed Jan. 8, 2013). Aug. 1, 2007. 6 pages.
Soufari et al., Performance optimization of the humidification-dehumidification desalination process using mathematical programming. Desalination. Feb. 2009;237(1-3):305-17.
Srithar et al., Energy recovery from a vapour compression refrigeration system using humidification dehumidification desalination. Desalination. Aug. 1, 2018;439:155-61.
Xu et al., Humidification-Dehumidification (HDH) Desalination System with Air-Cooling Condenser and Cellulose Evaporative Pad. Water. Jan. 2020; 12(1):14 pages.
Zamen et al., Improvement of solar humidification-dehumidification desalination using multi-stage process. 6 pages. Accessed Jun. 6, 2014.
Notice of Acceptance for AU Application No. 2021203648 dated Sep. 28, 2022 and allowed claims.

(56) References Cited

OTHER PUBLICATIONS

Office Action for AU Application No. 2021203648 dated Jul. 20, 2022.
Office Action for CA Application No. 2,962,620 dated Dec. 16, 2022.
Office Action for CN Application No. 202110138974.6 dated Aug. 23, 2022.
Office Action for CN Application No. 202110138974.6 dated Apr. 22, 2023.

* cited by examiner

HYBRID DESALINATION SYSTEMS AND ASSOCIATED METHODS

RELATED APPLICATIONS

This application is a continuation of U.S. patent application Ser. No. 16/069,896, filed Jul. 13, 2018 and entitled "Formation of Solid Salts Using High Gas Flow Velocities in Humidifiers, Such as Multi-Stage Bubble Column Humidifiers," which is a U.S. National Stage patent application based on International Patent Application No. PCT/US2017/014228, filed Jan. 20, 2017, and entitled "Formation of Solid Salts Using High Gas Flow Velocities in Humidifiers, Such as Multi-Stage Bubble Column Humidifiers," which claims priority under 35 U.S.C. § 119(e) to U.S. Provisional Application No. 62/281,828, filed Jan. 22, 2016, and entitled "Formation of Solid Salts Using High Gas Flow Velocities in Humidifiers, Such as Multi-Stage Bubble Column Humidifiers," each of which is incorporated herein by reference in its entirety for all purposes.

TECHNICAL FIELD

Hybrid desalination systems and associated methods are generally described. Systems and methods for the formation of solid salts using humidifiers are also generally described.

BACKGROUND

Solutions containing dissolved salts can be used to make commercially valuable products, such as solid salts and salt-containing aqueous solutions. Solid salts can be obtained from aqueous solutions, for example, by precipitating solubilized ions to form a solid precipitate. In some cases, the aqueous solution can be concentrated during the precipitation step. In some such cases, the degree that the aqueous solution is concentrated can be tailored to achieve a desired salt-level in the final product.

Improved precipitation and concentration systems would be desirable.

SUMMARY

The present disclosure is related to hybrid desalination systems. The present disclosure is also related to systems and methods for the formation of solid salts using a humidifier. According to certain embodiments, the flow velocity of a gas in the humidifier can be relatively high during the formation of the solid salt. In some embodiments, the humidifier comprises a multi-stage bubble column humidifier. The subject matter of the present invention involves, in some cases, interrelated products, alternative solutions to a particular problem, and/or a plurality of different uses of one or more systems and/or articles.

Certain embodiments are related to hybrid desalination systems. In some embodiments, the hybrid desalination system comprises a first desalination unit comprising a reverse osmosis unit; and a second desalination unit fluidically connected to the first desalination unit, wherein the second desalination unit comprises a humidification-dehumidification desalination apparatus.

Certain embodiments are related to systems for treating an aqueous inlet stream containing dissolved salt. In some embodiments, the system comprises a humidifier configured to produce a concentrated stream enriched in the dissolved salt relative to the aqueous inlet stream, the humidifier comprising: a gas inlet in fluidic communication with a source of a gas; a gas outlet; a liquid inlet in fluidic communication with a source of the aqueous inlet stream; a liquid outlet discharging the concentrated stream; a first stage comprising a first liquid layer comprising water from the aqueous inlet stream in liquid phase, a first vapor distribution region in fluidic communication with the first liquid layer, and a first bubble generator in fluidic communication with the gas inlet; and a second stage comprising a second liquid layer comprising water from the aqueous inlet stream in liquid phase, a second vapor distribution region in fluidic communication with the second liquid layer, and a second bubble generator in fluidic communication with the first vapor distribution region. In certain embodiments, the system comprises a precipitator in fluidic communication with the liquid outlet of the humidifier that precipitates at least a portion of the dissolved salt from the concentrated stream.

Certain aspects are related to methods of treating an aqueous inlet stream containing dissolved salt. The method comprises, according to some embodiments, transporting the aqueous inlet stream and a gas stream through a humidifier such that water is removed from the aqueous inlet stream to produce a concentrated stream enriched in the dissolved salt relative to the aqueous inlet stream; and precipitating, within a precipitator, at least a portion of the dissolved salt from the concentrated stream to produce a product stream containing less of the dissolved salt relative to the concentrated stream. In some such embodiments, during operation, the superficial flow velocity of the gas stream through the humidifier is at least about 50 cm/second.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1A:
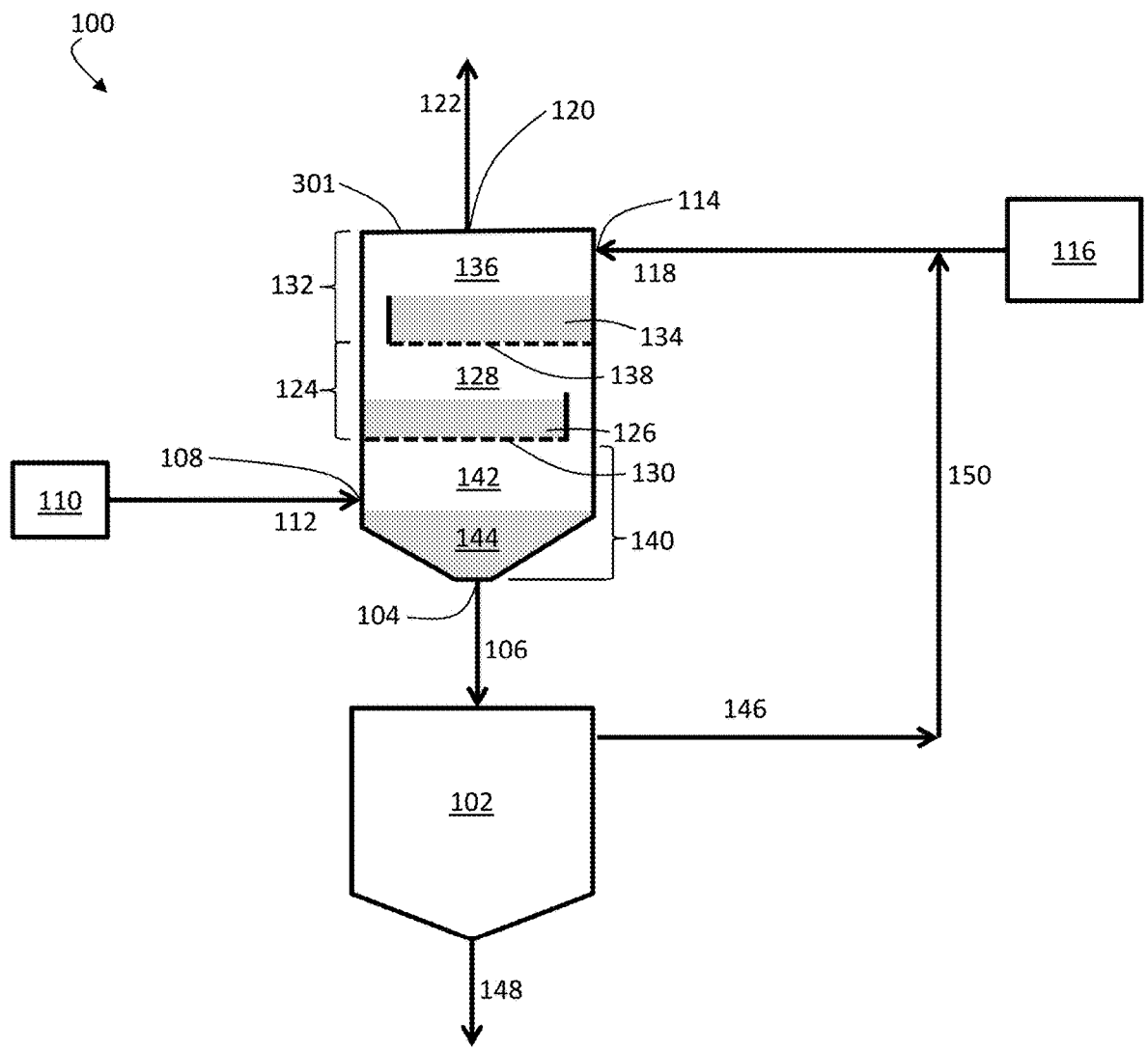
FIG. 1A is, according to certain embodiments, a schematic illustration of a system for treating an aqueous inlet stream containing dissolved salt.

Embodiments described herein generally relate to systems for treating aqueous inlet streams containing dissolved salts. The systems generally comprise a humidifier and a precipitator. Associated methods are also described. The humidifier can be used, according to certain embodiments, to produce a concentrated stream enriched in dissolved salt relative to the aqueous inlet stream fed to the humidifier. The precipitator can be used to precipitate at least a portion of the dissolved salt from the concentrated stream.

In certain embodiments, the flow velocity of a gas (e.g., the gas into which water is humidified during operation of the humidifier) through the humidifier is relatively high. It has been recognized, within the context of certain inventive embodiments described herein, that it may be advantageous to employ relatively high gas velocities in the humidifier, as doing so may reduce or eliminate precipitation (including formation of crystalline, partially crystalline, or amorphous particles) at undesired locations within the system (e.g., within the humidifier). Without wishing to be bound by any particular theory, it is believed that, by employing relatively high gas flow velocities within the humidifier, one can disrupt liquid regions within the humidifier and avoid creating quiescent zones of liquid within the humidifier. It is believed that the formation of quiescent zones of liquid solution can trigger precipitation of solid salts from the solution. Thus, avoiding the formation of quiescent zones of liquid solution can reduce or eliminate unwanted precipitation, according to certain embodiments.

While, generally, embodiments of the invention may employ a variety of humidifier designs (including but not limited to those involving direct contact between gas and liquid phases), in some embodiments, multi-stage bubble column humidifiers are described. The multi-stage bubble column humidifiers, according to certain embodiments, can be associated with certain advantages over certain other types of humidifiers. For example, bubble column humidifiers may exhibit higher thermodynamic effectiveness than certain other types of humidifiers (e.g., packed bed humidifiers, spray towers, wetted wall towers). Without wishing to be bound by a particular theory, the increased thermodynamic effectiveness may be at least partially attributed to the use of gas bubbles for heat and mass transfer in bubble column humidifiers, since gas bubbles may have more surface area available for heat and mass transfer than other types of surfaces (e.g., metallic tubes, liquid films, packing material). As described in further detail herein, a bubble column humidifier may have certain features that further increase thermodynamic effectiveness, including, but not limited to, relatively low liquid level height, relatively high aspect ratio liquid flow paths, and multi-staged designs.

As noted above, certain embodiments are related to systems for treating an aqueous inlet stream containing dissolved salt, and associated methods. The system comprises, according to certain embodiments, a humidifier configured to produce a concentrated stream enriched in the dissolved salt relative to the aqueous inlet stream, and a precipitator in fluidic communication with a liquid outlet of the humidifier that precipitates at least a portion of the dissolved salt from the concentrated stream.

FIG. 1A is an exemplary schematic illustration of a system for treating aqueous stream, according to certain embodiments. In FIG. 1A, system 100 comprises humidifier 301 and precipitator 102. As illustrated in FIG. 1A, precipitator 102 is in fluidic communication with liquid outlet 104 of humidifier 301 via stream 106. In some embodiments, the precipitator is in direct fluidic communication with the liquid outlet of the humidifier.

In the humidifier, the gas may come into contact (e.g., direct or indirect contact) with at least a portion of the aqueous inlet stream. In some embodiments, the temperature of the liquid from the aqueous inlet stream is higher than the temperature of the gas, and upon contact of the gas and the liquid, heat and/or mass may be transferred from the liquid to the gas. According to certain embodiments, at least a portion of the water from the aqueous inlet stream is transferred to the gas via an evaporation (e.g., humidification) process, thereby producing a vapor-containing humidified gas (i.e., gas that contains vapor and is at least partially humidified, relative to the gas inlet stream) and a concentrated stream (which contains a higher concentration of dissolved salt(s) than the dissolved salt-containing aqueous inlet stream fed to the humidifier).

According to certain embodiments, the humidifier comprises a gas inlet in fluidic communication with a source of a gas. For example, in FIG. 1A, humidifier 301 comprises gas inlet 108 in fluidic communication with gas source 110 via gas inlet stream 112. A variety of types of gas may be used in association with the embodiments described herein, as described in more detail below. In some embodiments, the gas inlet of the humidifier is in direct fluidic communication with the source of the gas.

In some embodiments, the humidifier comprises a liquid inlet in fluidic communication with a source of the aqueous inlet stream that is treated by the system. For example, in FIG. 1A, humidifier 301 comprises liquid inlet 114 in fluidic communication with aqueous inlet stream source 116 via stream 118. As noted above, the aqueous inlet stream contains, according to certain embodiments, one or more dissolved salts. A variety of types of aqueous inlet streams may be used in association with the embodiments described herein, as described in more detail below. In some embodiments, the liquid inlet of the humidifier is in direct fluidic communication with the source of the aqueous inlet stream that is treated by the system.

In some embodiments, the humidifier is configured to produce a concentrated stream enriched in the dissolved salt relative to the aqueous inlet stream. For example, referring to FIG. 1A, humidifier 301 can be configured to produce concentrated stream 106, which can be enriched in the dissolved salt(s) contained within aqueous inlet stream 118, relative to aqueous inlet stream 118. Certain embodiments comprise transporting the aqueous inlet stream and a gas stream through a humidifier such that water is removed from the aqueous inlet stream to produce a concentrated stream enriched in the dissolved salt relative to the aqueous inlet stream. For example, referring to FIG. 1A, in some embodiments, aqueous inlet stream 118 and gas inlet stream 112 can be transported through humidifier 301 such that water is removed from aqueous inlet stream 118 to produce concentrated stream 106. Concentrated stream 106 can be enriched—relative to aqueous inlet stream 118—in the dissolved salt(s) contained within aqueous inlet stream 118. In some embodiments, water from the aqueous inlet stream may be evaporated into the gas. For example, in some embodiments, the gas may have a relatively low humidity, and upon exposure of the gas to the aqueous inlet stream, water from the aqueous inlet stream may be evaporated into the relatively low humidity gas stream.

In some embodiments, the humidifier comprises a liquid outlet that discharges the concentrated stream. For example, in FIG. 1A, humidifier 301 comprises liquid outlet 104, which discharges concentrated stream 106. In some embodiments, the humidifier comprises a gas outlet. For example, in FIG. 1A, humidifier 301 comprises gas outlet 120. The gas outlet can, according to certain embodiments, discharge a humidified gas stream (which is to say, a gas stream that has a higher humidity than the gas inlet stream). For example, in FIG. 1A, system 100 comprises humidified gas stream 122, through which humidified gas from humidifier 301 is transported.

According to certain embodiments, the humidifier comprises a plurality of stages within which the gas and the aqueous liquid interact to produce the concentrated stream and humidified gas. Such humidifiers can be referred to as "multi-stage" humidifiers.

In certain embodiments, the humidifier comprises a first stage comprising a first liquid layer comprising water from the aqueous inlet stream in liquid phase. For example, referring to FIG. 1A, humidifier 301 comprises first stage 124 comprising first liquid layer 126. Liquid layer 126 can contain water from aqueous inlet stream 118 in liquid phase. The first stage comprises, according to certain embodiments, a first vapor distribution region in fluid communication with the first liquid layer. For example, referring to FIG. 1A, humidifier 301 comprises first vapor distribution region 128 in fluid communication with first liquid layer 126. In some embodiments, the first vapor distribution region can be positioned above the first liquid layer. In certain embodiments, the first vapor distribution region can be in direct contact with the first liquid layer.

In some embodiments, the humidifier comprises at least one bubble generator. The bubble generator can be used, according to certain embodiments, to produce bubbles of gas within one or more liquid regions (e.g., one or more liquid layers) in the humidifier. Without wishing to be bound by any particular theory, it is believed that generating bubbles of gas within the liquid regions increases the surface area over which the liquid in the gas interact, which can lead to enhancements in the effectiveness with which water is transferred from the liquid phase to the gas phase within the humidifier.

In some embodiments, the first stage of the humidifier comprises a first bubble generator. The first bubble generator can be in fluidic communication with the gas inlet of the humidifier. For example, referring to FIG. 1A, first stage 124 of humidifier 301 comprises first bubble generator 130. First bubble generator 130 can be in fluidic communication with gas inlet 108, for example, via the space between gas inlet 108 and first bubble generator 130. In some embodiments, the first bubble generator is in direct fluidic communication with the gas inlet of the humidifier.

According to certain embodiments, gas may be transported through the first bubble generator such that the gas forms a plurality of bubbles within the first liquid layer of the first stage. For example, referring to FIG. 1A, in some embodiments, gas from gas inlet stream 112 (which may original from gas source 110), is transported through gas inlet 108 to first bubble generator 130. In some such embodiments, the gas is transported through first bubble generator 130 such that a plurality of bubbles containing gas from gas inlet stream 112 are formed within first liquid layer 126.

In some embodiments, water may be transported from the first liquid layer into the gas-containing bubbles during operation of the humidifier. In some cases, the gas bubbles flow through the first liquid layer of the first stage of the humidifier. As the gas bubbles contact the first liquid layer, which may have a higher temperature than the gas bubbles, heat and/or water may be transferred from the first liquid layer to the gas bubbles through an evaporation (e.g., humidification) process. For example, in some embodiments, after gas has been transported through first bubble generator 130 to produce bubbles of gas within first liquid layer 126, water may be transferred from first liquid layer 126 into the gas-containing bubbles via an evaporation process.

In some embodiments, the gas-containing bubbles may be subsequently transported to the vapor distribution region of the first stage. For example, bubbles of heated, humidified gas can exit the first liquid layer and recombine in the first vapor distribution region. In some such embodiments, the heated, humidified gas is substantially evenly distributed throughout the first vapor distribution region. Referring to FIG. 1A, for example, after water has been transported from first liquid layer 126 into the gas-containing bubbles contained within first liquid layer 126, the gas-containing bubbles may be transported to first vapor distribution region 128 of first stage 124, where they may recombine. In some embodiments, the transfer of water from the first liquid layer to the gas-containing bubbles produces a first liquid layer that is relatively concentrated in dissolved salt(s) relative to the initial liquid layer present in the first stage, and a first vapor distribution region that is relatively humid compared to the gas inlet stream. For example, in FIG. 1A, transfer of water from first liquid layer 126 to gas-containing bubbles within first liquid layer 126 and subsequent transport of those bubbles to first vapor distribution region 128 results in the concentration of dissolved salt(s) within first liquid layer 126 and the humidification of first vapor distribution region 128.

In certain embodiments, the humidifier comprises a second stage comprising a second liquid layer comprising water from the aqueous inlet stream in liquid phase. For example, referring to FIG. 1A, humidifier 301 comprises second stage 132 comprising second liquid layer 134. Second liquid layer 134 can contain water from aqueous inlet stream 118. The second stage comprises, according to certain embodiments, a second vapor distribution region in fluid communication with the second liquid layer. For example, referring to FIG. 1A, humidifier 301 comprises second vapor distribution region 136 in fluid communication with second liquid layer 134. In some embodiments, the second vapor distribution region can be positioned above the second liquid layer. In certain embodiments, the second vapor distribution region can be in direct contact with the second liquid layer.

In some embodiments, the second stage of the humidifier comprises a second bubble generator. The second bubble generator can be in fluidic communication with the first vapor distribution region. For example, referring to FIG. 1A, second stage 132 of humidifier 301 comprises second bubble generator 138. Second bubble generator 138 can be in fluidic communication with first vapor distribution region 128, for example, by positioning the second bubble generator next to the first vapor distribution region, as shown in FIG. 1A. In some embodiments, the second bubble generator is in direct fluidic communication with the first vapor distribution region.

According to certain embodiments, gas (e.g., humidified gas) may be transported through the second bubble generator such that the gas forms a plurality of gas-containing bubbles within the second liquid layer of the second stage. For example, referring to FIG. 1A, in some embodiments, gas from first vapor distribution region 128 is transported through second bubble generator 138 such that a plurality of bubbles containing gas from first vapor distribution region gas inlet stream 112 are formed within second liquid layer 134.

In some embodiments, water may be transported from the second liquid layer into the gas-containing bubbles within the second liquid layer during operation of the humidifier. In some cases, the gas bubbles flow through the second liquid layer of the second stage of the humidifier. As the gas bubbles contact the second liquid layer, which may have a higher temperature than the gas bubbles, heat and/or water may be transferred from the second liquid layer to the gas bubbles through an evaporation (e.g., humidification) process. For example, in some embodiments, after gas has been transported through second bubble generator 138 to produce gas-containing bubbles within second liquid layer 134, water may be transferred from second liquid layer 134 into the gas-containing bubbles via an evaporation process.

In some embodiments, the gas-containing bubbles may be subsequently transported to the vapor distribution region of the second stage. For example, bubbles of heated, humidified gas can exit the second liquid layer and recombine in the second vapor distribution region. In some such embodiments, the heated, humidified gas is substantially evenly distributed throughout the second vapor distribution region. Referring to FIG. 1A, for example, after water has been transported from second liquid layer 134 into the gas-containing bubbles contained within second liquid layer 134, the gas-containing bubbles may be transported to second vapor distribution region 136 of second stage 132, wherein they may recombine. In some embodiments, the transfer of water from the second liquid layer to the gas-containing bubbles produces a second liquid layer that is relatively concentrated in dissolved salt(s) relative to the initial liquid layer present in the second stage, and a second vapor distribution region that is relatively humid compared to the gas inlet stream and the first vapor distribution region. For example, in FIG. 1A, transfer of water from second liquid layer 134 to gas-containing bubbles within second liquid layer 134 and subsequent transport of those bubbles to second vapor distribution region 136 results in the concentration of dissolved salt(s) within second liquid layer 134 and the humidification of second vapor distribution region 136.

In some embodiments, the humidifier comprises an optional third stage comprising a third liquid layer comprising water from the aqueous inlet stream in liquid phase. The third stage can also comprise, according to certain embodiments, a third vapor distribution region in fluid communication with the third liquid layer. In some embodiments, the third vapor distribution region can be positioned above the third liquid layer. In certain embodiments, the third vapor distribution region can be in direct contact with the third liquid layer. In some embodiments, the third stage of the humidifier comprises a third bubble generator. The third bubble generator can be in fluidic communication with the second vapor distribution region. The fluidic connection between the third bubble generator and the second vapor distribution region may be achieved, for example, by positioning the third bubble generator next to the second vapor distribution region. In some embodiments, the third bubble generator is in direct fluidic communication with the second vapor distribution region.

According to certain embodiments, gas (e.g., humidified gas) may be transported through the third bubble generator such that the gas forms a plurality of gas-containing bubbles within the third liquid layer of the third stage. In some embodiments, water may be transported from the third liquid layer into the gas-containing bubbles within the third liquid layer during operation of the humidifier. In some cases, the gas bubbles flow through the third liquid layer of the third stage of the humidifier. As the gas bubbles contact the third liquid layer, which may have a higher temperature than the gas bubbles, heat and/or water may be transferred from the third liquid layer to the gas bubbles through an evaporation (e.g., humidification) process. In some embodiments, the gas-containing bubbles may be subsequently transported to the vapor distribution region of the third stage. For example, bubbles of heated, humidified gas can exit the third liquid layer and recombine in the third vapor distribution region. In some such embodiments, the heated, humidified gas is substantially evenly distributed throughout the third vapor distribution region. In some embodiments, the transfer of water from the third liquid layer to the gas-containing bubbles produces a third liquid layer that is relatively concentrated in dissolved salt(s) relative to the initial liquid layer present in the third stage, and a third vapor distribution region that is relatively humid compared to the gas inlet stream, the first vapor distribution region, and the second vapor distribution region.

It should be understood that the humidifier may have any number of stages. In some embodiments, the humidifier may have at least one, at least two, at least three, at least four, at least five, at least six, at least seven, at least eight, at least nine, or at least ten or more stages. One example of a humidifier comprising four stages is shown, for example, in FIG. 3B, described in more detail below. In some embodiments, the humidifier may have no more than one, no more than two, no more than three, no more than four, no more than five, no more than six, no more than seven, no more than eight, no more than nine, or no more than ten stages. In some embodiments, the stages may be arranged such that they are substantially parallel to each other. In certain cases, the stages may be positioned at an angle.

In some embodiments in which the humidifier comprises a plurality of stages, the stages may be arranged such that a gas flows sequentially from a first stage to a second stage. In some cases, the stages may be vertically arranged (e.g., a second stage may be positioned above or below a first stage of the humidifier) or horizontally arranged (e.g., a second stage may be positioned to the right or left of a first stage of the humidifier). In some embodiments, stages may be arranged such that a gas stream flows sequentially through a first stage, a second stage, a third stage, and so on. In some cases, each stage may comprise a liquid layer. In certain embodiments in which the humidifier comprises a plurality of stages, the temperature of a liquid layer of a first stage (e.g., the bottommost stage in a vertically arranged humidifier) may be lower than the temperature of a liquid layer of a second stage (e.g., a stage positioned above the first stage in a vertically arranged humidifier), which may be lower than the temperature of a liquid layer of an optional third stage (e.g., a stage positioned above the second stage in a vertically arranged humidifier). In some embodiments, each stage in a multi-stage humidifier operates at a temperature above that of the previous stage (e.g., the stage below it, in embodiments comprising vertically arranged humidifiers).

The presence of multiple stages within the humidifier may, in some cases, advantageously result in increased humidification of a gas. For example, the presence of multiple stages may provide numerous locations where the gas may be humidified. That is, the gas may travel through more than one liquid layer in which at least a portion of the gas undergoes humidification (e.g., evaporation). Additionally, the presence of multiple stages may, in certain cases, enable greater flexibility for fluid flow within the humidifier.

In some cases, at least one stage of the humidifier comprises a chamber. For example, in FIG. 1A, first stage 124 comprises a chamber within which first liquid layer 126 and first vapor distribution region 128 are located. The chamber may be, according to certain embodiments, in fluid communication with one or more bubble generators. For example, referring to FIG. 1A, the chamber of first stage 124 is in fluid communication with first bubble generator 130. In some cases, a liquid layer of the stage occupies a portion of the chamber. In some embodiments, a vapor distribution region comprises at least a portion of the chamber not occupied by the liquid layer. For example, the vapor distribution region can comprise at least a portion (or all) of the chamber space above the liquid layer. Referring to FIG. 1A, for example, first liquid layer 126 of first stage 124 occupies a first portion of the chamber of the first stage, and first vapor distribution region 128 occupies the portion of the chamber of first stage 124 that is not occupied by first liquid layer 126. Second stage 132 includes a chamber that is arranged in a similar manner.

In some embodiments, the humidifier comprises one or more vapor distribution region(s) positioned between two liquid layers of two consecutive stages. For example, referring to FIG. 1A, first vapor distribution region 128 is positioned between first liquid layer 126 of first stage 124 and second liquid layer 134 of second stage 132. The vapor distribution region may, in certain cases, advantageously damp out flow variations created by random bubbling by allowing a gas to redistribute evenly across the cross section of the humidifier. Additionally, in the free space of the vapor distribution region, large droplets entrained in the gas may have some space to fall back into the liquid layer before the gas enters the subsequent stage. The vapor distribution region may also serve to separate two subsequent stages, thereby increasing the thermodynamic effectiveness of the apparatus by keeping the liquid layers of each stage separate. As discussed in further detail below, the chamber may further comprise one or more weirs and/or baffles to control liquid flow through the chamber. The chamber may, additionally, comprise one or more conduits (e.g., liquid conduits) to adjacent stages.

The bubble generator(s) may have various features (e.g., holes) used for generation of bubbles. The selection of a bubble generator can affect the size and/or shape of the gas bubbles generated, thereby affecting heat and/or mass transfer between gas bubbles and a liquid layer in the humidifier. Appropriate bubble generator and/or bubble generator conditions (e.g., bubble generator speeds) may be selected to produce a particular desired set of gas bubbles. Non-limiting examples of suitable bubble generators include a sparger plate (e.g., a plate comprising a plurality of holes through which a gas can travel), a device comprising one or more perforated pipes (e.g., having a radial, annular, spider-web, or hub-and-spoke configuration), a device comprising one or more nozzles, and/or porous media (e.g., microporous metal).

Figure 2A:
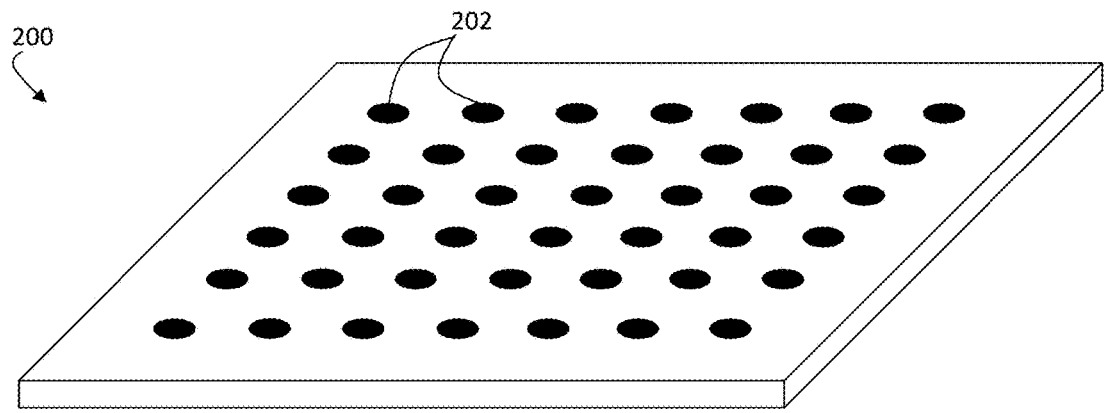
FIG. 2A is a perspective view of a bubble generator, according to certain embodiments.
Figure 2B:
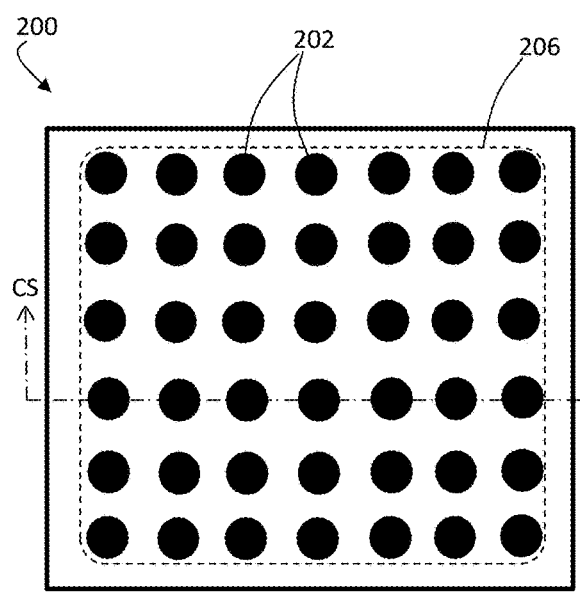
FIG. 2B is a top view of the bubble generator shown in FIG. 2A.
Figure 2C:
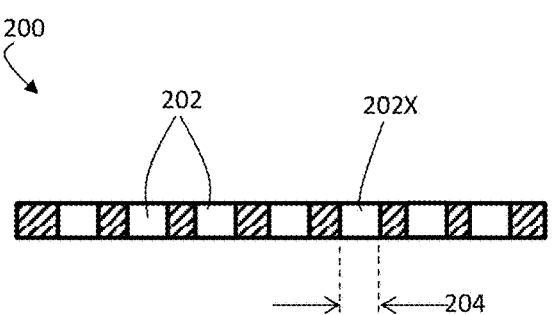
FIG. 2C is a cross-sectional schematic illustration of the bubble generator shown in FIGS. 2A and 2B.

In some embodiments, a bubble generator (e.g., the first bubble generator, the second bubble generator, the optional third bubble generator, and/or additional (optional) bubble generators) comprises a sparger plate. An exemplary sparger plate 200 is shown, for example, in FIGS. 2A-2C. FIG. 2A is a perspective view schematic illustration of sparger plate 200, FIG. 2B is a top view schematic illustration of sparger plate 200, and FIG. 2C is a cross-sectional schematic illustration of sparger plate 200 as taken through cross section line CS of FIG. 2B. The sparger plate can comprise a plurality of holes. For example, in FIGS. 2A-2C, sparger plate 200 comprises holes 202. It has been recognized that a sparger plate may, in certain cases, have certain advantageous characteristics. For example, the pressure drop across a sparger plate may be relatively low. Additionally, the simplicity of the sparger plate may render it inexpensive to manufacture and/or resistant to the effects of fouling.

According to some embodiments, the bubble generator (e.g., a sparger plate) comprises a plurality of holes, at least a portion (e.g., at least about 25%, at least about 50%, at least about 75%, at least about 90%, at least about 95%, or at least about 99%, by number) of which have a maximum cross-sectional dimension in the range of about 0.1 mm to about 50 mm, about 0.1 mm to about 25 mm, about 0.1 mm to about 15 mm, about 0.1 mm to about 10 mm, about 0.1 mm to about 5 mm, about 0.1 mm to about 1 mm, about 1 mm to about 50 mm, about 1 mm to about 25 mm, about 1 mm to about 15 mm, about 1 mm to about 10 mm, or about 1 mm to about 5 mm. The maximum cross-sectional dimension of a given hole corresponds to the largest distance between two opposed boundaries of the cross-section. The cross-section is generally taken along a plane that is perpendicular to the thickness of the bubble generator (and is generally taken along a plane that is perpendicular to the flow of gas through the bubble generator). For example, in FIG. 2C, hole 202X has a maximum cross-sectional dimension corresponding to dimension 204. The maximum cross sectional diameter of a hole with a circular cross-section corresponds to the diameter of the circular cross-section.

The holes may have any suitable shape. For example, at least a portion (e.g., at least about 25%, at least about 50%, at least about 75%, at least about 90%, at least about 95%, or at least about 99%, by number) of the plurality of holes may be substantially circular, substantially elliptical, substantially square, substantially rectangular, substantially triangular, and/or irregularly shaped.

In some cases, the bubble generator (e.g., sparger plate) may be arranged along the bottom surface of a stage within the humidifier. In some embodiments, the bubble generator (e.g., sparger plate) may have a surface area that covers at least about 50%, at least about 60%, at least about 70%, at least about 80%, at least about 90%, at least about 95%, or about 100% of a cross-section of the humidifier.

In certain cases, the humidifier comprises a gas distribution chamber. Referring to FIG. 1A, for example, humidifier 301 comprises gas distribution chamber 140. In some embodiments, the gas distribution chamber is in fluidic communication with the gas inlet of the humidifier. For example, in FIG. 1A, gas distribution chamber 140 is in fluidic communication with gas inlet 108 of humidifier 301.

In some embodiments, the gas distribution chamber is in direct fluidic communication with the gas inlet of the humidifier.

The gas distribution chamber may comprise a gas distribution region. For example, in FIG. 1A, gas distribution chamber 140 comprises gas distribution region 142. The gas distribution region may have, according to certain embodiments, sufficient volume to allow the gas to substantially evenly diffuse over the cross section of the humidifier. The gas distribution region of the gas distribution chamber generally refers to the space within the gas distribution chamber throughout which gas is distributed. In some cases, the gas distribution chamber further comprises a liquid layer (e.g., a liquid sump volume). Referring to FIG. 1A, for example, gas distribution chamber 140 comprises liquid layer 144. In some embodiments, liquid (e.g., comprising water in liquid phase and one or more dissolved salts) may collect in the liquid layer of the gas distribution chamber. In some cases, the liquid layer (e.g., liquid sump volume) of the humidifier is in fluidic communication with (e.g., in direct contact with) the liquid outlet of the humidifier. For example, referring to FIG. 1A, liquid layer 144 of gas distribution chamber 140 is in direct fluidic communication with liquid outlet 104 of humidifier 301. In certain embodiments, the liquid layer of the gas distribution chamber is in fluid communication (e.g., direct fluidic communication) with a pump that pumps liquid out of the humidifier. The liquid layer of the gas distribution chamber may, for example, provide a positive suction pressure on the intake of the pump, and may advantageously prevent negative (e.g., vacuum) suction pressure that could induce deleterious cavitation bubbles. In some cases, the liquid layer of the gas distribution region may advantageously decrease the sensitivity of the bubble column apparatus to sudden changes in heat transfer rates (e.g., due to intermittent feeding of salt-containing water to and/or intermittent discharge of concentrated stream from the apparatus). In certain embodiments, such as some embodiments in which the humidifier comprises a plurality of vertically-arranged stages, the gas distribution chamber is positioned at or near the bottom portion of the humidifier (e.g., below the first stage of the humidifier).

According to certain embodiments, one or more mixers, one or more splash bars, and/or one or more baffles is positioned within the liquid layer (e.g., sump volume) of the gas distribution chamber of the humidifier. According to some such embodiments, the mixer(s), splash bar(s), and/or baffle(s) can reduce or eliminate the degree to which quiescent zones of aqueous solution are formed, which can reduce the degree to which precipitation occurs within the liquid layer of the gas distribution chamber of the humidifier. The presence of the mixer(s), the splash bar(s), and/or the baffle(s) can, in some cases, inhibit or prevent the buildup of solids in the liquid layer of the gas distribution chamber. In some embodiments, at least one of the mixers positioned within the liquid layer of the gas distribution chamber of the humidifier is an eductor. Suitable eductors are commercially available, for example, from Spraying Systems Co. (Wheaton, IL), such as a Model Number 46550-3/4-PP.

Figure 3A:
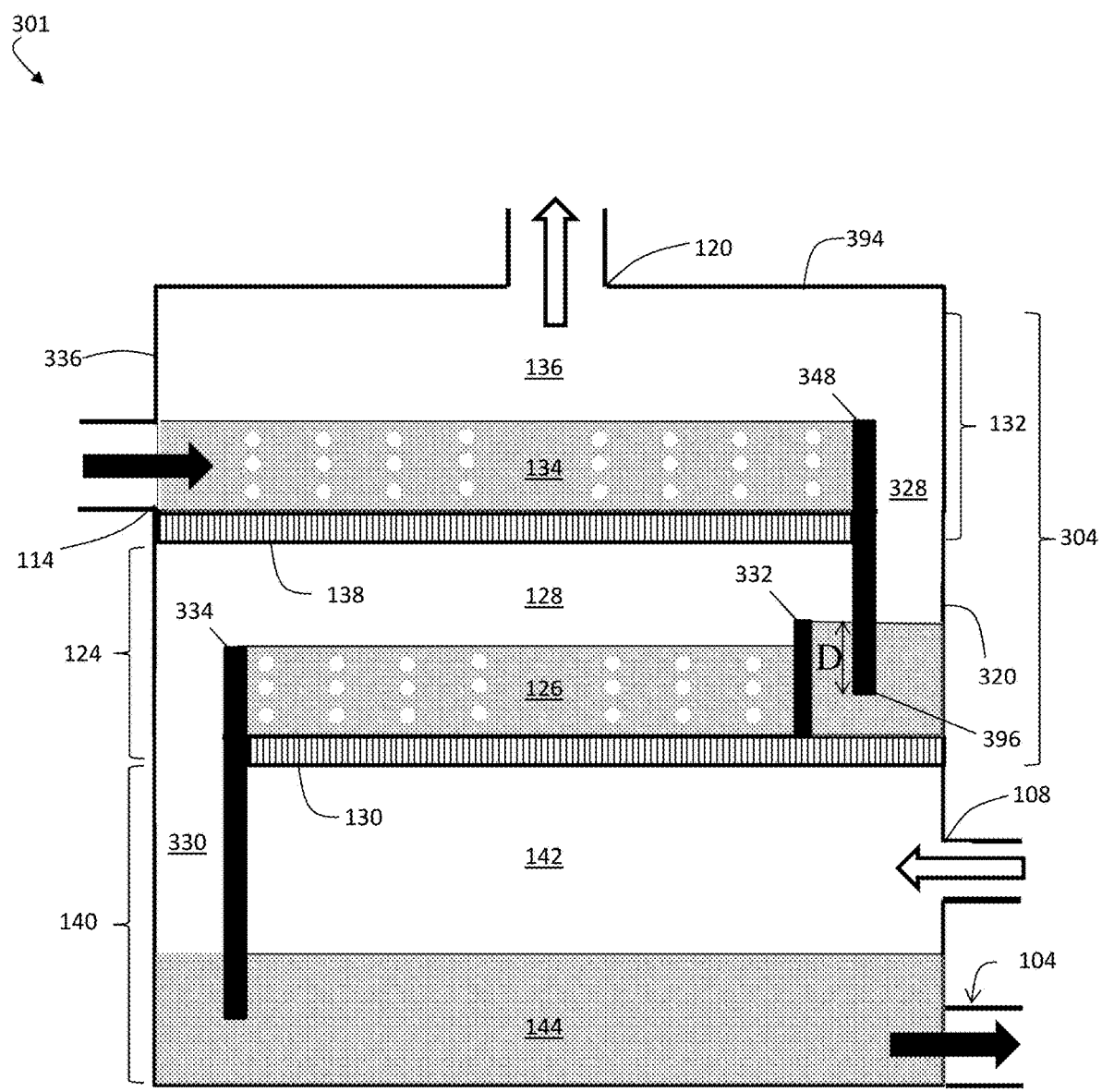
FIG. 3A is a cross-sectional schematic illustration of a humidifier, according to certain embodiments.

As noted above, in certain embodiments, the humidifier is a multi-stage bubble column humidifier. FIG. 3A shows a schematic cross-sectional diagram of an exemplary multi-stage bubble column humidifier, according to some embodiments. In FIG. 3A, combined multi-stage bubble column humidifier 301 comprises vessel 394 comprising gas distribution chamber 140 and humidification region 304. Humidification region 304 may be arranged vertically above gas distribution chamber 140. In some embodiments, humidifier 301 comprises gas inlet 108 and liquid outlet 104. Gas inlet 108 may be fluidly connected to a source of a first gas comprising a condensable fluid in vapor phase and/or a non-condensable gas (not shown in FIG. 3A). In some cases, gas distribution chamber 140 comprises a gas distribution region 142, throughout which a gas entering through gas inlet 108 is substantially evenly distributed (e.g., along a bottom surface of first bubble generator 130). In some embodiments, gas distribution chamber 140 further comprises liquid layer 144 (e.g., a sump volume) occupying at least a portion of gas distribution chamber 140 that is not occupied by gas distribution region 142. In some cases, liquid (which can be enriched in dissolved salt(s) relative to the aqueous inlet stream) collects in liquid layer 144 prior to exiting humidifier 301. As shown in FIG. 3A, liquid layer 144 may be in direct contact with humidifier liquid outlet 104. Liquid layer 144 and liquid outlet 104 may, in some cases, be in fluid communication with a pump (not shown in FIG. 3A) that pumps liquid out of humidifier 301. In some cases, liquid layer 144 may provide a positive suction pressure on the intake of the pump and may advantageously prevent negative suction pressure that may induce cavitation bubbles. Liquid layer 144 may also decrease the sensitivity of humidifier 301 to sudden changes in heat transfer rates.

As shown in FIG. 3A, humidifier 301 comprises first stage 124 and second stage 132, where second stage 132 is arranged vertically above first stage 124. First stage 124 comprises chamber 320, which is partially occupied by first liquid layer 126. In some cases, first liquid layer 126 comprises water in liquid phase and one or more dissolved salts. A first vapor distribution region 128 may occupy at least a portion of first humidification chamber 320 that is not occupied by first liquid layer 126 (e.g., the region above first liquid layer 126). First vapor distribution region 128 may be positioned between first liquid layer 126 of first stage 124 and second liquid layer 134 of second stage 132. In FIG. 3A, humidification chamber 320 is in fluid communication with first bubble generator 130, which may act as a gas inlet of first stage 124 and allow fluid communication between gas distribution chamber 140 and first stage 124, and second bubble generator 138, which may act as a gas outlet of first stage 124 and allow fluid communication between first stage 124 and second stage 132. First bubble generator 130 may occupy substantially the entire bottom surface of first stage 124 or may occupy a smaller portion of the bottom surface of first stage 124. Second bubble generator 138 may occupy substantially the entire top surface of second stage 132 or may occupy a smaller portion of the top surface of second stage 132. Chamber 320 may also be in fluid communication with downcomer 328, which provides a liquid conduit between first stage 124 and second stage 132, and downcomer 330, which provides a liquid conduit between first stage 124 and gas distribution chamber 140. Downcomer 328, which is positioned between first stage 124 and second stage 132, provides a path for any overflowing condensable fluid (e.g., from second liquid layer 134) to travel from second stage 132 to first stage 124.

First chamber 320 may also comprise one or more liquid flow structures (e.g., weirs and/or baffles). For example, as shown in FIG. 3A, first chamber 320 comprises first weir 332 and second weir 334. First weir 332 is positioned downstream of downcomer 328 and may form a pool surrounding the outlet of downcomer 328. The outlet of downcomer 328 may be submerged in the pool, thereby preventing the gas flowing through first stage 124 from flowing to second stage 132 through downcomer 328 instead of through second bubble generator 138. For example, in some cases, the pool of liquid surrounding the outlet of downcomer 328 has a height higher than the height of first liquid layer 126 (e.g., the height of weir 332 is higher than the height of first liquid layer 126). This may advantageously result in an increased hydrostatic head around downcomer 328, such that gas bubbles preferentially flow through first liquid layer 126 instead of through the pool of liquid surrounding downcomer 328 (e.g., the hydrostatic head of liquid that the gas has to overcome is higher in the pool of liquid surrounding downcomer 328 than in first liquid layer 126), preventing the gas from bypassing second bubble generator 138. In some cases, allowing the gas to flow through downcomer 328 to bypass second bubble generator 138 may have the deleterious effect of disrupting the flow of liquid through humidifier 301 and may, in certain cases, stop operation of humidifier 301 entirely. In certain embodiments, the pool of liquid surrounding downcomer 328 has a height higher than the height of first liquid layer 126 and higher than the height of second liquid layer 134. In certain cases, the portion of the bottom surface of chamber 320 around and/or beneath downcomer 328 (e.g., the portion of the bottom surface of chamber 320 between weir 332 and an end wall) is substantially impermeable to gas flow (e.g., does not comprise a bubble generator), and any pool of liquid surrounding downcomer 328 may have a height that is higher than, lower than, or equal to the height of first liquid layer 126 and/or second liquid layer 134. In some embodiments, the distance D (e.g., vertical distance) between the top of weir 332 and the bottom of the outlet of downcomer 328 (indicated as 396 in FIG. 3A) is greater than the height of second liquid layer 134. This may, in some cases, advantageously prevent back flow through downcomer 328. In certain embodiments, the distance D (e.g., vertical distance) between the top of weir 332 and the bottom of the outlet of downcomer 328 is greater than the height of first liquid layer 126 and greater than the height of second liquid layer 134. In some cases, second weir 334 is positioned upstream of downcomer 330 and establishes the maximum height of first liquid layer 126, such that any liquid above that height would flow over weir 334, through downcomer 330, to liquid layer 144. Weir 332 and weir 334 may be positioned such that liquid entering first stage 124 is directed to flow from first weir 332 to second weir 334.

Second stage 132 comprises chamber 336 and second liquid layer 134 positioned within chamber 336. In the embodiment illustrated in FIG. 3A, second liquid layer 134 is in fluid communication with liquid inlet 114, which may be fluidly connected to a source of an aqueous liquid comprising one or more dissolved salts. In embodiments in which the humidifier includes more than two stages, the liquid inlet may be positioned at a higher stage, such as the top-most stage (e.g., such that the liquid enters the third stage when three stages are present, the fourth stage when four stages are present, etc.).

In some embodiments, second vapor distribution region 136 occupies at least a portion of chamber 336 that is not occupied by second liquid layer 134 (e.g., the region above second liquid layer 134). In FIG. 3A, chamber 336 is in fluid communication with second bubble generator 138, which may act as a gas inlet of second stage 132 and allow fluid communication between first stage 124 and second stage 132. Second bubble generator 138 may occupy substantially the entire bottom surface of second stage 132 or may occupy a smaller portion of the bottom surface of second stage 132.

Chamber 336 may also be in fluid communication with downcomer 328. Chamber 336 may further comprise weir 348, which may be positioned upstream of downcomer 328. Weir 348 may establish the maximum height of second liquid layer 134, such that any liquid that would exceed the height of weir 348 would flow over weir 348, through downcomer 328, and into first liquid layer 126 of first stage 124. Weir 348 may be positioned such that liquid may flow across chamber 336 from liquid inlet 114 to weir 348.

In operation, a gas stream may be transported to humidifier 301 via humidifier gas inlet 108, which can be in fluid communication with gas distribution chamber 140. In gas distribution chamber 140, the first gas stream may be substantially homogeneously distributed throughout gas distribution region 142, along the bottom surface of first bubble generator 130. The gas stream may flow through first bubble generator 130, thereby forming a plurality of gas bubbles. The gas bubbles may then flow through first liquid layer 126, which may comprise water in liquid phase and one or more dissolved salts. As the gas bubbles flow through first liquid layer 126, which may have a higher temperature than the gas bubbles, heat and/or water may be transferred from first liquid layer 126 to the gas bubbles through an evaporation (e.g., humidification) process, such that the gas bubbles comprise the water in vapor phase. Bubbles of the at least partially humidified first gas may enter first vapor distribution region 128 of chamber 320 and recombine, resulting in the at least partially humidified first gas stream being substantially evenly distributed throughout first vapor distribution region 128.

The at least partially humidified gas stream may then enter chamber 336 of second stage 132, flowing through second bubble generator 138 and forming bubbles of the at least partially humidified gas. The gas bubbles may then flow through second liquid layer 134, which may have a higher temperature than the gas bubbles. As the gas bubbles flow through second liquid layer 134, they may undergo an evaporation process, and heat and/or mass may be transferred from second liquid layer 134 to the gas bubbles. After exiting second liquid layer 134, the gas bubbles may enter second vapor distribution region 136 of chamber 336, where they may recombine and form a further heated and humidified first gas stream that is substantially homogeneously distributed throughout second vapor distribution region 136. In some embodiments, the humidified gas within second vapor distribution region can be transported out of the humidifier, e.g., via gas outlet 120. In other embodiments, the humidified gas within second vapor distribution region 136 can be transported to a third stage, within which further humidification of the gas may occur.

In some embodiments, one or more liquid streams flows through humidifier 301 (e.g., in substantially the opposite direction as the gas stream). According to some embodiments, an aqueous liquid stream comprising at least one dissolved salt enters humidifier 301 through liquid inlet 114, which is in fluid communication with second liquid layer 134 of second stage 132. As the aqueous liquid stream flows across chamber 336, from liquid inlet 114 to weir 348, the aqueous liquid stream (e.g., as part of second liquid layer 134) may directly contact a plurality of gas bubbles having a temperature lower than the temperature of the aqueous liquid stream. Heat and/or water may be transferred from the first liquid stream to the gas bubbles through an evaporation (e.g., humidification) process, resulting in a cooled first liquid stream. If the height of second liquid layer 134 exceeds the height of weir 348, the cooled first liquid stream may flow over the top of weir 348, through downcomer 328, to a pool of liquid surrounding the outlet of downcomer 328. If the height of the pool of liquid exceeds the height of weir 332, the cooled first liquid stream may flow over the top of weir 332 to first liquid layer 126 of first stage 124. As the cooled first liquid stream flows across chamber 320 of first stage 124, from weir 332 to weir 334, the cooled first liquid stream (e.g., as part of first liquid layer 126) may directly contact a plurality of gas bubbles having a temperature lower than the cooled liquid stream. Heat and/or water may be transferred from the cooled first liquid stream to the gas bubbles through an evaporation process, resulting in a further cooled liquid stream. If the height of first liquid layer 126 exceeds the height of weir 334, the further cooled liquid stream may flow over the top of weir 334, through downcomer 330, to liquid layer 144. The further cooled first liquid stream may then exit humidifier 301 through liquid outlet 104. The further cooled first liquid stream may form at least a portion (e.g., at least about 50 wt %, at least about 75 wt %, at least about 90 wt %, at least about 95 wt %, at least about 99 wt %, or all) of concentrated stream 106.

While certain embodiments described above have been directed to a humidifier comprising a plurality of vertically arranged stages, other humidifier structures and/or arrangements could be employed. For example, in some cases, the humidifier comprises a plurality of stages that are horizontally arranged.

Figure 3B:
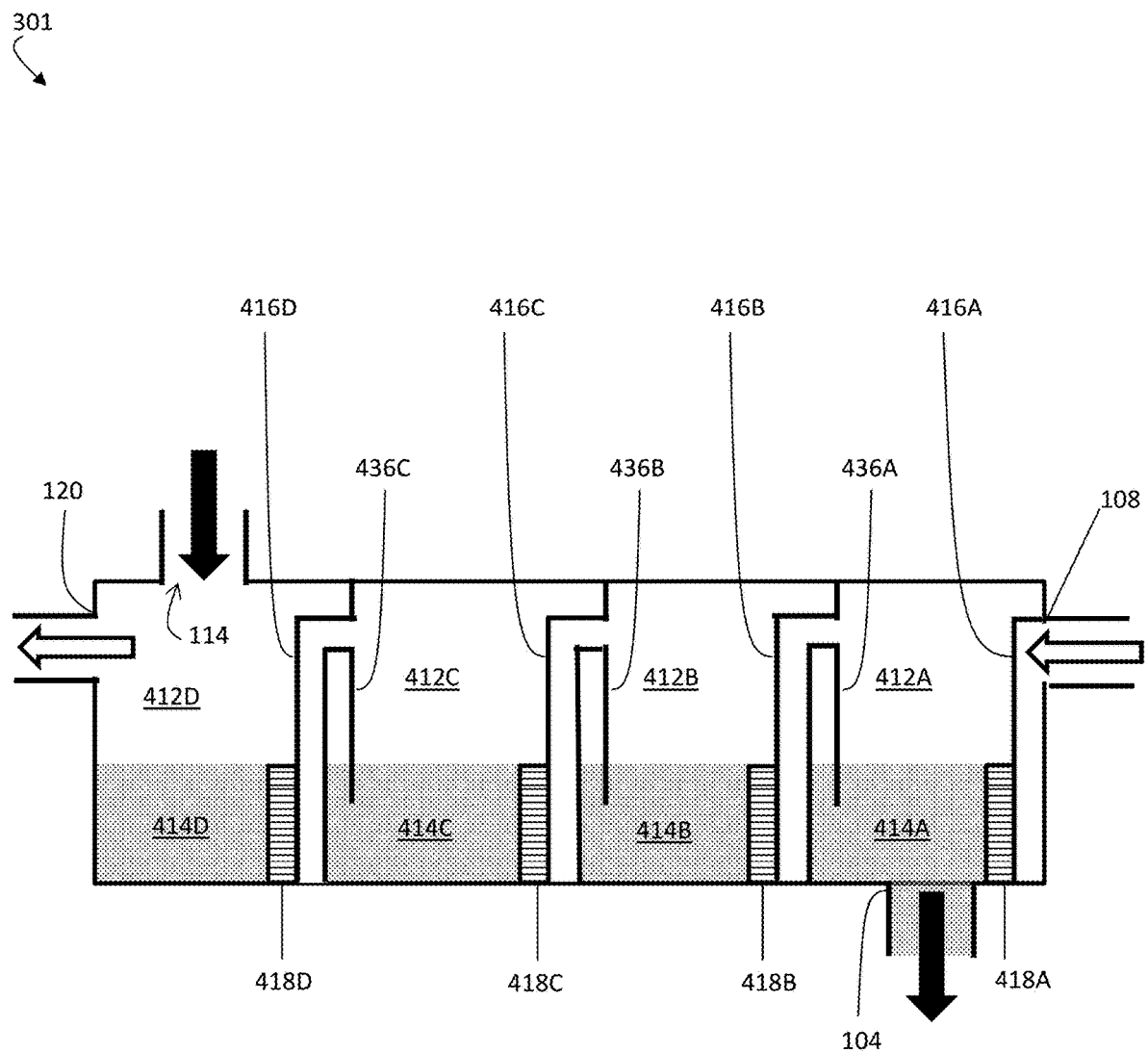
FIG. 3B is, according to some embodiments, a cross-sectional schematic illustration of a humidifier.

FIG. 3B shows, according to some embodiments, a schematic cross-sectional illustration of an exemplary humidifier 301 comprising horizontally arranged stages. As shown in FIG. 3B, humidifier 301 comprises gas inlet 108, liquid inlet 114, and liquid outlet 104. In addition, humidifier 301 comprises a plurality of horizontally arranged stages 412A-D. Each of stages 412A-D comprises a chamber comprising a liquid layer (e.g., one of liquid layers 414A-D) and a vapor distribution region above the liquid layer. Additionally, each of stages 412A-D further comprises a gas conduit (e.g., one of gas conduits 416A-D), and a bubble generator fluidly connected to the gas conduit (e.g., one of bubble generators 418A-D). As shown in FIG. 3B, at least a portion of the bubble generator of each stage is positioned below a top surface of the liquid layer of the stage, such that a gas flowing through the bubble generator generates gas bubbles that flow through the liquid layer of the stage. In a particular, non-limiting example, bubble generator 418A extends from a top surface of liquid layer 414A to a bottom surface of stage 412A. In certain embodiments, one or more bubble generators are positioned such that they extend across a bottom surface of a liquid layer of a stage (e.g., such that the gas flows beneath the one or more bubble generators and gas bubbles flow upwards through the liquid layers). FIG. 3B further shows that stages 412A-D are separated by a plurality of baffles 436A-C. In some embodiments, at least a portion of the baffles comprise a first end in contact with a top surface of a stage of the humidifier and a second end submerged in a liquid layer of the stage. In some cases, one or more gas conduits traverse one or more baffles. For example, in FIG. 3B, each of gas conduits 416B-D traverses (e.g., passes through) one of baffles 436A-C(e.g., gas conduit 416B traverses baffle 436A, gas conduit 416C traverses baffle 436B, gas conduit 416D traverses baffle 436C). The baffles thus may prevent a gas flowing through humidifier 301 from bypassing gas conduits 416A-D and bubble generators 418A-D.

In operation, a stream comprising a gas (e.g., a non-condensable gas) may flow through humidifier 301 in a first direction, and a liquid stream may flow through humidifier 301 in a second, substantially opposite direction. For example, as shown in FIG. 3B, a gas stream may flow from right to left through humidifier 301, while an aqueous liquid stream comprising one or more dissolved salts may flow from left to right through humidifier 301. In FIG. 3B, the gas stream enters humidifier 301 through gas inlet 108. The gas stream may enter first stage 412A of humidifier 301, flowing through gas conduit 416A to bubble generator 418A and forming a plurality of gas bubbles. The gas bubbles may subsequently travel through liquid layer 414A, which may have a higher temperature than the gas bubbles. In liquid layer 414A, heat and mass may be transferred from liquid layer 414A to the gas bubbles to produce heated, at least partially humidified gas bubbles. After traveling through liquid layer 414A, the gas bubbles may recombine in the vapor distribution region of first stage 412A positioned above liquid layer 414, substantially evenly distributing throughout the vapor distribution region. The heated, at least partially humidified gas stream may then enter second stage 412B, flowing through gas conduit 416B to bubble generator 418B. The gas stream may continue to flow from right to left through the humidifier, becoming increasingly heated and humidified as it flows through each stage of the humidifier. After flowing through each of stages 412A-D of humidifier 301, the heated, humidified gas stream may exit humidifier 301 via gas outlet 120.

While the gas stream flows from right to left through humidifier 301, an aqueous liquid stream comprising at least one dissolved salt may flow from left to right through humidifier 301. As shown in FIG. 3B, the liquid stream may enter humidifier 301 through liquid inlet 114, forming at least a portion of liquid layer 414D of fourth stage 412D. In fourth stage 412D, heat and water may be transferred from the liquid stream in liquid layer 414D to bubbles of the gas stream formed by bubble generator 418D, and the liquid stream may be cooled. In addition, due to water being transferred from the liquid stream to the bubbles of the gas stream, the liquid stream may become more concentrated (e.g., the concentration of one or more dissolved salts may increase). As the liquid stream flows through each of stages 412C, 412B, and 412A of humidifier 301, the temperature of the liquid stream may decrease, and the concentration of one or more dissolved salts in the stream may increase. The cooled, concentrated liquid stream may then exit humidifier 301 via liquid outlet 104.

Although certain embodiments of the humidifier described above depict the gas stream flowing from right to left and the aqueous liquid stream flowing from left to right, opposite orientations (i.e., the aqueous liquid stream flowing from right to left and the gas stream flowing from left to right) could also be employed.

The humidifier stages described herein may, according to certain embodiments, have inlets and/or outlets. For example, in some embodiments, the first stage can comprise a first stage gas inlet, a first stage gas outlet, a first stage liquid inlet, and a first stage liquid outlet. Similarly, the second stage can comprise a second stage gas inlet, a second stage gas outlet, a second stage liquid inlet, and a second stage liquid outlet. Additional stages, when present, can also include a gas inlet, a gas outlet, a liquid inlet, and a liquid outlet. In some cases, inlets and/or outlets of or within the humidifier (e.g., inlets and/or outlets of the humidifier and/or inlets and/or outlets of one or more stages of the humidifier) may be provided as separate and distinct structural elements/features. In some cases, inlets and/or outlets of or within the humidifier may be provided by certain components such as the bubble generator and/or any other features that establish fluid communication between components of the system. For example, the "gas inlet" and/or "gas outlet" of a stage may be provided as a plurality of holes of a bubble generator (e.g., a sparger plate). In some embodiments, at least one bubble generator is coupled to or corresponds to a gas inlet of a stage of the humidifier. In some embodiments, a bubble generator is coupled to or corresponds to a gas inlet of each stage of the humidifier. In some embodiments, at least one bubble generator is coupled to or corresponds to a gas outlet of a stage of the humidifier. In some embodiments, a bubble generator is coupled to or corresponds to a gas outlet of each stage of the humidifier except for the final stage through which gas is transported.

While humidifiers comprising multiple stages and/or bubble generators (e.g., such as multi-stage bubble column humidifiers) have been primarily described above, it should be understood that the present invention is not limited to the use of humidifiers comprising multiple stages or bubble generators, and in some embodiments, other types of humidifiers may be used. Examples of such humidifiers include, but are not limited to, packed bed humidifiers, spray towers humidifiers, and wetted wall tower humidifiers. Furthermore, as described above, the humidifier may be made up of only a single stage, according to certain embodiments.

As noted above, in some embodiments, during operation of the humidifier, the flow velocity of the gas can be relatively high. For example, referring to FIG. 1A, in some embodiments, the flow velocity of the gas (originating from gas inlet stream 112) through the bubble generator(s) of the humidifier can be relatively high. By maintaining a relatively high flow velocity of the gas in the humidifier, one can, according to certain embodiments, limit or avoid the creation of quiescent zones of liquid within the humidifier, which can reduce the degree to which unwanted precipitation occurs within the humidifier.

According to certain embodiments, during operation of the humidifier, the superficial flow velocity of the gas stream through the humidifier is at least about 50 cm/second, at least about 60 cm/second, at least about 75 cm/second, at least about 100 cm/second, at least about 125 cm/second, or at least about 150 cm/second. In certain embodiments, the superficial flow velocity of the gas stream through the humidifier is about 500 cm/second or less, about 400 cm/second or less, or about 200 cm/second or less. Combinations of these ranges are also possible (e.g., from about 50 cm/second to about 500 cm/second). The "superficial flow velocity" of the gas stream through the humidifier is calculated by dividing the volumetric flow rate of the gas stream through the humidifier by the maximum cross-sectional area over which the gas stream and the aqueous inlet stream interact. The maximum cross-sectional area over which the gas stream and the aqueous inlet stream interact corresponds to the largest planar cross-sectional area that is perpendicular to the flow direction of the gas stream and that spans the region over which the gas and the aqueous inlet stream form a combined flow. As an illustrative example, in cases in which gas is flowed through holes of a sparger plate and subsequently through a liquid entrained over the sparger plate, the cross-sectional area over which the aqueous stream and the gas interact corresponds to the facial area of the sparger plate over which the holes of the sparger plate are distributed. Referring to FIG. 2B for example, for sparger plate 200, the cross-sectional area over which the aqueous stream and the gas interact corresponds to the facial area within outline 206 (shown in dotted line in FIG. 2B). As another illustrative example, in cases in which the gas and liquid are transported through a packed column humidifier, the maximum cross-sectional area over which the gas stream and the aqueous stream interact corresponds to the largest internal cross-sectional area of the column. The cross-sectional areas of the column are measured across planes that are perpendicular to the flow of gas through the column.

In some embodiments, the pressure in the humidifier may be selected to be approximately ambient atmospheric pressure during operation. Those of ordinary skill in the art would understand that approximately ambient atmospheric pressure corresponds to the pressure within the normal variations caused by elevation and/or barometric pressure fluctuations in normal operations under various weather conditions and locations of installation. It may be desirable, in some embodiments, for the pressure in the humidifier to be less than approximately ambient atmospheric pressure during operation. For example, according to certain embodiments, the pressure in the humidifier may be selected to be about 90 kPa or less during operation. In some cases, as the pressure inside the humidifier decreases, the ability of the humidified carrier gas to carry more water vapor increases, allowing for increased production of the concentrated stream. Without wishing to be bound by any particular theory, this effect may be explained by the humidity ratio, which generally refers to the ratio of water vapor mass to dry air mass in moist air, being higher at pressures lower than atmospheric pressure.

In some embodiments, the humidifier may have a relatively low pressure drop during operation. As used herein, the pressure drop across an apparatus refers to the difference between the pressure of a gas stream entering the apparatus at an inlet and the pressure of a gas stream exiting the apparatus at an outlet. In FIG. 1A, for example, the pressure drop across humidifier 301 would be the difference between the pressure of the gas at gas inlet 108 and the pressure of the gas at gas outlet 120. It should be understood that, in this context, the pressure drop does not include the effect of pressure-increasing devices (e.g., fans, blowers, compressors, pumps). For example, the pressure drop would be obtained by subtracting the effect of one or more pressure-increasing devices on a gas stream from the difference between the pressure of the gas stream entering the apparatus at an inlet and the pressure of the gas stream exiting the apparatus at an outlet. In some embodiments, the pressure drop across the humidifier is about 200 kPa or less, about 150 kPa or less, about 100 kPa or less, about 75 kPa or less, about 50 kPa or less, about 20 kPa or less, about 15 kPa or less, about 10 kPa or less, about 5 kPa or less, about 2 kPa or less, or about 1 kPa or less. In certain embodiments, the pressure drop across the humidifier is in the range of about 1 kPa to about 2 kPa, about 1 kPa to about 5 kPa, about 1 kPa to about 10 kPa, about 1 kPa to about 15 kPa, about 1 kPa to about 20 kPa, about 1 kPa to about 50 kPa, about 1 kPa to about 75 kPa, about 1 kPa to about 100 kPa, about 1 kPa to about 150 kPa, or about 1 kPa to about 200 kPa. In some embodiments, the pressure of the gas at inlet 108 of humidifier 301 is substantially the same as the pressure of the gas at outlet 120 of humidifier 301 (i.e., the pressure drop is substantially zero).

In some embodiments, one or more stages of the humidifier have certain advantageous characteristics. Some of these characteristics may relate to the liquid layers of one or more stages of the humidifier. For example, in some cases, one or more stages may comprise liquid layers having relatively low heights.

As noted above, one or more stages of the humidifier may comprise a liquid layer. The liquid layer(s) may comprise, for example, an aqueous liquid comprising one or more dissolved salts. In some embodiments, the liquid layer of the humidifier stage comprises seawater, brackish water, water produced form an oil and/or gas extraction process, flowback water, and/or wastewater (e.g., industrial wastewater).

In some embodiments, the height of the liquid layer in one or more stages of the humidifier is relatively low during operation of the system. The height of the liquid layer within a stage is, in this context, measured as the vertical distance between the surface of the bubble generator that contacts the liquid layer and the top surface of the liquid layer.

Having a relatively low liquid layer height in at least one stage may, in some embodiments, advantageously result in a relatively low pressure drop between the inlet and outlet of an individual stage. Without wishing to be bound by a particular theory, the pressure drop across a given stage of the humidifier may be due, at least in part, to the hydrostatic head of the liquid in the stage that the gas has to overcome. Therefore, the height of the liquid layer in a stage may be advantageously kept low to reduce the pressure drop across that stage.

In addition, a relatively low liquid layer height may enhance heat and/or mass transfer. Without wishing to be bound by a particular theory, the theoretical maximum amount of heat and/or mass transfer may occur under conditions where the gas reaches the same temperature as the liquid and the amount of vapor in the gas is exactly at the saturation concentration. The total area available via the gas-liquid interface at the bubble surfaces and the residence time of the bubble in the liquid, which is determined by the liquid layer height in each stage (although above a minimum liquid layer height the performance is unaffected), may determine how close the heat and/or mass transfer gets to the aforementioned theoretical maximum. Therefore, it may be advantageous to maintain the liquid layer height at the minimum required to operate the system without affecting performance. In some cases, the liquid layer height is maintained at a height lower than the minimum height to reduce the energy associated with moving air through the system. Although hydrostatic head generally varies linearly with respect to liquid layer height, heat and/or mass transfer efficiency may vary exponentially. It has been discovered in the context of certain aspects of this invention that conditions in a bubble column humidifier may approach the maximum amount of heat and/or mass transfer at a liquid layer height of about 1-2 inches.

In some embodiments, during operation of the humidifier (e.g., substantially continuous operation and/or substantially transient operation), the liquid layer within at least one stage of the humidifier has a height of about 0.1 m or less, about 0.09 m or less, about 0.08 m or less, about 0.07 m or less, about 0.06 m or less, about 0.05 m or less, about 0.04 m or less, about 0.03 m or less, about 0.02 m or less, about 0.01 m or less, or, in some cases, about 0.005 m or less. In some embodiments, during operation of the humidifier (e.g., substantially continuous operation and/or substantially transient operation), the liquid layer within at least one stage of the humidifier has a height in the range of about 0 m to about 0.1 m, about 0 m to about 0.09 m, about 0 m to about 0.08 m, about 0 m to about 0.07 m, about 0 m to about 0.06 m, about 0 m to about 0.05 m, about 0 m to about 0.04 m, about 0 m to about 0.03 m, about 0 m to about 0.02 m, about 0 m to about 0.01 m, about 0 m to about 0.005 m, about 0.005 m to about 0.1 m, about 0.005 m to about 0.09 m, about 0.005 m to about 0.08 m, about 0.005 m to about 0.07 m, about 0.005 m to about 0.06 m, about 0.005 m to about 0.05 m, about 0.005 m to about 0.04 m, about 0.005 m to about 0.03 m, about 0.005 m to about 0.02 m, or about 0.005 m to about 0.01 m. In some embodiments, during operation of the humidifier (e.g., substantially continuous operation and/or substantially transient operation), the liquid layer within each stage of the humidifier has a height of about 0.1 m or less, about 0.09 m or less, about 0.08 m or less, about 0.07 m or less, about 0.06 m or less, about 0.05 m or less, about 0.04 m or less, about 0.03 m or less, about 0.02 m or less, about 0.01 m or less, or, in some cases, about 0.005 m or less. In some embodiments, during operation of the humidifier (e.g., substantially continuous operation and/or substantially transient operation), the liquid layer within each stage of the humidifier has a height in the range of about 0 m to about 0.1 m, about 0 m to about 0.09 m, about 0 m to about 0.08 m, about 0 m to about 0.07 m, about 0 m to about 0.06 m, about 0 m to about 0.05 m, about 0 m to about 0.04 m, about 0 m to about 0.03 m, about 0 m to about 0.02 m, about 0 m to about 0.01 m, about 0 m to about 0.005 m, about 0.005 m to about 0.1 m, about 0.005 m to about 0.09 m, about 0.005 m to about 0.08 m, about 0.005 m to about 0.07 m, about 0.005 m to about 0.06 m, about 0.005 m to about 0.05 m, about 0.005 m to about 0.04 m, about 0.005 m to about 0.03 m, about 0.005 m to about 0.02 m, or about 0.005 m to about 0.01 m.

In certain embodiments, the ratio of the height of the liquid layer in a stage of the humidifier to the length of the stage may be relatively low. The length of the stage refers to the largest internal cross-sectional dimension of the stage. In some embodiments, the ratio of the height of the liquid layer within at least one stage of the humidifier during operation of the humidifier (e.g., substantially continuous operation and/or substantially transient operation) to the length of the at least one stage is about 1.0 or less, about 0.8 or less, about 0.6 or less, about 0.5 or less, about 0.4 or less, about 0.2 or less, about 0.18 or less, about 0.16 or less, about 0.15 or less, about 0.14 or less, about 0.12 or less, about 0.1 or less, about 0.08 or less, about 0.06 or less, about 0.05 or less, about 0.04 or less, about 0.02 or less, about 0.01 or less, or, in some cases, about 0.005 or less. In some embodiments, the ratio of the height of the liquid layer within at least one stage of the humidifier during operation of the humidifier (e.g., substantially continuous operation and/or substantially transient operation) to the length of the at least one stage is in the range of about 0.005 to about 1.0, about 0.005 to about 0.8, about 0.005 to about 0.6, about 0.005 to about 0.5, about 0.005 to about 0.4, about 0.005 to about 0.2, about 0.005 to about 0.18, about 0.005 to about 0.16, about 0.005 to about 0.15, about 0.005 to about 0.14, about 0.005 to about 0.12, about 0.005 to about 0.1, about 0.005 to about 0.08, about 0.005 to about 0.06, about 0.005 to about 0.05, about 0.005 to about 0.04, about 0.005 to about 0.02, or about 0.005 to about 0.01. In some embodiments, the ratio of the height of the liquid layer within each stage of the humidifier during operation of the humidifier (e.g., substantially continuous operation and/or substantially transient operation) to the length of each corresponding stage is about 1.0 or less, about 0.8 or less, about 0.6 or less, about 0.5 or less, about 0.4 or less, about 0.2 or less, about 0.18 or less, about 0.16 or less, about 0.15 or less, about 0.14 or less, about 0.12 or less, about 0.1 or less, about 0.08 or less, about 0.06 or less, about 0.05 or less, about 0.04 or less, about 0.02 or less, about 0.01 or less, or, in some cases, about 0.005 or less. In certain embodiments, the ratio of the height of the liquid layer within each stage of the humidifier during operation of the humidifier to the length of each corresponding stage is in the range of about 0.005 to about 1.0, about 0.005 to about 0.8, about 0.005 to about 0.6, about 0.005 to about 0.5, about 0.005 to about 0.4, about 0.005 to about 0.2, about 0.005 to about 0.18, about 0.005 to about 0.16, about 0.005 to about 0.15, about 0.005 to about 0.14, about 0.005 to about 0.12, about 0.005 to about 0.1, about 0.005 to about 0.08, about 0.005 to about 0.06, about 0.005 to about 0.05, about 0.005 to about 0.04, about 0.005 to about 0.02, or about 0.005 to about 0.01.

In some embodiments, the height of an individual stage within the humidifier (e.g., measured vertically from the bubble generator positioned at the bottom of the stage to the top of the chamber within the stage) may be relatively low. As noted above, reducing the height of one or more stages may potentially reduce costs and/or potentially increase heat and mass transfer within the system. In some embodiments, the height of at least one stage of the humidifier is about 0.5 m or less, about 0.4 m or less, about 0.3 m or less, about 0.2 m or less, about 0.1 m or less, or, in some cases, about 0.05 m or less. In certain cases, the height of at least one stage of the humidifier is in the range of about 0 m to about 0.5 m, about 0 m to about 0.4 m, about 0 m to about 0.3 m, about 0 m to about 0.2 m, about 0 m to about 0.1 m, about 0 m to about 0.05 m, about 0.05 m to about 0.5 m, about 0.05 m to about 0.4 m, about 0.05 m to about 0.3 m, about 0.05 m to about 0.2 m, or about 0.05 m to about 0.1 m. In some embodiments, the height of each stage of the humidifier is about 0.5 m or less, about 0.4 m or less, about 0.3 m or less, about 0.2 m or less, about 0.1 m or less, or, in some cases, about 0.05 m or less. In certain cases, the height of each stage of the humidifier is in the range of about 0 m to about 0.5 m, about 0 m to about 0.4 m, about 0 m to about 0.3 m, about 0 m to about 0.2 m, about 0 m to about 0.1 m, about 0 m to about 0.05 m, about 0.05 m to about 0.5 m, about 0.05 m to about 0.4 m, about 0.05 m to about 0.3 m, about 0.05 m to about 0.2 m, or about 0.05 m to about 0.1 m.

In some embodiments, the pressure drop across a stage (i.e. the difference between inlet gas pressure and outlet gas pressure) for at least one stage of the humidifier is about 200 kPa or less, about 150 kPa or less, about 100 kPa or less, about 75 kPa or less, about 50 kPa or less, about 20 kPa or less, about 15 kPa or less, about 10 kPa or less, about 5 kPa or less, or about 1 kPa or less. In certain cases, the pressure drop across at least one stage of the humidifier is in the range of about 1 kPa to about 5 kPa, about 1 kPa to about 10 kPa, about 1 kPa to about 15 kPa, about 1 kPa to about 20 kPa, about 1 kPa to about 50 kPa, about 1 kPa to about 75 kPa, about 1 kPa to about 100 kPa, about 1 kPa to about 150 kPa, or about 1 kPa to about 200 kPa. In some embodiments, the pressure drop across at least one stage of the humidifier is substantially zero. In certain cases, the pressure drop across each stage of the humidifier is about 200 kPa or less, about 150 kPa or less, about 100 kPa or less, about 75 kPa or less, about 50 kPa or less, about 20 kPa or less, about 15 kPa or less, about 10 kPa or less, about 5 kPa or less, or about 1 kPa or less. In certain embodiments, the pressure drop across each stage of the humidifier is in the range of about 1 kPa to about 5 kPa, about 1 kPa to about 10 kPa, about 1 kPa to about 15 kPa, about 1 kPa to about 20 kPa, about 1 kPa to about 50 kPa, about 1 kPa to about 75 kPa, about 1 kPa to about 100 kPa, about 1 kPa to about 150 kPa, or about 1 kPa to about 200 kPa. According to certain embodiments, the pressure drop across each stage of the humidifier is substantially zero.

The stage(s) of the humidifier may have any shape suitable for a particular application. In some embodiments, at least one stage of the humidifier has a cross-sectional shape that is substantially circular, substantially elliptical, substantially square, substantially rectangular, substantially triangular, or irregularly shaped. In some embodiments, at least one stage of the humidifier has a relatively large aspect ratio. As used herein, the aspect ratio of a stage refers to the ratio of the length of the stage to the width of the stage. The length of the stage refers to the largest internal cross-sectional dimension of the stage (e.g., in a plane perpendicular to a vertical axis of the stage), and the width of the stage refers to the largest cross-sectional dimension of the stage (e.g., in a plane perpendicular to a vertical axis of the stage) measured perpendicular to the length.

In some embodiments, at least one stage of the humidifier has an aspect ratio of at least about 1.5, at least about 2, at least about 5, at least about 10, at least about 15, or at least about 20. In some embodiments, at least one stage of the humidifier has an aspect ratio in the range of about 1.5 to about 5, about 1.5 to about 10, about 1.5 to about 15, about 1.5 to about 20, about 2 to about 5, about 2 to about 10, about 2 to about 15, about 2 to about 20, about 5 to about 10, about 5 to about 15, about 5 to about 20, about 10 to about 15, about 10 to about 20, or about 15 to about 20. In some embodiments, each stage of the humidifier has an aspect ratio of at least about 1.5, at least about 2, at least about 5, at least about 10, at least about 15, or at least about 20. In some embodiments, each stage of the humidifier has an aspect ratio in the range of about 1.5 to about 5, about 1.5 to about 10, about 1.5 to about 15, about 1.5 to about 20, about 2 to about 5, about 2 to about 10, about 2 to about 15, about 2 to about 20, about 5 to about 10, about 5 to about 15, about 5 to about 20, about 10 to about 15, about 10 to about 20, or about 15 to about 20.

In some embodiments, one or more weirs in one or more stages of the humidifier are positioned within a chamber of the stage so as to control or direct flow of a liquid (e.g., within one stage and/or between two or more stages). The chamber(s) can have any of the properties (e.g., dimensions, aspect ratios, etc.) of the stages described elsewhere herein, in some embodiments.

In some embodiments, the maximum height of a liquid layer in one or more stages of the humidifier may be set by one or more weirs. As used herein, a weir refers to a structure that obstructs liquid flow in a stage. In some cases, a weir may be positioned adjacent or surrounding a region of the chamber where liquid may flow out of the chamber, for example, into a different chamber below. For example, if a weir is positioned upstream of a liquid outlet, any additional liquid that would cause the height of a liquid layer to exceed the height of the weir would flow over the weir and exit the stage through the liquid outlet.

In some embodiments, one or more weirs create a pool of liquid surrounding an outlet of a liquid conduit between two stages. In some embodiments, a weir is positioned adjacent or surrounding a region of the stage that receives a stream of liquid from, for example, a different chamber above the region or adjacent to the region. For example, a first stage may be positioned vertically below a second stage, and the liquid outlet of the second stage may be a downcomer that feeds into the first stage. A weir may be positioned immediately downstream of the downcomer, such that the weir either encircles the downcomer or extends all the way to the walls of the chamber to create a pool in which the outlet of the downcomer is submerged. The pool may prevent air from entering the downcomer. In some cases, the height of the pool is greater than the height of the liquid layer in the first stage (e.g., the height of the weir is greater than the height of the liquid layer in the first stage). Otherwise, the hydrostatic head for air sparging through the liquid layer in the first stage would be greater than the hydrostatic head required for air to flow up the downcomer. Accordingly, a pool height greater than the height of the liquid layer in the first stage may advantageously prevent air from flowing up the downcomer. In some embodiments, as additional liquid is introduced into the pool and the height of the liquid in the pool exceeds the height of the weir, excess liquid may flow over the top of the weir (e.g., into the liquid layer of the first stage). In certain embodiments, the distance (e.g., vertical distance) between the top of a weir creating a pool encircling a downcomer and the bottom of an outlet of the downcomer is greater than the height of the liquid layer in the second stage. In some cases, this may advantageously prevent back flow through the downcomer.

In some cases, a weir may be positioned within a chamber so as to not contact one or more walls of the chamber. In some cases, a weir may be positioned within a chamber so as to contact one or more walls of the chamber.

The one or more weirs may be selected to have a height that is less than the height of the chamber. In some embodiments, the height of the weirs may determine the maximum height for a liquid layer in the chamber. For example, if a liquid layer residing in a first chamber reaches a height that exceeds the height of a weir positioned along a bottom surface of the chamber, then at least a portion of the excess liquid may flow over the weir. In some cases, the excess liquid may flow into a second, adjacent chamber, e.g., a chamber positioned below the first chamber. In some embodiments, at least one weir in a chamber has a height of about 0.1 m or less, about 0.09 m or less, about 0.08 m or less, about 0.07 m or less, about 0.06 m or less, about 0.05 m or less, about 0.04 m or less, about 0.03 m or less, about 0.02 m or less, about 0.01 m or less, or, in some cases, about 0.005 m or less. In some embodiments, at least one weir in a chamber has a height in the range of about 0 m to about 0.1 m, about 0 m to about 0.09 m, about 0 m to about 0.08 m, about 0 m to about 0.07 m, about 0 m to about 0.06 m, about 0 m to about 0.05 m, about 0 m to about 0.04 m, about 0 m to about 0.03 m, about 0 m to about 0.02 m, about 0 m to about 0.01 m, about 0 m to about 0.005 m, about 0.005 m to about 0.1 m, about 0.005 m to about 0.09 m, about 0.005 m to about 0.08 m, about 0.005 m to about 0.07 m, about 0.005 m to about 0.06 m, about 0.005 m to about 0.05 m, about 0.005 m to about 0.04 m, about 0.005 m to about 0.03 m, about 0.005 m to about 0.02 m, or about 0.005 m to about 0.01 m. In some embodiments, each weir in a chamber has a height of about 0.1 m or less, about 0.09 m or less, about 0.08 m or less, about 0.07 m or less, about 0.06 m or less, about 0.05 m or less, about 0.04 m or less, about 0.03 m or less, about 0.02 m or less, about 0.01 m or less, or, in some cases, about 0.005 m or less. In some embodiments, each weir in a chamber has a height in the range of about 0 m to about 0.1 m, about 0 m to about 0.09 m, about 0 m to about 0.08 m, about 0 m to about 0.07 m, about 0 m to about 0.06 m, about 0 m to about 0.05 m, about 0 m to about 0.04 m, about 0 m to about 0.03 m, about 0 m to about 0.02 m, about 0 m to about 0.01 m, about 0 m to about 0.005 m, about 0.005 m to about 0.1 m, about 0.005 m to about 0.09 m, about 0.005 m to about 0.08 m, about 0.005 m to about 0.07 m, about 0.005 m to about 0.06 m, about 0.005 m to about 0.05 m, about 0.005 m to about 0.04 m, about 0.005 m to about 0.03 m, about 0.005 m to about 0.02 m, or about 0.005 m to about 0.01 m.

In some embodiments, one or more weirs may be positioned to promote the flow of a liquid across the length of the chamber in a substantially linear path. For example, the chamber may be selected to have a cross-sectional shape having a length that is greater than its width (e.g., a substantially rectangular cross-section), such that the weirs promote flow of liquid along the length of the chamber. In some cases, it may be desirable to promote such cross flow across a chamber to maximize the interaction, and therefore heat and/or mass transfer, between the liquid phase and the vapor phase of a condensable fluid.

The humidifiers described herein may further include one or more components positioned to facilitate, direct, or otherwise affect flow of a fluid within the humidifier. In some embodiments, at least one chamber of at least one stage of the humidifier may include one or more baffles positioned to direct flow of a fluid, such as a stream of the aqueous liquid. In certain cases, each chamber of the humidifier may comprise one or more baffles. Suitable baffles for use in embodiments described herein include plate-like articles having, for example, a substantially rectangular shape. Baffles may also be referred to as barriers, dams, or the like.

The baffle, or combination of baffles, may be arranged in various configurations so as to direct the flow of a liquid within the chamber. In some cases, the baffle(s) can be arranged such that liquid travels in a substantially linear path from one end of the chamber to the other end of the chamber (e.g., along the length of a chamber having a substantially rectangular cross-section). In some cases, the baffle(s) can be arranged such that liquid travels in a non-linear path across a chamber, such as a path having one or more bends or turns within the chamber. That is, the liquid may travel a distance within the chamber that is longer than the length of the chamber. In some embodiments, one or more baffles may be positioned along a bottom surface of at least one chamber within the humidifier, thereby affecting the flow of liquid that enters the chamber.

In some embodiments, a baffle may be positioned in a manner so as to direct flow of a liquid within a single chamber, e.g., along a bottom surface of a chamber in either a linear or non-linear manner. In some embodiments, one or more baffles may be positioned substantially parallel to the transverse sides (i.e., width) of a chamber having a substantially rectangular cross-sectional shape, i.e., may be a transverse baffle. In some embodiments, one or more baffles may be positioned substantially parallel to the longitudinal sides (i.e., length) of a chamber having a substantially rectangular cross-sectional shape, i.e., may be a longitudinal baffle. In such configurations, one or more longitudinal baffles may direct the flow of liquid along a substantially non-linear path. In some embodiments, one or more baffles may be positioned in a manner so as to direct flow of a liquid within a single chamber along a path that may promote enhanced efficiency of heat and/or mass transfer. For example, a chamber may comprise a liquid entering through a liquid inlet at a first temperature and a gas entering through a bubble generator at a second, different temperature. In certain cases, heat and mass transfer between the liquid and the gas may be increased when the first temperature approaches the second temperature. One factor that may affect the ability of the first temperature to approach the second temperature may be the amount of time the liquid spends flowing through the chamber.

In some cases, it may be advantageous for portions of the liquid flowing through the chamber to spend substantially equal amounts of time flowing through the chamber. For example, heat and mass transfer may undesirably be reduced under conditions where a first portion of the liquid spends a shorter amount of time in the chamber and a second portion of the liquid spends a longer amount of time in the chamber. Under such conditions, the temperature of a mixture of the first portion and the second portion may be further from the second temperature of the gas than if both the first portion and the second portion had spent a substantially equal amount of time in the chamber. Accordingly, in some embodiments, one or more baffles may be positioned in the chamber to facilitate liquid flow such that portions of the liquid flowing through the chamber spend substantially equal amounts of time flowing through the chamber. For example, one or more baffles within the chamber may spatially separate liquid located at the inlet (e.g., liquid likely to have spent a shorter amount of time in the chamber) from liquid located at the outlet (e.g., liquid likely to have spent a longer amount of time in the chamber). In some cases, one or more baffles within the chamber may facilitate liquid flow along flow paths having substantially the same length. For example, the one or more baffles may prevent a first portion of liquid from travelling along a substantially shorter path from the inlet of the chamber to the outlet of the chamber (e.g., along the width of a chamber having a rectangular cross section) and a second portion of liquid from travelling along a substantially longer path from the inlet of the chamber to the outlet of the chamber (e.g., along the length of a chamber having a rectangular cross section).

In some cases, it may be advantageous to increase the amount of time a liquid spends flowing through a chamber. Accordingly, in certain embodiments, one or more baffles may be positioned within a single chamber to facilitate liquid flow along a flow path having a relatively high aspect ratio (e.g., the ratio of the average length of the flow path to the average width of the flow path). For example, in some cases, one or more baffles may be positioned such that liquid flowing through the chamber follows a flow path having an aspect ratio of at least about 1.5, at least about 2, at least about 5, at least about 10, at least about 20, at least about 50, at least about 75, at least about 100, or more. In some embodiments, liquid flowing through the chamber follows a flow path having an aspect ratio in the range of about 1.5 to about 5, about 1.5 to about 10, about 1.5 to about 20, about 1.5 to about 50, about 1.5 to about 75, about 1.5 to about 100, about 5 to about 10, about 5 to about 20, about 5 to about 50, about 5 to about 75, about 5 to about 100, about 10 to about 20, about 10 to about 50, about 10 to about 75, about 10 to about 100, or about 50 to about 100.

Figure 4A:
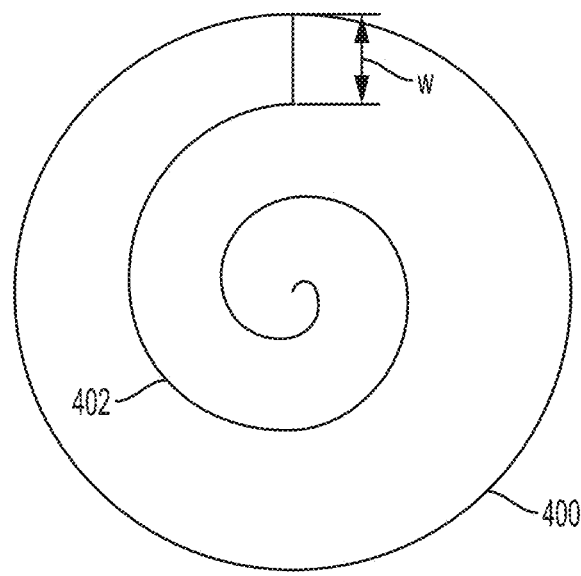
FIG. 4A is a schematic illustration of a stage comprising an exemplary baffle, according to certain embodiments.
Figure 4B:
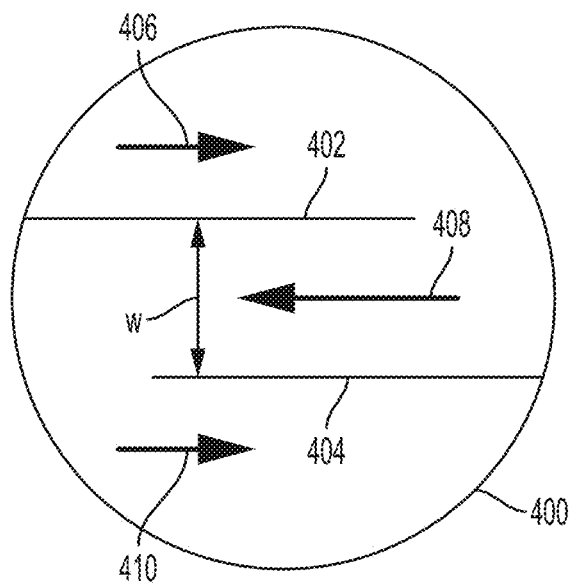
FIG. 4B is, according to some embodiments, a schematic illustration of a stage comprising an exemplary weaving baffle.

In some cases, the aspect ratio of a liquid flow path through a chamber may be larger than the aspect ratio of the chamber. In certain cases, the presence of baffles to increase the aspect ratio of a liquid flow path may facilitate the use of an apparatus having a relatively low aspect ratio (e.g., about 1), such as an apparatus having a substantially circular cross section. For example, FIG. 4A shows, according to some embodiments, a schematic illustration of an exemplary chamber 400 having a substantially circular cross section (e.g., bottom surface) and a spiral baffle 402, according to some embodiments. In operation, liquid may enter chamber 400 through a liquid inlet (not shown) positioned at or near the center of the substantially circular cross section. The liquid may then flow along spiral baffle 402 and exit chamber 400 through a liquid outlet (not shown) positioned at the upper edge of the substantially circular cross section. While the substantially circular cross section of chamber 400 has an aspect ratio of about 1, the aspect ratio of the liquid flow path is substantially greater than 1 (e.g., approximately 4.5). As an additional example, FIG. 4B shows, according to some embodiments, a schematic illustration of an exemplary chamber 400 having a substantially circular cross section (e.g., bottom surface) and comprising a first baffle 402 and a second baffle 404. In operation, liquid may enter chamber 400 through a liquid inlet (not shown) located in the upper left portion of the substantially circular cross section. The liquid may first flow in the direction of arrow 406. The liquid may then flow around baffle 402 and flow in the opposite direction, in the direction of arrow 408.

The liquid may then flow around baffle 404 and flow in the direction of arrow 410 and subsequently exit chamber 400 through a liquid outlet (not shown) located in the lower right portion of the substantially circular cross section. While the aspect ratio of the circular cross section of chamber 400 is about 1, the aspect ratio of the liquid flow path through chamber 400 is substantially greater than 1.

In some embodiments, the baffle is a longitudinal baffle. For example, a longitudinal baffle may extend along the length of a stage, from a first end to a second, opposing end. In some embodiments, there may be a gap between the longitudinal baffle and the first end and/or the second end of the stage, such that a liquid may flow around the longitudinal baffle (e.g., in a serpentine path). In some embodiments, a stage may comprise more than one longitudinal baffle. In some embodiments, at least one longitudinal baffle, at least two longitudinal baffles, at least three longitudinal baffles, at least four longitudinal baffles, at least five longitudinal baffles, at least ten longitudinal baffles, or more, are arranged within the chamber. In some embodiments, the chamber includes 1-10 longitudinal baffles, 1-5 longitudinal baffles, or 1-3 longitudinal baffles.

In some embodiments, the baffle is a transverse baffle (e.g., a horizontal baffle). In some cases, at least one transverse baffle, at least two transverse baffles, at least three transverse baffles, at least four transverse baffles, at least five transverse baffles, at least ten transverse baffles, or more, are arranged within the chamber. In some embodiments, the chamber includes 1-10 transverse baffles, 1-5 transverse baffles, or 1-3 transverse baffles.

The humidifier may comprise a vessel having any shape suitable for a particular application. In some embodiments, the vessel of the humidifier has a cross section that is substantially circular, substantially elliptical, substantially square, substantially rectangular, substantially triangular, or irregularly shaped. It has been recognized that it may be advantageous, in certain cases, for the vessel of the humidifier to have a substantially circular cross section. In some cases, a vessel having a substantially circular cross section (e.g., a substantially cylindrical vessel) may be easier to manufacture than a vessel having a cross section of a different shape (e.g., a substantially rectangular cross section). For example, for a substantially cylindrical vessel of a humidifier having a certain diameter (e.g., about 0.6 m or less), prefabricated pipes and/or tubes may be used to form the walls of the vessel of the humidifier. In addition, a substantially cylindrical humidifier vessel may be manufactured from a sheet material (e.g., stainless steel) by bending the sheet and welding a single seam. In contrast, a vessel of a humidifier having a cross section of a different shape may have more than one welded seam (e.g., a humidifier having a substantially rectangular cross section may have four welded seams). Further, a humidifier vessel having a substantially circular cross section may require less material to fabricate than a humidifier vessel having a cross section of a different shape (e.g., a substantially rectangular cross section). In certain embodiments, the vessel of the humidifier has a substantially parallelepiped shape, a substantially rectangular prismatic shape, a substantially cylindrical shape, a substantially pyramidal shape, and/or an irregular shape. In some cases, it may be advantageous for a vessel of the humidifier to have a relatively high aspect ratio. For example, in some cases, it may be advantageous for the humidifier vessel to have a substantially rectangular cross section.

The vessel of the humidifier may have any size suitable for a particular application. In some embodiments, the maximum cross-sectional dimension of the vessel of the humidifier is about 10 m or less, about 5 m or less, about 2 m or less, about 1 m or less, about 0.5 m or less, or about 0.1 m or less. In some cases, the vessel of the humidifier has a maximum cross-sectional dimension ranging from about 0.01 m to about 10 m, about 0.01 m to about 5 m, about 0.01 m to about 1 m, about 0.5 m to about 10 m, about 0.5 m to about 5 m, about 0.5 m to about 1 m, about 1 m to about 5 m, or about 1 m to about 10 m.

The vessel of the humidifier may comprise any suitable material. In certain embodiments, the vessel of the humidifier comprises stainless steel, aluminum, and/or a plastic (e.g., polyvinyl chloride, polyethylene, polycarbonate). In some embodiments, it may be advantageous to minimize heat loss from the vessel of the humidifier to the environment. In some cases, the exterior and/or the interior of the vessel of the humidifier may comprise a thermally insulating material. For example, the vessel of the humidifier may be at least partially coated, covered, or wrapped with a thermally insulating material. Non-limiting examples of suitable thermally insulating materials include elastomeric foam, fiberglass, ceramic fiber mineral wool, glass mineral wool, phenolic foam, polyisocyanurate, polystyrene, and polyurethane.

As noted above, the humidifier may be configured to receive an aqueous inlet stream containing at least one dissolved salt. A dissolved salt generally refers to a salt that has been solubilized to such an extent that the component ions (e.g., an anion, a cation) of the salt are no longer ionically bonded to each other. Non-limiting examples of dissolved salts that may be present in the liquid include sodium chloride (NaCl), sodium bromide (NaBr), potassium chloride (KCl), potassium bromide (KBr), sodium carbonate ($Na_2CO_3$), sodium sulfate ($Na_2SO_4$), calcium chloride ($CaCl_2$)), calcium sulfate ($CaSO_4$), magnesium sulfate ($MgSO_4$), strontium sulfate ($SrSO_4$), barium sulfate ($BaSO_4$), barium-strontium sulfate ($BaSr(SO_4)_2$), iron (III) hydroxide ($Fe(OH)_3$), iron (III) carbonate ($Fe_2(CO_3)_3$), aluminum hydroxide ($Al(OH)_3$), aluminum carbonate ($Al_2(CO_3)_3$), boron salts, and/or silicates.

In certain cases, the aqueous inlet stream comprises seawater, brackish water, flowback water, water produced from an oil or gas extraction process, and/or wastewater (e.g., industrial wastewater). Non-limiting examples of wastewater include textile mill wastewater, leather tannery wastewater, paper mill wastewater, cooling tower blowdown water, flue gas desulfurization wastewater, landfill leachate water, and/or the effluent of a chemical process (e.g., the effluent of another desalination system and/or chemical process).

In some embodiments, the aqueous inlet stream can further comprise one or more additional liquids (e.g., the liquid may be a liquid mixture).

In some embodiments, the aqueous inlet stream has a relatively high concentration of one or more dissolved salts. In certain embodiments, the concentration of one or more dissolved salts in the aqueous inlet stream is at least about 100 mg/L, at least about 200 mg/L, at least about 500 mg/L, at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 102,000 mg/L, at least about 110,000 mg/L, at least about 120,000 mg/L, at least about 150,000 mg/L, at least about 175,000 mg/L, at least about 200,000 mg/L, at least about 210,000 mg/L, at least about 219,000 mg/L, at least about 220,000 mg/L, at least about 250,000 mg/L, at least about 275,000 mg/L, at least about 300,000 mg/L, at least about 310,000 mg/L, at least about 312,000 mg/L, at least about 320,000 mg/L, at least about 350,000 mg/L, or at least about 375,000 mg/L (and/or, in certain embodiments, up to the solubility limit of the one or more dissolved salts in the liquid stream). In some embodiments, the concentration of one or more dissolved slats in the aqueous inlet stream is in the range of about 100 mg/L to about 375,000 mg/L, about 1,000 mg/L to about 10,000 mg/L, about 1,000 mg/L to about 50,000 mg/L, about 1,000 mg/L to about 75,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 375,000 mg/L, about 10,000 mg/L to about 50,000 mg/L, about 10,000 mg/L to about 75,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 375,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 375,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 375,000 mg/L, about 102,000 mg/L to about 219,000 mg/L, about 102,000 mg/L to about 312,000 mg/L, about 150,000 mg/L to about 200,000 mg/L, about 150,000 mg/L to about 250,000 mg/L, about 150,000 mg/L to about 300,000 mg/L, about 150,000 mg/L to about 350,000 mg/L, about 150,000 mg/L to about 375,000 mg/L, about 200,000 mg/L to about 250,000 mg/L, about 200,000 mg/L to about 300,000 mg/L, about 200,000 mg/L to about 350,000 mg/L, about 200,000 mg/L to about 375,000 mg/L, about 250,000 mg/L to about 300,000 mg/L, about 250,000 mg/L to about 350,000 mg/L, about 250,000 mg/L to about 375,000 mg/L, about 300,000 mg/L to about 350,000 mg/L, or about 300,000 mg/L to about 375,000 mg/L. The concentration of a dissolved salt generally refers to the combined concentrations of the cation and the anion of the salt. For example, the concentration of dissolved NaCl would refer to the sum of the concentration of sodium ions ($Na^+$) and the concentration of chloride ions ($Cl^-$). The concentration of a dissolved salt may be measured according to any method known in the art. For example, methods for measuring the concentration of a dissolved salt include inductively coupled plasma (ICP) spectroscopy (e.g., inductively coupled plasma optical emission spectroscopy). As one non-limiting example, an Optima 8300 ICP-OES spectrometer may be used.

In some embodiments, the aqueous inlet stream contains at least one dissolved salt in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the at least one dissolved salt in the liquid stream). In some embodiments, the aqueous inlet stream comprises at least one dissolved salt in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

According to some embodiments, the aqueous inlet stream has a relatively high total dissolved salt concentration (i.e., the total concentration of all dissolved salts in the aqueous inlet stream). In certain cases, the total dissolved salt concentration of the aqueous inlet stream is at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 110,000 mg/L, at least about 120,000 mg/L, at least about 150,000 mg/L, at least about 175,000 mg/L, at least about 200,000 mg/L, at least about 210,000 mg/L, at least about 220,000 mg/L, at least about 250,000 mg/L, at least about 275,000 mg/L, at least about 300,000 mg/L, at least about 310,000 mg/L, at least about 320,000 mg/L, at least about 350,000 mg/L, at least about 375,000 mg/L, at least about 400,000 mg/L, at least about 450,000 mg/L, or at least about 500,000 mg/L (and/or, in certain embodiments, up to the solubility limit of the dissolved salt(s) in the aqueous inlet stream). In some embodiments, the total dissolved salt concentration of the aqueous inlet stream is in the range of about 1,000 mg/L to about 10,000 mg/L, about 1,000 mg/L to about 20,000 mg/L, about 1,000 mg/L to about 50,000 mg/L, about 1,000 mg/L to about 75,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 400,000 mg/L, about 1,000 mg/L to about 450,000 mg/L, about 1,000 mg/L to about 500,000 mg/L, about 10,000 mg/L to about 20,000 mg/L, about 10,000 mg/L to about 50,000 mg/L, about 10,000 mg/L to about 75,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 20,000 mg/L to about 50,000 mg/L, about 20,000 mg/L to about 75,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, or about 100,000 mg/L to about 500,000 mg/L.

In some embodiments, the aqueous inlet stream has a total dissolved salt concentration of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the dissolved salt(s) in the liquid stream). In some embodiments, the humidifier aqueous inlet stream has a total dissolved salt concentration in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the aqueous inlet stream contains two or more dissolved salts. The concentration of a plurality of dissolved salts generally refers to the combined concentrations of all the cations and anions of the dissolved salts. As a simple, non-limiting example, in a liquid stream comprising dissolved NaCl and dissolved $MgSO_4$, the total dissolved salt concentration would refer to the sum of the concentrations of the $Na^+$, $Cl^-$, $Mg^{2+}$, and $SO_4^{2-}$ ions.

According to certain embodiments, the aqueous liquid stream can be heated before it is transported to the humidifier. For example, referring to FIG. 1A, aqueous inlet stream 118 may, in some embodiments, be heated before it is transported to humidifier 301. According to certain embodiments, the amount of heat transferred to the aqueous inlet stream during the heat step raises the temperature of the aqueous inlet stream by at least about 1° C., at least about 2° C., at least about 3° C., at least about 4° C., at least about 5° C., at least about 10° C., or at least about 25° C., relative to the temperature the aqueous inlet stream would be under identical operating conditions but in the absence of the heating step. Heat may be added to the aqueous inlet stream using any suitable heating device. For example, a standalone heater may be used to heat the aqueous inlet stream before the aqueous inlet stream is transported to the humidifier. In some embodiments, heat from another part of the system (e.g., a dehumidifier, when present) can be used to heat the aqueous inlet stream before the aqueous inlet stream is transported to the humidifier.

According to certain embodiments, the aqueous liquid stream can be contained within a tank prior to being transported to the humidifier. For example, in FIG. 1B, aqueous inlet liquid (e.g., from source stream 162) can be contained within feed tank 160 prior to being transported to humidifier 301.

In some embodiments, the aqueous feed stream can be mixed prior to being transported to the humidifier. For example, in FIG. 1B, feed tank 160 includes optional mixer 164. The mixer may be used, according to certain embodiments, to inhibit or prevent the formation of quiescent zones within the aqueous feed liquid (e.g., within the feed tank or at some other location) prior to the aqueous feed liquid being transported to the humidifier. In some embodiments, feed tank 160 comprises one or more splash bars and/or one of more baffles, which can be configured to inhibit or prevent the formation of quiescent zones within the feed tank. Inhibiting or preventing the formation of quiescent zones within the aqueous feed liquid can reduce or eliminate the amount of precipitation of dissolved salt that occurs in the feed stream. The presence of the mixer(s), the splash bar(s), and/or the baffle(s) can, in some cases, inhibit or prevent the buildup of solids in the feed tank and/or the feed stream. In some embodiments, at least one of the mixers positioned within the feed tank is an eductor. Suitable eductors are commercially available, for example, from Spraying Systems Co. (Wheaton, IL), such as a Model Number 46550-3/4-PP.

As noted above, the humidifier may be configured to receive a gas from a source via at least one gas inlet. In some cases, the gas comprises at least one non-condensable gas. A non-condensable gas generally refers to a gas that cannot be condensed from gas phase to liquid phase under the operating conditions of the humidifier. Examples of suitable non-condensable gases include, but are not limited to, air, nitrogen, oxygen, helium, argon, carbon monoxide, carbon dioxide, sulfur oxides ($SO_x$) (e.g., $SO_2$, $SO_3$), and/or nitrogen oxides ($NO_x$) (e.g., $NO$, $NO_2$). In some embodiments, in addition to the at least one non-condensable gas, the gas further comprises one or more additional gases (e.g., the gas may be a gas mixture).

The source gas may be stored, according to certain embodiments, in any suitable type of gas storage container, which are generally known to those of ordinary skill in the art. The source of gas may be, according to certain embodiments, the ambient environment.

According to some embodiments, the concentrated stream that exits the humidifier (e.g., stream 106 in FIG. 1A) has a relatively high concentration of one or more dissolved salts. In certain embodiments, the concentration of one or more dissolved salts in the concentrated stream is at least about 100 mg/L, at least about 200 mg/L, at least about 500 mg/L, at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, or at least about 500,000 mg/L (and/or, in certain embodiments, up to the solubility limit of the one or more dissolved salts in the concentrated stream). In some embodiments, the concentration of one or more dissolved salts in the concentrated stream is in the range of about 1,000 mg/L to about 10,000 mg/L, about 1,000 mg/L to about 20,000 mg/L, about 1,000 mg/L to about 50,000 mg/L, about 1,000 mg/L to about 100,000 mg/L, about 1,000 mg/L to about 150,000 mg/L, about 1,000 mg/L to about 200,000 mg/L, about 1,000 mg/L to about 250,000 mg/L, about 1,000 mg/L to about 300,000 mg/L, about 1,000 mg/L to about 350,000 mg/L, about 1,000 mg/L to about 400,000 mg/L, about 1,000 mg/L to about 450,000 mg/L, about 1,000 mg/L to about 500,000 mg/L, about 10,000 mg/L to about 20,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 20,000 mg/L to about 50,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 100,000 mg/L to about 150,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, or about 100,000 mg/L to about 500,000 mg/L.

In some embodiments, the concentrated stream contains at least one dissolved salt in an amount of at least about 1 wt %, at least about 5 wt %, at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the dissolved salt(s) in the concentrated stream). In some embodiments, the concentrated stream comprises at least one dissolved salt in an amount in the range of about 1 wt % to about 10 wt %, about 1 wt % to about 20 wt %, about 1 wt % to about 25 wt %, about 1 wt % to about 26 wt %, about 1 wt % to about 27 wt %, about 1 wt % to about 28 wt %, about 1 wt % to about 29 wt %, about 1 wt % to about 30 wt %, about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the concentration of one or more dissolved salts in the concentrated stream is substantially greater than the concentration of the one or more dissolved slats in the aqueous inlet stream received by the humidifier (e.g., stream 118 in FIG. 1A). In some cases, the concentration of one or more dissolved salts in the concentrated stream is at least about 0.5%, about 1%, about 2%, about 5%, about 10%, about 15%, or about 20% greater than the concentration of the one or more dissolved salts in the aqueous inlet stream received by the humidifier.

According to some embodiments, the concentrated stream has a relatively high total dissolved salt concentration (i.e., the total concentration of all dissolved salts present in the concentrated stream). In certain cases, the concentrated stream has a total dissolved salt concentration of at least about 1,000 mg/L, at least about 2,000 mg/L, at least about 5,000 mg/L, at least about 10,000 mg/L, at least about 20,000 mg/L, at least about 50,000 mg/L, at least about 75,000 mg/L, at least about 100,000 mg/L, at least about 150,000 mg/L, at least about 200,000 mg/L, at least about 250,000 mg/L, at least about 300,000 mg/L, at least about 350,000 mg/L, at least about 400,000 mg/L, at least about 450,000 mg/L, at least about 500,000 mg/L, at least about 550,000 mg/L, or at least about 600,000 mg/L (and/or, in certain embodiments, up to the solubility limit of the dissolved salt(s) in the concentrated stream). In some embodiments, the total dissolved salt concentration of the concentrated stream is in the range of about 10,000 mg/L to about 20,000 mg/L, about 10,000 mg/L to about 50,000 mg/L, about 10,000 mg/L to about 100,000 mg/L, about 10,000 mg/L to about 150,000 mg/L, about 10,000 mg/L to about 200,000 mg/L, about 10,000 mg/L to about 250,000 mg/L, about 10,000 mg/L to about 300,000 mg/L, about 10,000 mg/L to about 350,000 mg/L, about 10,000 mg/L to about 400,000 mg/L, about 10,000 mg/L to about 450,000 mg/L, about 10,000 mg/L to about 500,000 mg/L, about 10,000 mg/L to about 550,000 mg/L, about 10,000 mg/L to about 600,000 mg/L, about 20,000 mg/L to about 50,000 mg/L, about 20,000 mg/L to about 100,000 mg/L, about 20,000 mg/L to about 150,000 mg/L, about 20,000 mg/L to about 200,000 mg/L, about 20,000 mg/L to about 250,000 mg/L, about 20,000 mg/L to about 300,000 mg/L, about 20,000 mg/L to about 350,000 mg/L, about 20,000 mg/L to about 400,000 mg/L, about 20,000 mg/L to about 450,000 mg/L, about 20,000 mg/L to about 500,000 mg/L, about 20,000 mg/L to about 550,000 mg/L, about 20,000 mg/L to about 600,000 mg/L, about 50,000 mg/L to about 100,000 mg/L, about 50,000 mg/L to about 150,000 mg/L, about 50,000 mg/L to about 200,000 mg/L, about 50,000 mg/L to about 250,000 mg/L, about 50,000 mg/L to about 300,000 mg/L, about 50,000 mg/L to about 350,000 mg/L, about 50,000 mg/L to about 400,000 mg/L, about 50,000 mg/L to about 450,000 mg/L, about 50,000 mg/L to about 500,000 mg/L, about 50,000 mg/L to about 550,000 mg/L, about 50,000 mg/L to about 600,000 mg/L, about 100,000 mg/L to about 200,000 mg/L, about 100,000 mg/L to about 250,000 mg/L, about 100,000 mg/L to about 300,000 mg/L, about 100,000 mg/L to about 350,000 mg/L, about 100,000 mg/L to about 400,000 mg/L, about 100,000 mg/L to about 450,000 mg/L, about 100,000 mg/L to about 500,000 mg/L, about 100,000 mg/L to about 550,000 mg/L, or about 100,000 mg/L to about 600,000 mg/L.

In some embodiments, the concentrated stream has a total dissolved salt concentration of at least about 10 wt %, at least about 15 wt %, at least about 20 wt %, at least about 25 wt %, at least about 26 wt %, at least about 27 wt %, at least about 28 wt %, at least about 29 wt %, or at least about 30 wt % (and/or, in certain embodiments, up to the solubility limit of the dissolved salt(s) in the concentrated stream). In some embodiments, the concentrated stream has a total dissolved salt concentration in the range of about 10 wt % to about 20 wt %, about 10 wt % to about 25 wt %, about 10 wt % to about 26 wt %, about 10 wt % to about 27 wt %, about 10 wt % to about 28 wt %, about 10 wt % to about 29 wt %, about 10 wt % to about 30 wt %, about 20 wt % to about 25 wt %, about 20 wt % to about 26 wt %, about 20 wt % to about 27 wt %, about 20 wt % to about 28 wt %, about 20 wt % to about 29 wt %, about 20 wt % to about 30 wt %, about 25 wt % to about 26 wt %, about 25 wt % to about 27 wt %, about 25 wt % to about 28 wt %, about 25 wt % to about 29 wt %, or about 25 wt % to about 30 wt %.

In some embodiments, the concentrated stream has a substantially greater total dissolved salt concentration than the aqueous inlet stream received by the humidifier. In some cases, the total dissolved salt concentration of the concentrated stream is at least about 5%, at least about 6%, at least about 10%, at least about 14%, at least about 15%, at least about 20%, or at least about 25% greater than the total dissolved salt concentration of the aqueous inlet stream received by the humidifier.

In some embodiments, the humidifier is configured such that the liquid inlet is positioned at a first end (e.g., a top end) of the humidifier, and the gas inlet is positioned at a second, opposite end (e.g., a bottom end) of the humidifier. Such a configuration may facilitate the flow of a liquid stream in a first direction (e.g., downwards) through the humidifier and the flow of a gas stream in a second, substantially opposite direction (e.g., upwards) through the humidifier, which may advantageously result in high thermal efficiency.

In certain embodiments, the system for treating the aqueous inlet stream comprises a precipitator in fluidic communication (e.g., in direct fluid communication) with the liquid outlet of the humidifier. The precipitator can precipitate at least a portion of the dissolved salt from the concentrated stream. For example, referring to FIG. 1A, system 100 can comprise precipitator 102, which can precipitate at least a portion of the dissolved salt from concentrated stream 106. The precipitate may be in the form of, for example, crystalline particles, partially crystalline particles, and/or amorphous particles.

Certain embodiments comprise precipitating, within the precipitator, at least a portion of the dissolved salt from the concentrated stream to produce an aqueous product stream containing less of the dissolved salt relative to the concentrated stream. For example, referring to FIG. 1A, certain embodiments comprise precipitating, within precipitator 102, at least a portion of the dissolved salt from concentrated stream 106 to produce aqueous precipitator product stream 146, which contains less of the dissolved salt than concentrated stream 106.

In some embodiments, the precipitator can also produce a solid precipitated salt-containing product. For example, referring to FIG. 1A, in some embodiments, precipitate-containing product stream 148 can be removed from precipitator 102. The precipitate-containing product may be in the form of, for example, a suspension, a slurry, a sludge, and/or a solid discharge. According to certain embodiments, at least about 80 wt %, at least about 90 wt %, at least about 95 wt %, at least about 98 wt %, at least about 99 wt %, at least about 99.9 wt %, or all of the solid precipitate formed in and transported out of the precipitator is contained in one or more precipitate-containing product streams. According to certain embodiments, less than about 20 wt %, less than about 10 wt %, less than about 5 wt %, less than about 2 wt %, less than about 1 wt %, or less than about 0.1 wt %, or none of the solid precipitate formed in and transported out of the precipitator is contained within the aqueous precipitator product stream (e.g., stream 146 in FIG. 1A) that contains less of the dissolved salt relative to the concentrated stream fed to the precipitator. In some embodiments, the aqueous precipitator product stream (or streams) contains at least about 50 wt %, at least about 60 wt %, at least about 70 wt %, at least about 80 wt %, at least about 90 wt %, at least about 95 wt %, at least about 98 wt %, at least about 99 wt %, at least about 99.9 wt %, or all of the water that is fed to and subsequently transported out of the precipitator.

In some cases, the precipitator comprises a vessel, such as a settling tank. The vessel may include an inlet through which at least a portion of the concentrated stream (e.g., stream 106 in the case of FIG. 1A) produced by the humidifier is transported into the precipitator. The precipitator vessel may also include at least one outlet. For example the precipitator vessel may include an outlet through which the aqueous precipitator product stream (e.g., stream 146 in FIG. 1A)—containing less of the dissolved salt relative to the concentrated stream fed to the precipitator—is transported. In some embodiments, the precipitator vessel includes an outlet through which solid, precipitated salt is transported (e.g., via stream 148 in FIG. 1A). According to certain embodiments, the precipitator comprises a conical sludge thickener.

In some embodiments, the precipitator comprises a low shear mixer. The low shear mixer can be configured to keep the crystals that are formed mixed (e.g., homogeneously mixed) in the liquid contained within the precipitator. According to certain embodiments, the precipitator vessel is sized such that there is sufficient residence time for crystals to form and grow. In certain embodiments, the precipitator comprises a vessel which provides at least 20 minutes of residence time for the concentrated stream (e.g., stream 106 in FIG. 1A). As one non-limiting example, the vessel comprises, according to certain embodiments, a 6000 gallon vessel, which can be used to provide 24 minutes of residence in a 500 U.S. barrel per day fresh water production system. Those of ordinary skill in the art are capable of determining the residence time of a volume of fluid in a vessel. For a batch (i.e., non-flow) system, the residence time corresponds to the amount of time the fluid spends in the vessel. For a flow-based system, the residence time is determined by dividing the volume of the vessel by the volumetric flow rate of the fluid through the vessel.

In some embodiments, the precipitator comprises at least one vessel comprising a volume within which the concentrated stream is substantially quiescent. In some embodiments, the flow velocity of the fluid within the substantially quiescent volume is less than the flow velocity at which precipitation (e.g., crystallization) is inhibited. For example, the fluid within the substantially quiescent volume may have, in certain embodiments, a flow velocity of zero. In some embodiments, the fluid within the substantially quiescent volume may have a flow velocity that is sufficiently high to suspend the formed solids (e.g., crystals), but not sufficiently high to prevent solid formation (e.g., crystal nucleation). The substantially quiescent volume within the vessel may occupy, in some embodiments, at least about 1%, at least about 5%, at least about 10%, or at least about 25% of the volume of the vessel. As one particular example, the precipitator can comprise a vessel including a stagnation zone. The stagnation zone may be positioned, for example, at the bottom of the precipitation vessel. In certain embodiments, the precipitator can include a second vessel in which the solids precipitated in the first vessel are allowed to settle. For example, an aqueous stream containing the precipitated solids can be transported to a settling tank, where the solids can be allowed to settle. The remaining contents of the aqueous stream can be transported out of the settling tank. While the use of two vessels within the precipitator has been described, it should be understood that, in other embodiments, a single vessel, or more than two vessels may be employed.

In certain embodiments, the system (e.g., system 100 in FIG. 1A) can be operated such that a large majority of the precipitation of the salt occurs within the precipitator (e.g., within a stagnation zone of the precipitator). For example, in some embodiments, at least about 80 wt %, at least about 85 wt %, at least about 90 wt %, at least about 95 wt %, at least about 98 wt %, at least about 99 wt %, at least about 99.9 wt %, or at least about 99.99 wt % of the solid precipitate that is formed in the system is formed in the precipitator. In certain embodiments, substantially more precipitate is formed in the precipitator than is formed in the humidifier. For example, in some embodiments, the amount of solid precipitate formed in the precipitator makes up at least about 80 wt %, at least about 85 wt %, at least about 90 wt %, at least about 95 wt %, at least about 98 wt %, at least about 99 wt %, at least about 99.9 wt %, or at least about 99.99 wt % of the combined amount of solid precipitate that is formed in the humidifier and the precipitator. As a non-limiting illustrative example, in some embodiments, 99 kilograms of solid precipitate may be formed in the precipitator and 1 kilogram of solid precipitate may be formed in the humidifier, in which case, the amount of solid precipitate formed in the precipitator would make up 99 wt % of the combined amount of solid precipitate that is formed in the humidifier and the precipitator.

According to certain embodiments, a relatively large amount of precipitate is formed in the stagnation zone of the precipitator. In certain embodiments, at least about 80 wt %, at least about 85 wt %, at least about 90 wt %, at least about 95 wt %, at least about 98 wt %, at least about 99 wt %, at least about 99.9 wt %, or at least about 99.99 wt % of the solid precipitate that is formed in the system is formed in the stagnation zone of the precipitator. In some embodiments, the amount of solid precipitate formed in the stagnation zone of the precipitator makes up at least about 80 wt %, at least about 85 wt %, at least about 90 wt %, at least about 95 wt %, at least about 98 wt %, at least about 99 wt %, at least about 99.9 wt %, or at least about 99.99 wt % of the combined amount of solid precipitate that is formed in the humidifier and the precipitator. In some embodiments, the amount of solid precipitate formed in the stagnation zone of the precipitator makes up at least about 80 wt %, at least about 85 wt %, at least about 90 wt %, at least about 95 wt %, at least about 98 wt %, at least about 99 wt %, at least about 99.9 wt %, or at least about 99.99 wt % of the amount of solid precipitate that is formed in the precipitator.

According to certain embodiments, at least a portion (e.g., at least about 50 wt %, at least about 75 wt %, at least about 90 wt %, at least about 95 wt %, at least about 98 wt %, at least about 99 wt %, at least about 99.9 wt %, or all) of the aqueous precipitator product that contains less of the dissolved salt relative to the concentrated stream fed to the precipitator is recycled back to the humidifier. For example, as shown in FIG. 1A, aqueous precipitator product stream 146 is recycled back to humidifier 301 via optional recycle stream 150. While recycle stream 150 is shown as being merged with aqueous inlet stream 118 in FIG. 1A, it should be understood that at least a portion of the recycle stream from the precipitator to the humidifier could, in some cases, first be transported to the source of the aqueous inlet stream (e.g., source 116 in FIG. 1A) and/or could be fed directly into the humidifier (e.g., co-fed with stream 118 in FIG. 1A).

According to certain embodiments, the system further comprises an optional dewatering system. The dewatering system can, according to some embodiments, remove water from at least a portion of the precipitated salt produced by the precipitator. For example, referring to FIG. 1B, system 100 is illustrated as including optional dewatering system 152. Dewatering system 152 can, in some embodiments, remove at least a portion of the water retained by the precipitated salt after the precipitated salt exits the precipitator. In some embodiments, the dewatering system is configured to produce a cake comprising at least a portion of the precipitated salt from the precipitator. For example, referring to FIG. 1B, removing water within dewatering system 152 from at least a portion of precipitated salt containing stream 148 produced by precipitator 102 results in the production of a cake comprising at least a portion of the precipitated salt. The cake can be removed from dewatering system 152, for example, via pathway 154 illustrated in FIG. 1B. As one non-limiting example, the dewatering system can comprise a filter (e.g., a vacuum drum filter or a filter press) configured to at least partially separate the precipitated salt from the remainder of the feed (e.g., suspension, slurry, etc.) containing the precipitated salt. In some such embodiments, at least a portion of the liquid within the precipitate-containing feed can be transported through the filter, leaving behind solid precipitated salt. As one non-limiting example, a Larox FP 2016-8000 64/64 M40 PP/PP Filter (Outotec, Inc.) may be used as the filter. The filter may comprise, in certain embodiments, a conveyor filter belt which filters the salt from a suspension containing the salt.

According to certain embodiments, the dewatering system is configured to produce an aqueous dewatering system product stream. The aqueous dewatering system product stream can, in some embodiments, contain less of the precipitated salt than the stream transporting precipitated salt from the precipitator to the dewatering system. For example, referring to FIG. 1B, in some embodiments, removing water within dewatering system 152 results in the production of aqueous dewatering system product stream 156. Aqueous dewatering system product stream 156 can contain less of the precipitated salt than stream 148 used to transport precipitated salt from precipitator 102 to dewatering system 152.

Figure 1B:
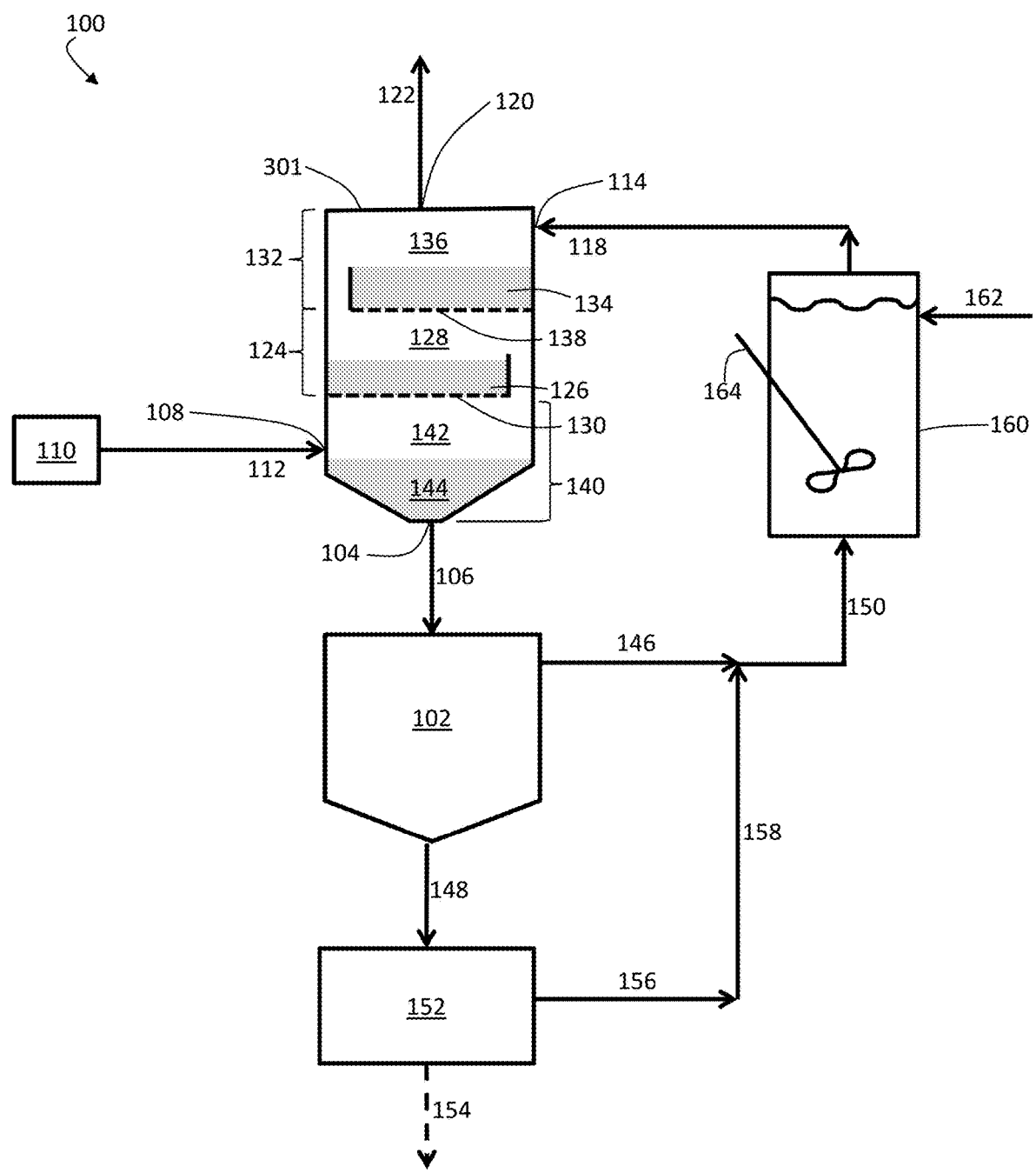
FIG. 1B is a schematic illustration of a system for treating an aqueous inlet stream, wherein the system comprises a dewatering system, according to some embodiments.

According to certain embodiments, at least a portion (e.g., at least about 50 wt %, at least about 75 wt %, at least about 90 wt %, at least about 95 wt %, at least about 98 wt %, at least about 99 wt %, at least about 99.9 wt %, or all) of the aqueous dewatering system product stream is recycled back to the humidifier. For example, as shown in FIG. 1B, aqueous dewatering system product stream 156 is recycled back to humidifier 301 via optional recycle stream 158 (and, subsequently, via recycle stream 150 and aqueous inlet stream 118). While recycle stream 158 is shown as being merged with recycle stream 150 in FIG. 1A, it should be understood that at least a portion of recycle stream 158 from the dewatering system could, in some cases, first be transported to aqueous inlet stream 118, the source of the aqueous inlet stream, and/or could be fed directly into the humidifier (e.g., co-fed with stream 118 in FIG. 1A, co-fed with streams 118 and/or stream 150 in FIG. 1B).

According to certain embodiments, the system for treating the aqueous liquid stream does not include a conduit that fluidically connects the gas outlet of the humidifier to a dehumidifier. In fact, in certain cases, the system for treating the aqueous liquid does not include any dehumidifier in fluidic communication with the humidifier. For example, as shown in FIG. 1A, there is no conduit fluidically connecting gas outlet stream 122 (or any other gas outlet stream) of humidifier 301 to a dehumidifier. In fact, in FIG. 1A, system 100 does not include any dehumidifier in fluidic communication with humidifier 301. Similarly, as shown in FIG. 1B, there is no conduit fluidically connecting gas outlet stream 122 (or any other gas outlet stream) of humidifier 301 to a dehumidifier and, in fact, in FIG. 1B, system 100 does not include any dehumidifier in fluidic communication with humidifier 301. In some embodiments, the vessel of the humidifier is not integrated with a dehumidifier (e.g., within a single vessel including both the humidifier and the dehumidifier). While systems that do not include a dehumidifier are generally shown and described, it should be understood that, in other embodiments, the humidifier gas stream (e.g., stream 122 in FIG. 1B) could be transported to a dehumidifier to produce, for example, a stream containing relatively pure water (e.g., containing water in an amount of at least about 95 wt %, at least about 98 wt %, at least about 99 wt %, at least about 99.9 wt %, at least about 99.99 wt %, or more). Examples of such dehumidifiers are described, for example, in U.S. patent application Ser. No. 14/485,606, filed on Sep. 12, 2014, published as U.S. Patent Publication No. 2015/0129410 on May 14, 2015, entitled "Systems Including a Condensing Apparatus Such as a Bubble Column Condenser"; International Patent Application No. PCT/US2014/055525, filed on Sep. 12, 2014, published as International Patent Publication No. WO 2015/038983 on Mar. 19, 2015, and entitled "Systems Including a Condensing Apparatus Such as a Bubble Column Condenser"; U.S. patent application Ser. No. 14/452,387, filed on Aug. 5, 2014, published as U.S. Patent Publication No. 2015/0060286 on Mar. 5, 2015, entitled "Water Treatment Systems and Associated Methods"; International Patent Application No. PCT/US2014/049812, filed on Aug. 5, 2014, published as International Patent Publication No. WO 2015/021062 on Feb. 12, 2015, and entitled "Water Treatment Systems and Associated Methods"; U.S. patent application Ser. No. 14/494,101, filed on Sep. 23, 2014, published as U.S. Patent Publication No. 2015/0083577 on Mar. 26, 2015, entitled "Desalination Systems and Associated Methods"; and International Patent Application No. PCT/US2014/056997, filed on Sep. 23, 2014, published as International Patent Publication No. WO 2015/042584 on Mar. 26, 2015, and entitled "Desalination Systems and Associated Methods"; each of which is incorporated herein by reference in its entirety for all purposes.

A variety of types of desalination apparatuses may be used in the embodiments described herein. In some embodiments, the desalination apparatus comprises a humidification-dehumidification desalination apparatus. In some embodiments, the humidification-dehumidification desalination apparatus is operated at a pressure below 1 atmosphere. In certain embodiments, the humidification-dehumidification desalination apparatus comprises a dehumidifier comprising a bubble column condenser. In some embodiments, the humidification-dehumidification desalination apparatus comprises a plurality of conduits configured to discretely vary the ratio of a mass flow rate of air to a mass flow rate of liquid at intermediate points in the humidifier and/or the dehumidifier.

Figure 5:
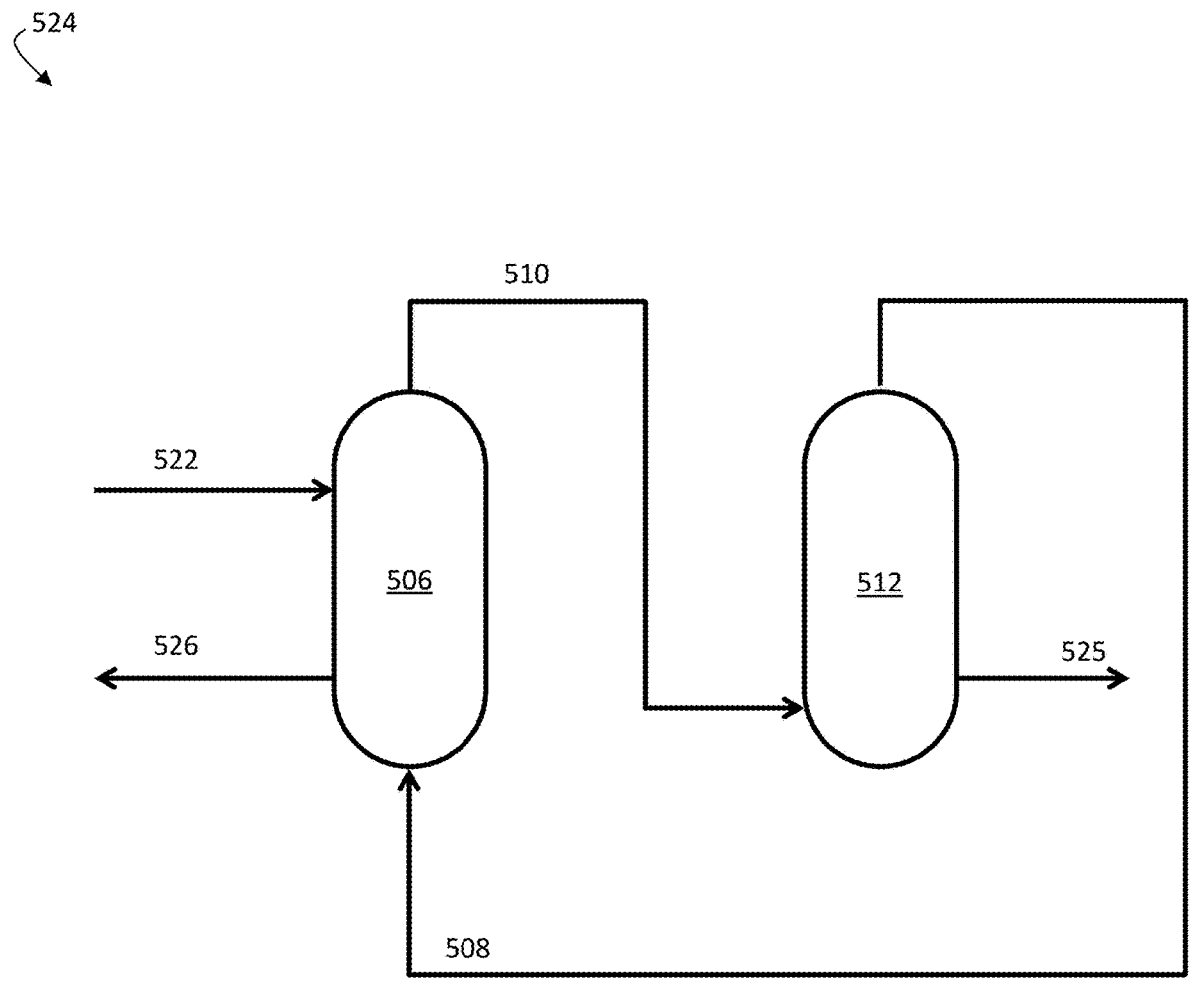
FIG. 5 is, according to some embodiments, a schematic illustration of an exemplary humidification-dehumidification desalination apparatus.

FIG. 5 is a schematic illustration of an exemplary humidification-dehumidification desalination apparatus 524 which may be used in association with certain of the inventive systems and methods described herein. In FIG. 5, desalination apparatus 524 comprises humidifier 506, which can be configured to receive stream 522. Humidifier 506 may also be configured to receive gaseous stream 508. Gaseous stream 508 may comprise any gas capable of carrying water vapor. For example, gaseous stream 508 may comprise air, nitrogen, oxygen, a noble gas (e.g., helium, argon, etc.), and/or any other suitable gas. Humidifier 506 can be configured, in some embodiments, such that water is evaporated from stream 522 into gaseous stream 508 to produce a humidified gaseous stream 510 and a concentrated saline stream 526. Desalination apparatus 524 further comprises dehumidifier 512 fluidically connected to humidifier 506. Dehumidifier 512 can be configured to condense at least a portion of the water from gaseous stream 510 to produce a water-containing stream 525 and a dehumidified gaseous stream.

In certain embodiments, the dehumidifier is directly fluidically connected to the humidifier. For example, in FIG. 5, dehumidifier 512 is directly fluidically connected (via streams 510 and 508) to humidifier 506. In other embodiments, the humidifier and dehumidifier can be arranged such that they are fluidically connected to each other but are not directly fluidically connected to each other.

The desalination apparatus may be operated as follows. A feed stream containing at least one dissolved salt (e.g., a dissolved monovalent salt) can be transported to the humidifier, according to certain embodiments. In some embodiments, water is removed from the stream fed to the desalination apparatus (e.g., an ion-diminished stream and/or another stream fed to the desalination apparatus) to produce a concentrated saline stream enriched in the dissolved monovalent salt relative to the feed stream. The concentrated saline stream can be produced, for example, by humidifying a gaseous stream. Referring to FIG. 5, for example, stream 522 containing at least one dissolved salt (e.g., at least one dissolved monovalent salt) and gaseous stream 508 can be fed to humidifier 506. In certain embodiments, humidifying the gaseous stream comprises contacting the gaseous stream with the stream fed to the desalination unit within the humidifier to evaporate at least a portion of the water from the feed stream into the gaseous stream. For example, in FIG. 5, water from stream 522 can be evaporated into gaseous stream 508 within humidifier 506 to produce a humidified gaseous stream 510 (which can contain water vapor) and a concentrated saline stream 526. Concentrated saline stream 526 can be transported away from the desalination apparatus and to a downstream processing apparatus.

Some embodiments comprise transporting the gaseous stream to a dehumidifier and condensing at least a portion of the water within the gaseous stream. For example, referring to FIG. 5, humidified gaseous stream 510 can be transported to dehumidifier 512, in which water can be condensed to form water-containing stream 525 and dehumidified gaseous stream 508. In certain embodiments, including the set of embodiments illustrated in FIG. 5, at least a portion of the dehumidified gaseous stream can be recycled to humidifier 506 (e.g., in a closed loop) and used to remove water from an aqueous solution fed to the humidifier. In other embodiments, the dehumidified stream from the dehumidifier can be transported elsewhere within the system and/or vented.

The humidifier may have any configuration that allows for the transfer of water from the desalination feed stream to the gaseous stream. In certain embodiments, the humidifier comprises a vessel (e.g., a stainless steel tank or other vessel). The humidifier vessel can comprise a first input configured to receive an aqueous saline feed stream (e.g., stream 522 in FIG. 5) and a second input configured to receive a gaseous stream into which water from the aqueous saline feed stream is vaporized.

In some embodiments, the humidifier comprises a device configured to produce droplets of the aqueous saline feed stream when the aqueous saline feed stream is transported through the device. For example, a nozzle or other spraying device may be positioned at the top of the humidifier such that the aqueous feed stream is sprayed downward to the bottom of the humidifier. The use of a spraying device can increase the degree of contact between the aqueous saline stream fed to the humidifier and the gaseous stream into which water from the aqueous saline stream is transported. In some such embodiments, the gaseous stream can be transported in a counter-current direction, relative to the direction along which the aqueous saline stream is transported. For example, the gaseous stream may be transported into the bottom of the humidifier, through the humidifier vessel, and out of the top of the humidifier. In certain embodiments, the remaining portion of water that is not transported from the aqueous saline feed stream to the gaseous stream is collected at or near the bottom of the humidifier and transported out of the humidifier (and out of the desalination system) as a concentrated saline stream (e.g., stream 526 in FIG. 5).

In certain embodiments, humidifier 506, stream 522, and/or stream 508 may be heated before and/or during the humidification step. Heating one or more of these streams may increase the degree to which water is transferred from the aqueous saline feed stream to the gaseous stream within the humidifier.

In some embodiments, humidifier 506 contains a packing material (e.g., polyvinyl chloride (PVC) packing material or other similar materials). The packing can facilitate turbulent gas flow and/or enhanced direct contact between the aqueous saline stream and the gaseous stream within the humidifier.

The humidifier may be of any size, which will generally depend upon the number of humidifier units employed in the system and the total flow rate of aqueous saline solution that is to be desalinated. In certain embodiments, the total of the volumes of the humidifiers used in the desalination system can be at least about 1 liter, at least about 10 liters, or at least about 100 liters (and/or, in some embodiments, up to about 1,000,000 liters, or more).

The dehumidifier may have any configuration that allows for the condensation of water from the vapor-containing gaseous stream fed to the dehumidifier. In certain embodiments, the dehumidifier comprises a vessel (e.g., a stainless steel tank or other vessel). The dehumidifier vessel can comprise a first input configured to receive a water-vapor-containing gaseous feed stream (e.g., stream 510 in FIG. 5). The dehumidifier vessel can comprise a first outlet configured to output a dehumidified gaseous stream (e.g., stream 508 in FIG. 5) and a second outlet configured to output a water-containing stream containing a relatively high percentage of water (e.g., stream 525 in FIG. 5).

In certain embodiments, the dehumidifier is configured such that the gaseous stream directly contacts a liquid within the dehumidifier. Configuring the dehumidifier such that direct contact between the gaseous stream and condensed liquid is maintained within the dehumidifier can be, in some embodiments, advantageous, as heat transfer to the gaseous phase may be enhanced in some such embodiments, leading to more energy efficient condensation of the water vapor from the gaseous phase.

In certain embodiments, the dehumidifier comprises a bubble column condenser. Referring to FIG. 5, for example, humidified gaseous stream 510 from humidifier 506 may be transported to the bottom of dehumidifier 512, after which, the contents of stream 510 may be contacted with a condensed liquid at the bottom of dehumidifier 512. As the contents of humidified gaseous stream 510 are transported through the liquid within dehumidifier 512, at least a portion of the water vapor may be condensed and held at the bottom of the dehumidifier. Condensed water at the bottom of the dehumidifier may be transported out of the dehumidifier via stream 525, and dehumidified gas may be transported out of the top of dehumidifier via stream 508.

The dehumidifier can comprise a single stage in which liquid and vapor-containing gas are contacted or multiple stages on which liquid and vapor-containing gas are contacted. Each stage of the bubble-column condenser may comprise a bubble generator, such as a sieve plate, at the bottom of the stage. During operation, the condensed liquid may collect above the bubble generator, and the humidified gaseous stream may be bubbled through the condensed liquid by passing the gaseous stream through the bubble generator.

In some embodiments, the humidifier in the humidification-dehumidification desalination apparatus comprises a bubble column humidifier.

When multiple-stage bubble column condensers are employed as dehumidification apparatuses, the inlet of the first stage can be coupled to the vapor-containing gas source and the outlet of the first stage can be coupled to the inlet of the second stage. Additional stages can be arranged such that outlets of a preceding stage are fluidically coupled to inlets of a subsequent stage, and the outlet of the final stage can be used as the outlet of the condenser (e.g., from which stream 508 originates in FIG. 5).

Suitable bubble-column condensers that may be used as the dehumidification apparatus in certain systems and methods described herein include those described in U.S. Patent Publication No. 2013/0075940, by Govindan et al., filed Jul. 12, 2012 as U.S. patent application Ser. No. 13/548,166, and entitled "Bubble-Column Vapor Mixture Condenser"; U.S. Provisional Patent Application No. 61/877,032, filed on Sep. 12, 2013 and entitled "Systems Including a Bubble Column Condenser"; and U.S. Provisional Patent Application No. 61/881,365, filed on Sep. 23, 2013 and entitled "Desalination Systems and Associated Methods," each of which is incorporated herein by reference in its entirety for all purposes.

The dehumidifier may be of any size, which will generally depend upon the number of dehumidifier units employed in the system and the total flow rate of aqueous saline solution that is to be desalinated. In certain embodiments, the total of the volumes of the dehumidifiers used in the desalination system can be at least about 1 liter, at least about 10 liters, or at least about 100 liters (and/or, in some embodiments, up to about 1,000,000 liters, or more).

In some embodiments, the desalination apparatus comprises a hybrid desalination apparatus comprising a first desalination unit and a second desalination unit.

In some embodiments, in the hybrid desalination apparatus, the first unit is a reverse osmosis unit and the second unit is a humidification-dehumidification desalination apparatus. The humidification-dehumidification desalination apparatus can have any of the properties described above. For example, in some embodiments, the humidification-dehumidification desalination apparatus is operated at a pressure below 1 atmosphere. In certain embodiments, the humidification-dehumidification desalination apparatus comprises a dehumidifier comprising a bubble column condenser. In some embodiments, the humidification-dehumidification desalination apparatus comprises a plurality of conduits configured to discretely vary the ratio of a mass flow rate of air to a mass flow rate of liquid at intermediate points in the humidifier and/or the dehumidifier.

According to some embodiments, the system (e.g., system 100 in FIGS. 1A-1B) and/or a component thereof (e.g., the humidifier) is substantially continuously operated and/or configured to facilitate substantially continuous operation. As used herein, a continuously-operated system (or component thereof) refers to a system in which a liquid feed stream is fed to the system at the same time that a product (e.g., in the form of a stream or a solid product) is produced by the system. In some cases, one or more liquid streams may be in substantially continuous motion. For example, a liquid feed stream (e.g., a salt-containing aqueous stream) may be fed to the humidifier of the system, substantially continuously flowed through one or more stages of the humidifier, and result in a concentrated stream subsequently being discharged from the humidifier. In some cases, a continuously-operated system may be associated with certain advantages, including, but not limited to, increased uptime and/or enhanced energy performance.

In some embodiments, the system (e.g., system 100 in FIGS. 1A-1B) and/or a component thereof is substantially transiently operated and/or configured to facilitate substantially transient operation (e.g., batch processing). As used herein, a transiently-operated system refers to a system in which an amount of liquid (e.g., salt-containing water) is introduced into the system and remains in the system until a certain condition (e.g., a certain salinity, a certain density) is reached. Upon satisfaction of the condition, the liquid is discharged from the system. In certain cases, transient operation may allow cleaning operations to be interspersed with production operations. For example, transient operation may be advantageous for certain systems comprising filter presses, bioreactors, and/or other systems that may require periodic cleaning. In some cases, transient operation may advantageously facilitate processing of highly viscous liquids (e.g., sugar-containing feedstock) that may be difficult to pump.

Certain embodiments relate to desalination systems. In some embodiments, a desalination system comprises a humidifier comprising a humidifier liquid inlet fluidically connected to a source of salt-containing water, a humidifier gas inlet fluidically connected to a source of a carrier gas, and a humidifier outlet. In certain cases, the humidifier is configured to produce a vapor-containing humidifier outlet stream enriched in water vapor relative to the gas received from the gas inlet. In some embodiments, the desalination system comprises a bubble column condenser comprising a condenser inlet fluidically connected to the humidifier outlet, a condenser gas outlet, and a condenser water outlet. In certain embodiments, the bubble column condenser is configured to remove at least a portion of the water vapor from the humidifier outlet stream to produce a condenser gas outlet stream lean in water relative to the humidifier outlet stream and a condenser water outlet stream. In some embodiments, the desalination system comprises a heat exchanger separate from the bubble column condenser and fluidically connected to the condenser water outlet and configured to remove heat from the condenser water outlet stream.

Some embodiments relate to systems comprising a bubble column condenser as described herein arranged to be in fluid communication with an external heat exchanger. In such embodiments, heat may be transferred from a condenser liquid outlet stream to a coolant stream flowing through the external heat exchanger. The system can be configured such that the cooled condenser liquid outlet stream can then be returned to the bubble column condenser through an inlet and be re-used as a liquid to form liquid layers in the stage(s) of the condenser. In this manner, the temperature of the liquid layers within the bubble column condenser can be regulated such that, in each stage, the temperature of the liquid layer is maintained at a temperature lower than the temperature of the gas or gas mixture. In some cases, arrangement of the heat exchanger at a location that is external to the condenser, rather than at a location that is within the condenser, can allow for use of condensers as described herein (e.g., condensers having reduced dimensions and/or reduced levels of liquid baths, etc.). In some cases, the heat exchanger may transfer heat absorbed from the condenser liquid outlet stream to another fluid.

Figure 6:
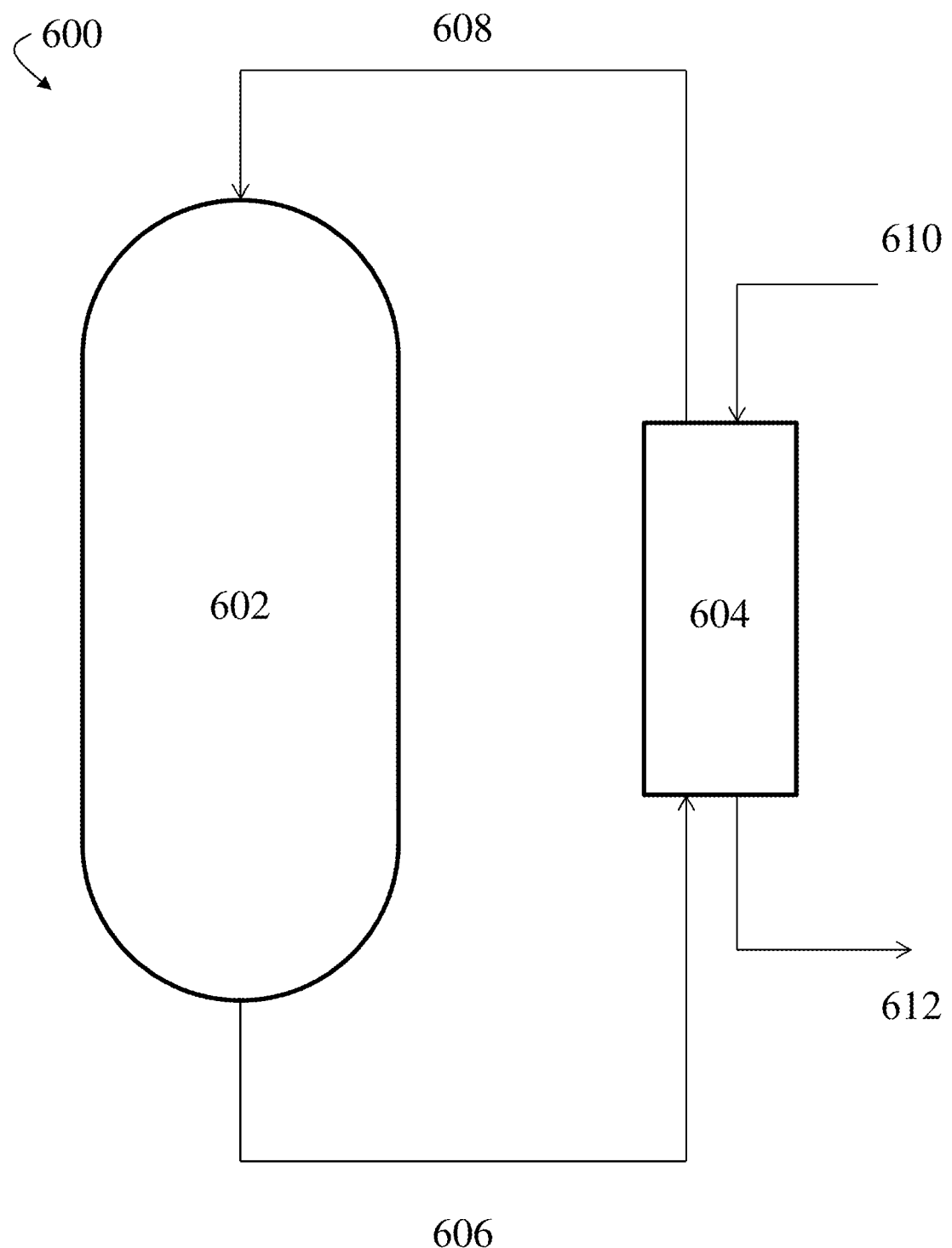
FIG. 6 shows, according to some embodiments, exemplary schematic diagrams of a bubble column condenser and an external heat exchanger.

FIG. 6 shows an exemplary embodiment of a system 600 including a bubble column condenser 602 fluidly connected to an external heat exchanger 604 via conduits 606 and 608. Heat exchanger 304 further includes a coolant during operation. In operation, a condenser liquid outlet stream containing an amount of absorbed heat exits condenser 602 via conduit 606 at a temperature $T_1$ and enters external heat exchanger 604. Heat is transferred from the condenser liquid outlet stream to the coolant, which is maintained at a temperature $T_3$ that is lower than temperature $T_1$ of the condenser liquid outlet stream. The condenser liquid outlet stream then exits heat exchanger 604 via conduit 608 at temperature $T_2$, where $T_2$ is less than $T_1$, and is returned to condenser 602 via conduit 608.

Heat exchanger 604 may optionally transfer any absorbed heat from the condenser liquid outlet stream to another fluid stream. For example, a heat exchanger inlet stream (e.g., a heat exchanger coolant stream) may enter heat exchanger 604 via conduit 610 at temperature $T_3$. As the heat exchanger inlet stream passes through heat exchanger 604, it may absorb heat transferred from the condenser liquid outlet stream. The heat exchanger inlet stream may then exit heat exchanger 604 via conduit 612 as a heat exchanger outlet stream at temperature $T_4$, where $T_4$ is greater than $T_3$. In some embodiments, the condenser liquid inlet stream flowing through conduit 308 and heat exchanger inlet stream flowing through conduit 610 may be substantially the same. In other embodiments, the condenser liquid inlet stream and the heat exchanger inlet stream may be different. In some cases, the condenser liquid outlet stream flowing through heat exchanger 604 (e.g., the stream flowing through conduits 606 and 608) and the heat exchanger coolant stream (e.g., the stream flowing through conduits 610 and 612) may flow in substantially parallel directions through heat exchanger 604. In other embodiments (as illustrated), the condenser liquid outlet stream flowing through heat exchanger 604 and the heat exchanger coolant stream may flow in substantially non-parallel (e.g., opposite) directions through heat exchanger 604.

In some embodiments, the bubble column condenser may be used in a desalination system. In some embodiments, the desalination system may be a humidification-dehumidification (HDH) system. In such systems, a condenser (e.g., bubble column condenser) may act as a dehumidifier to condense substantially purified water from a humidified gas stream. Use of a bubble column condenser as a dehumidifier in an HDH system may be advantageous because direct contact condensers, such as bubble column condensers, may exhibit relatively higher heat transfer effectiveness than other types of condensers, such as surface condensers. In some embodiments, the HDH system comprises a heat exchanger. In certain cases, the heat exchanger facilitates the transfer of heat from a fluid stream flowing through a condenser (e.g., a condenser liquid outlet stream) to a fluid stream flowing through a humidifier (e.g., a humidifier liquid inlet stream). For example, the heat exchanger may advantageously allow energy to be recovered from a condenser liquid outlet stream and used to pre-heat a humidifier liquid inlet stream (e.g., a salt-containing water stream) prior to entry of the humidifier liquid inlet stream into the humidifier of the HDH system. This may, for example, avoid the need for an additional heating device to heat the salt-containing water stream. Alternatively, if a heating device is used, the presence of a heat exchanger to recover energy from a condenser liquid outlet stream may reduce the amount of heat required to be applied to the salt-containing water stream. In some embodiments, the heat exchanger is an external heat exchanger. As noted above, the use of an external heat exchanger may advantageously allow the use of bubble column condensers as described herein (e.g., condensers having reduced dimensions and/or reduced levels of liquid baths, etc.).

Figure 7A:
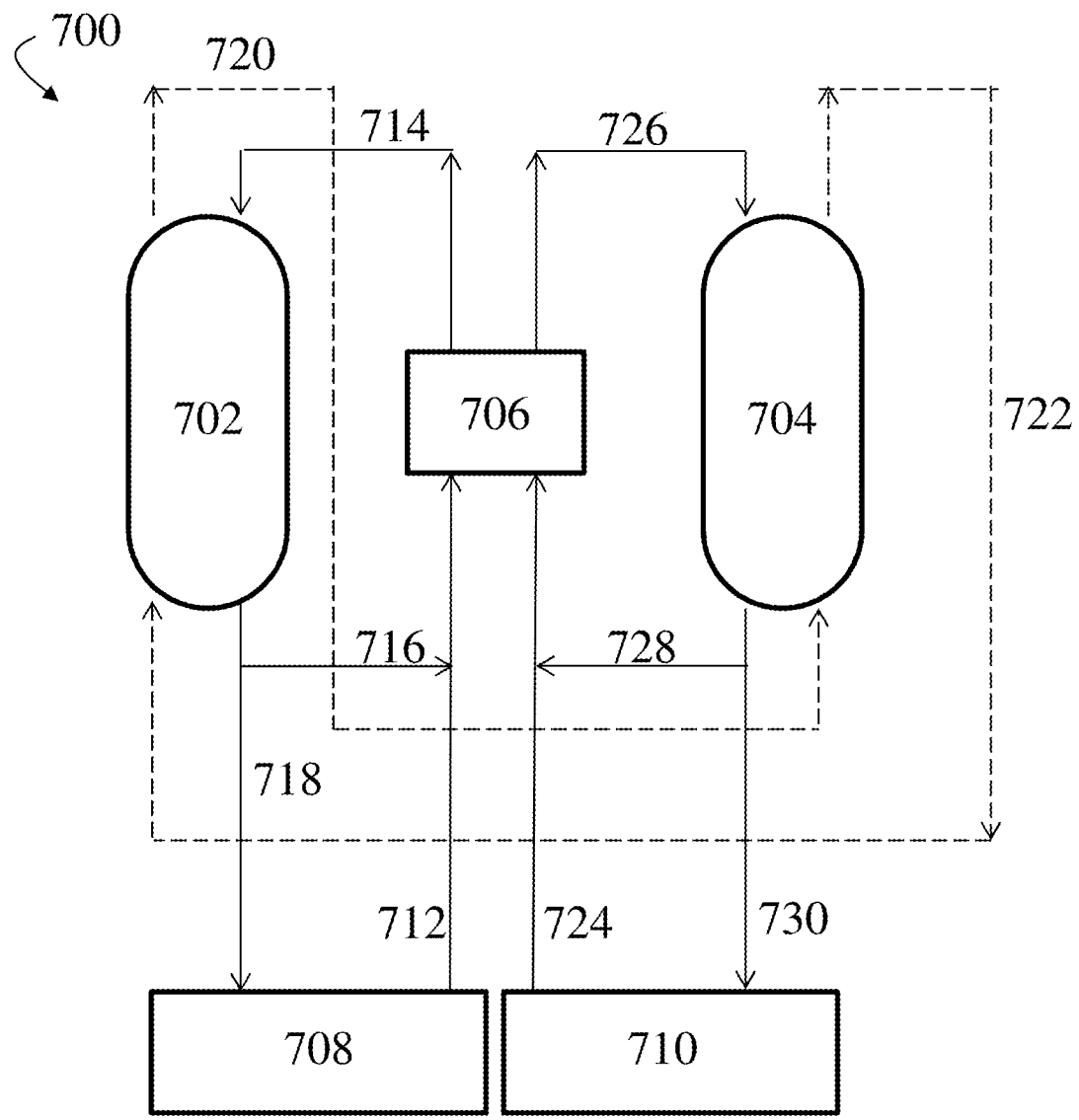
FIG. 7 shows exemplary schematic diagrams of an HDH system including a bubble column condenser and an external heat exchanger, according to some embodiments, where (A) the external heat exchanger is a parallel flow device; (B) the external heat exchanger is a counter flow device.

An exemplary embodiment of an HDH system is shown in FIG. 7A. System 700 includes a humidifier 702, a dehumidifier 704, a heat exchanger 706, a reservoir of salt-containing water 708, and a reservoir of purified water 710. Humidifier 702 and dehumidifier 704 are arranged in fluid communication via gas conduits 720 and 722. In some embodiments, system 700 is a closed loop system, with a carrier gas stream circulating between humidifier 702 and dehumidifier 704. In some cases, the carrier gas stream may comprise a non-condensable gas. In addition to the carrier gas stream, various liquid streams are circulated through system 700. In one case, the stream may include salt-containing water, such as seawater, brackish water, saline water, brine, and/or industrial wastewater. In system 700, a reservoir of salt-containing water 708 is arranged in fluid communication with heat exchanger 706 via liquid conduit 712 and with humidifier 702 through liquid conduit 718. Humidifier 702 is also arranged to be in fluid communication with heat exchanger 706 via liquid conduits 714 and 716. In some embodiments, humidifier 702 may comprise a humidifier liquid inlet and outlet and a humidifier gas inlet and outlet. In some cases, the humidifier is configured such that the liquid inlet is positioned at a first end (e.g., top end) of the humidifier, and the gas inlet is positioned at a second, opposite end (e.g., bottom end) of the humidifier. Such a configuration may advantageously result in high thermal efficiency. In some embodiments, the humidifier is configured to bring a carrier gas stream (e.g., dry air) into direct contact with a salt-containing water stream, thereby producing a vapor-containing humidifier gas outlet stream enriched in water relative to the gas received from the humidifier gas inlet. Humidifier 702 may also produce a humidifier liquid outlet stream, a portion of which is returned to reservoir 708 and a portion of which is flowed through heat exchanger 706 to be heated and reintroduced to the humidifier. Any humidifier known to those of ordinary skill in the art may be utilized in the context of the embodiments described herein. According to certain embodiments, the humidifier may be a packed bed humidifier. For example, in some such embodiments, humidification of the carrier gas may be achieved by spraying salt-containing water from one or more nozzles located at the top of the humidifier through a packing material (e.g., a polyvinyl chloride packing material or a glass-filled polypropylene packing material) while the carrier gas travels through the humidification chamber and is brought into contact with the salt-containing water. In some embodiments, the packing material may increase the surface area of the salt-containing water stream that is contact with the carrier gas, thereby increasing the portion of water that is vaporized into the carrier gas. In some embodiments, the humidifier may be a bubble column humidifier. It has been recognized that use of a bubble column humidifier may, in some cases, be preferable to use of other types of bubble column humidifiers (e.g., packed bed humidifiers). For example, bubble column humidifiers may be characterized by improved performance (e.g., higher rates of heat and/or mass transfer, higher thermodynamic effectiveness) and/or reduced fabrication and/or material costs (e.g., reduced dimensions).

Figure 7B:
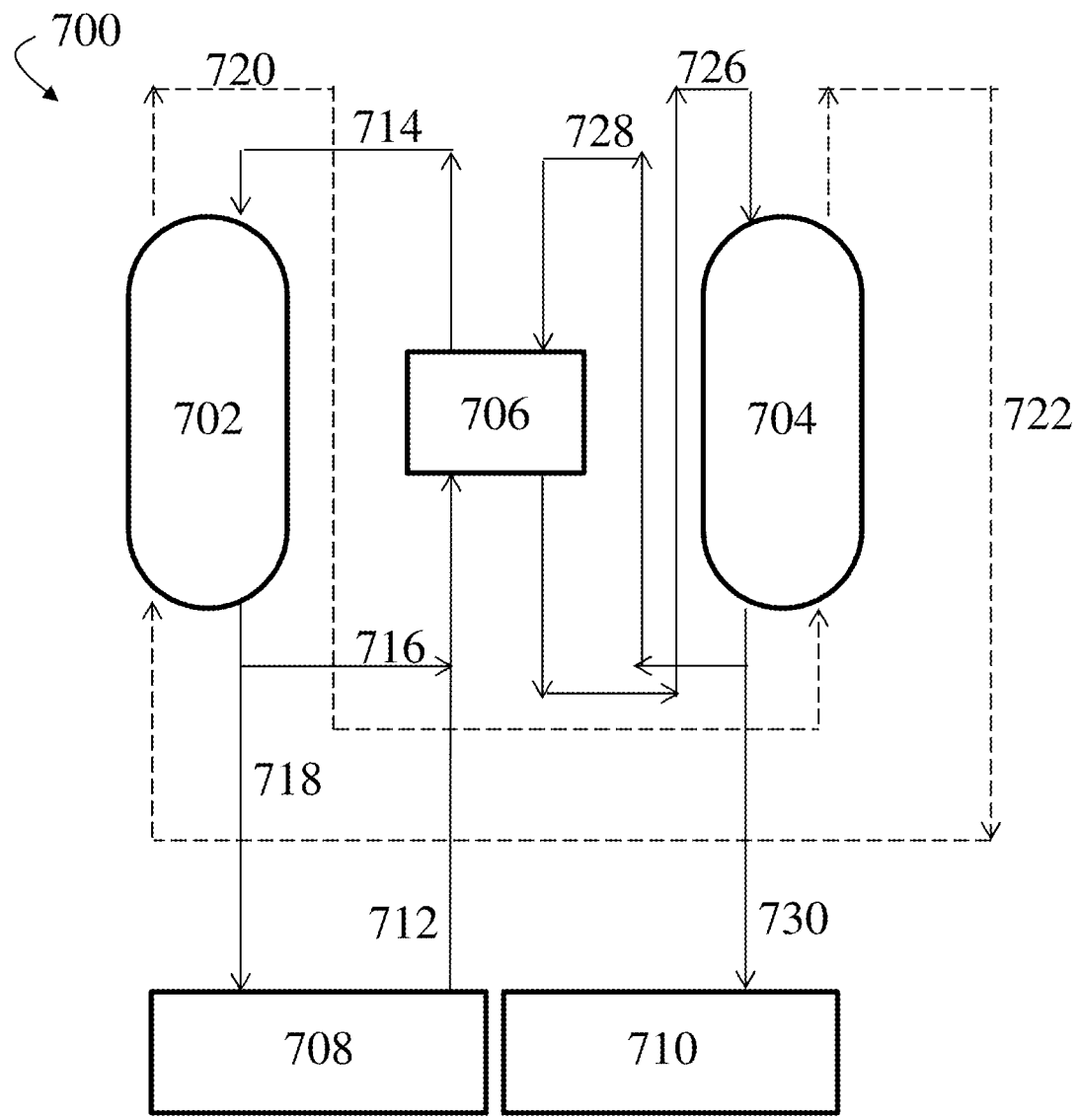

In some embodiments, dehumidifier 704 is a bubble column condenser as described herein. In some embodiments, condenser 704 is in fluid communication with reservoir 710 through conduit 730. Condenser 704 may also be in fluid communication with heat exchanger 706 via conduits 726 and 728. Heat exchanger 706 may be any heat exchanger known in the art, as described elsewhere herein. In some embodiments the heat exchanger is configured such that a first fluid stream and a second fluid stream flow through the heat exchanger in substantially opposite direction (e.g., counter flow). For example, FIG. 7B shows heat exchanger 706 as a counter flow device. The heat exchanger may, alternatively, be a parallel flow device and may be configured such that a first fluid stream and a second fluid stream flow in substantially the same direction. FIG. 7A shows heat exchanger 706 as a parallel flow device. In some embodiments, the heat exchanger is a cross flow device, and the heat exchanger is configured such that a first fluid stream and a second fluid stream flow in substantially perpendicular directions. In some cases, the heat exchanger is a liquid-to-liquid heat exchanger. In an exemplary embodiment, the heat exchanger is a plate and frame heat exchanger. In certain embodiments, heat exchanger 706 is in fluid communication with reservoir 710 via optional conduit 724. In operation, in the exemplary embodiment shown in FIG. 7A, a salt-containing water stream flows from reservoir 708 to heat exchanger 706 via conduit 712 to be heated prior to entering humidifier 702 (e.g., "preheated"). The preheated salt-containing water stream then travels from heat exchanger 706 through conduit 714 to humidifier 702. In some cases, a first portion of the preheated salt-containing water stream flows from heat exchanger 706 to humidifier 702, and, optionally, a second portion of the preheated salt-containing water stream is discharged from the system and/or routed to another portion of the system. Separately, and in a direction that is opposite to the direction of flow for the preheated salt-containing water stream, a carrier gas stream provided by condenser 704 is flowed through humidifier 702. In humidifier 702, the carrier gas stream, which is at a temperature that is lower than the preheated salt-containing water stream, is heated and humidified by the preheated salt-containing water stream. The humidified carrier gas stream exits humidifier 702 and flows through gas conduit 720 to dehumidifier 704. A portion of the salt-containing water stream returns to reservoir 708 via conduit 718, and a portion flows through liquid conduit 716 to heat exchanger 706 to be preheated before being returned to humidifier 702 via liquid conduit 714.

The humidified carrier gas stream is then flowed through bubble column condenser 704. Flowing countercurrent to the humidified carrier gas stream in the bubble column condenser is a condenser liquid stream that flows from heat exchanger 706 to bubble column condenser 704 through conduit 726. In some embodiments, the condenser liquid stream comprises purified water, which may be substantially pure water. In some cases, a first portion of the condenser liquid stream that has flowed through heat exchanger 706 is flowed to bubble column condenser 704 and, optionally, a second portion of the condenser liquid stream that has flowed through heat exchanger 706 is discharged from the system and/or routed to another portion of the system. In some cases in which a portion of the condenser liquid stream is discharged from the system, the rate that the liquid stream is discharged is about the same as the rate that the liquid is being condensed, in order to maintain a constant volume of water in the system. In bubble column condenser 704, the humidified carrier gas stream undergoes a condensation process as described elsewhere herein, wherein heat and mass are transferred from the humidified carrier gas stream to the condenser liquid stream, producing a dehumidified carrier gas stream and a condenser liquid outlet stream. The dehumidified gas stream is returned to humidifier 702 via gas conduit 722 for use as described herein. In some embodiments, a portion of the condenser liquid outlet stream is flowed through liquid conduit 730 to reservoir 710. The purified water that is collected in reservoir 710 can be used, for example, for drinking, watering crops, washing/cleaning, cooking, for industrial use, etc. The remaining portion of the condenser liquid outlet stream that is not flowed to reservoir 710 is returned to heat exchanger 706 via liquid conduit 728. As described herein, heat from the condenser liquid outlet stream may be transferred to the salt-containing water stream flowing through liquid conduits 712, 714, and 716. After flowing through heat exchanger 706, the condenser liquid outlet stream then flows through liquid conduit 726 and returns to condenser 704 for reuse.

Various of the components described herein can be in "direct fluidic communication" with another component or components. As used herein, direct fluidic communication exists between a first component and a second component (and the two components are said to be in "direct fluidic communication" with each other) when they are in fluidic communication with each other and the composition of the fluid does not substantially change (i.e., no fluid component changes in relative abundance by more than 5% and no phase change occurs) as it is transported from the first component to the second component. As an illustrative example, a stream that connects first and second system components, and in which the pressure and temperature of the fluid is adjusted but the composition of the fluid is not altered, would be said to establish direct fluidic communication between the first and second components. If, on the other hand, a separation step is performed and/or a chemical reaction is performed that substantially alters the composition of the stream contents during passage from the first component to the second component, the stream would not be said to establish direct fluidic communication between the first and second components.

U.S. Provisional Application No. 62/281,828, filed Jan. 22, 2016, and entitled "Formation of Solid Salts Using High Gas Flow Velocities in Humidifiers, Such as Multi-Stage Bubble Column Humidifiers," is incorporated herein by reference in its entirety for all purposes.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A hybrid desalination system, comprising:
a first desalination unit comprising a reverse osmosis unit; and
a second desalination unit fluidically connected to the first desalination unit, wherein the second desalination unit comprises a humidification-dehumidification desalination apparatus,
wherein the humidification-dehumidification desalination apparatus comprises a humidifier and a dehumidifier fluidically connected to the humidifier, wherein the dehumidifier comprises a bubble column condenser,
wherein the bubble column condenser of the dehumidifier comprises a dehumidifier gas inlet fluidically connected to a humidifier gas outlet of the humidifier, a dehumidifier gas outlet, a dehumidifier water inlet configured to receive a stream comprising water in its liquid phase, a dehumidifier water outlet, and a chamber in fluidic communication with the dehumidifier water inlet and the dehumidifier water outlet, wherein the dehumidifier is configured to remove at least a portion of water vapor from a humidifier gas outlet stream to produce:
a dehumidifier gas outlet stream lean in water relative to the humidifier gas outlet stream, and
a dehumidifier water outlet stream that is output by the dehumidifier water outlet; and
a heat exchanger separate from the dehumidifier and fluidically connected to the dehumidifier water outlet, wherein the heat exchanger is configured to remove heat from the dehumidifier water outlet stream to produce a heat exchanger outlet stream, and wherein the dehumidifier water inlet is fluidically connected to an outlet of the heat exchanger and configured to receive at least a portion of the heat exchanger outlet stream.

2. The hybrid desalination system of claim 1, wherein the dehumidifier is directly fluidically connected to the humidifier.

3. The hybrid desalination system of claim 1, wherein the humidifier comprises a humidifier vessel, and wherein the humidifier vessel comprises a first input configured to receive an aqueous stream and a second input configured to receive a gaseous stream into which water from the aqueous stream is vaporized.

4. The hybrid desalination system of claim 3, wherein in the humidifier, the water from the aqueous stream is evaporated into the gaseous stream to produce a humidified gaseous stream and a concentrated stream.

5. The hybrid desalination system of claim 3, wherein the humidifier comprises a device configured to produce droplets of the aqueous stream.

6. The hybrid desalination system of claim 5, wherein the device comprises a nozzle and/or a spray device.

7. The hybrid desalination system of claim 3, wherein the aqueous stream comprises at least one dissolved salt.

8. The hybrid desalination system of claim 7, wherein the at least one dissolved salt comprises a dissolved monovalent salt.

9. The hybrid desalination system of claim 3, wherein the gaseous stream is transported in a counter-current direction, relative to the direction along which the aqueous stream is transported.

10. The hybrid desalination system of claim 3, wherein the gaseous stream is capable of carrying water vapor.

11. The hybrid desalination system of claim 3, wherein the gaseous stream comprises air, nitrogen, oxygen, and/or noble gas.

12. The hybrid desalination system of claim 1, wherein at least a portion of the dehumidifier gas outlet stream is recycled to the humidifier.

13. The hybrid desalination system of claim 1, wherein the humidification-dehumidification desalination apparatus is capable of being operated at a pressure below 1 atmosphere.

14. The hybrid desalination system of claim 1, wherein the humidifier of the humidification-dehumidification desalination apparatus comprises a bubble column humidifier.

15. The hybrid desalination system of claim 1, wherein the humidification-dehumidification desalination apparatus comprises a plurality of conduits configured to discretely vary the ratio of a mass flow rate of air to a mass flow rate of liquid at intermediate points in the humidifier and/or the dehumidifier.

16. The hybrid desalination system of claim 1, wherein the bubble column condenser is a multiple-stage bubble column condenser.

17. The hybrid desalination system of claim 1, wherein the dehumidifier is configured such that at least a portion of the humidifier gas outlet stream is directly contacted with liquid from the at least a portion of the heat exchanger outlet stream entering into the dehumidifier via the dehumidifier water inlet, such that at least a portion of the water vapor from the humidifier gas outlet stream is condensed into the liquid.

18. The hybrid desalination system of claim 1, wherein the dehumidifier lacks an internal heat exchanger.

19. The hybrid desalination system of claim 4, wherein the humidifier comprises a humidifier liquid outlet configured to output the concentrated stream, the concentrated stream comprises at least one dissolved salt, and the hybrid desalination system further comprises a precipitator in fluidic communication with the humidifier liquid outlet, wherein the precipitator is configured to precipitate at least a portion of the at least one dissolved salt from the concentrated stream, and wherein the precipitator comprises a stagnation zone.

* * * * *